US011818355B2

(12) United States Patent
Ikai et al.

(10) Patent No.: US 11,818,355 B2
(45) Date of Patent: Nov. 14, 2023

(54) VIDEO CODING APPARATUS AND VIDEO DECODING APPARATUS

(71) Applicant: Sharp Kabushiki Kaisha, Sakai (JP)

(72) Inventors: Tomohiro Ikai, Sakai (JP); Tomoko Aono, Sakai (JP); Takeshi Chujoh, Sakai (JP); Yukinobu Yasugi, Sakai (JP); Eiichi Sasaki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 166 days.

(21) Appl. No.: 17/429,024

(22) PCT Filed: Feb. 7, 2020

(86) PCT No.: PCT/JP2020/004869
§ 371 (c)(1),
(2) Date: Aug. 6, 2021

(87) PCT Pub. No.: WO2020/162609
PCT Pub. Date: Aug. 13, 2020

(65) Prior Publication Data

US 2022/0182631 A1 Jun. 9, 2022

(30) Foreign Application Priority Data

Feb. 8, 2019 (JP) ................................ 2019-021630
Mar. 25, 2019 (JP) ................................ 2019-057031

(51) Int. Cl.
*H04N 19/13* (2014.01)
*H04N 19/174* (2014.01)
*H04N 19/70* (2014.01)

(52) U.S. Cl.
CPC ........... *H04N 19/13* (2014.11); *H04N 19/174* (2014.11); *H04N 19/70* (2014.11)

(58) Field of Classification Search
CPC ....... H04N 19/13; H04N 19/174; H04N 19/70
See application file for complete search history.

(56) References Cited

U.S. PATENT DOCUMENTS

2014/0086333 A1* 3/2014 Wang .................. H04N 21/235 375/240.26
2015/0016503 A1* 1/2015 Rapaka ................. H04N 19/70 375/240.02

(Continued)

OTHER PUBLICATIONS

Official Communication issued in International Patent Application No. PCT/JP2020/004869, dated Apr. 14, 2020.

(Continued)

*Primary Examiner* — Fabio S Lima
(74) *Attorney, Agent, or Firm* — KEATING & BENNETT, LLP

(57) ABSTRACT

Provided is a video decoding apparatus for decoding coded data of a tile group in which a picture is split into rectangular regions, the tile group being composed of segments, the video decoding apparatus including: a header decoder configured to decode the number of tiles, a WPP enabled flag, and a slice enabled flag indicating whether segments in a target tile group are rectangular tiles, CTU rows, or slices from a tile group header, wherein the header decoder is configured to decode only one of the number of tiles being two or more, the WPP enabled flag being 1, and the slice enabled flag being 1 in one tile group.

4 Claims, 37 Drawing Sheets

(56) References Cited

U.S. PATENT DOCUMENTS

| | | | | |
|---|---|---|---|---|
| 2016/0234498 A1* | 8/2016 | Misra | ..................... | H04N 19/46 |
| 2021/0144391 A1* | 5/2021 | Poirier | ................. | H04N 19/176 |
| 2022/0182631 A1* | 6/2022 | Ikai | ...................... | H04N 19/129 |

OTHER PUBLICATIONS

Bross et al., “Versatile Video Coding (Draft 8)”, Joint Video Experts Team (JVET) of ITU-T SG 16 WP 3 and ISO/IEC JTC 1/SC 29/WG 11, JVET-Q2001-vB, Jan. 7-17, 2020, 7 pages.

Ikai et al., “AHG12: Wavefront processing in a tile group”, Joint Video Experts Team (JVET) of ITU-T SG 16 WP 3 and ISO/IEC JTC 1/SC 29/WG 11, JVET-M0070, Jan. 9-18, 2019, pp. 1-3.

Deshpande et al., “On Tile Grouping”, Joint Video Experts Team (JVET) of ITU-T SG 16 WP 3 and ISO/IEC JTC 1/SC 29/WG 11, JVET-M0853-v2, Jan. 9-18, 2019, pp. 1-8.

Wang et al, “Spec text for the agreed starting point on slicing and tiling”, Joint Video Experts Team (JVET) of ITU-T SG 16 WP 3 and ISO/IEC JTC 1/SC 29/WG 11, JVET-L0686-v2, Oct. 3-12, 2018, 1 page.

Sjöberg et al., “Tile groups for VVC”, Joint Video Experts Team (JVET) of ITU-T SG 16 WP 3 and ISO/IEC JTC 1/SC 29/WG 11, JVET-L0415-v1, Oct. 3-12, 2018, pp. 1-4.

Bross et al., “Versatile Video Coding (Draft 4)”, Joint Video Experts Team (JVET) of ITU-T SG 16 WP 3 and ISO/IEC JTC 1/SC 29/WG 11, JVET-M1001-v6, Jan. 9-18, 2019, 298 pages.

* cited by examiner (a) Tile address (tileAddrInPic)

| TileGr0 | | TileGr1 | |
|---|---|---|---|
| Tile 0 | Tile 1 | Tile 2 | Tile 3 |
| Tile 4 | Tile 5 | Tile 6 | Tile 7 |
| TileGr2 | | TileGr3 | |
| Tile 8 | Tile 9 | Tile 10 | Tile 11 |

(b) (tileAddrInTG)

| TileGr0 | | TileGr1 | |
|---|---|---|---|
| Tile 0 | Tile 1 | Tile 4 | Tile 5 |
| Tile 2 | Tile 3 | Tile 6 | Tile 7 |
| TileGr2 | | TileGr3 | |
| Tile 8 | Tile 9 | Tile 10 | Tile 11 |

(a)
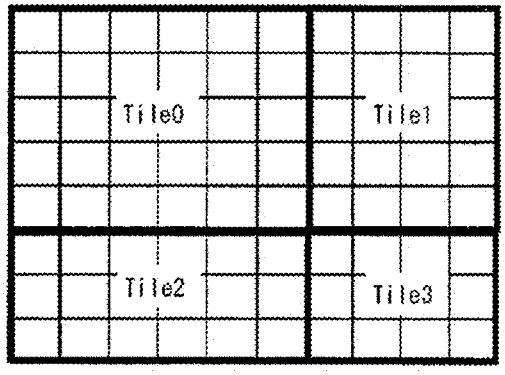
(b)
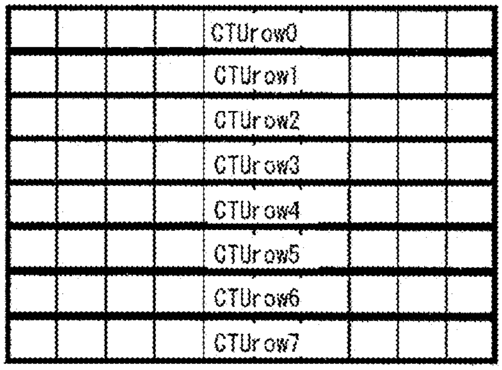
(c)
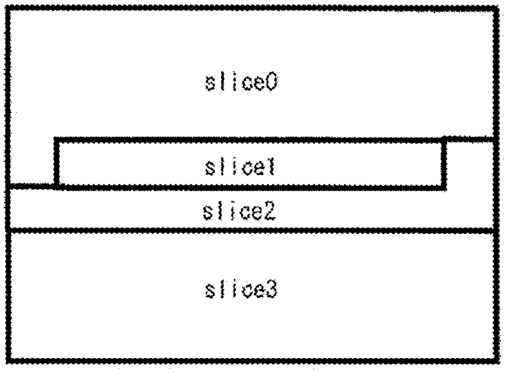
FIG. 8

(a)

| seq_parameter_set_rbsp( ) { | Descriptor |
| --- | --- |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| bit_depth_luma_minus8 | ue(v) |
| bit_depth_chroma_minus8 | ue(v) |
| qtbtt_dual_tree_intra_flag | ue(v) |
| log2_ctu_size_minus2 | ue(v) |
| log2_min_qt_size_intra_tile_groups_minus2 | ue(v) |
| log2_min_qt_size_inter_tile_groups_minus2 | ue(v) |
| max_mtt_hierarchy_depth_inter_tile_groups | ue(v) |
| max_mtt_hierarchy_depth_intra_tile_groups | ue(v) |
| sps_cclm_enabled_flag | u(1) |
| sps_temporal_mvp_enabled_flag | u(1) |
| if( sps_temporal_mvp_enabled_flag ) | |
| sps_sbtmvp_enabled_flag | u(1) |
| if( sps_sbtmvp_enabled_flag ) | |
| log2_sbtmvp_default_size_minus2 | u(1) |
| sps_amvr_enabled_flag | u(1) |
| sps_affine_enabled_flag | u(1) |
| if( sps_affine_enabled_flag ) | |
| sps_affine_type_flag | u(1) |
| sps_mts_intra_enabled_flag | u(1) |
| sps_mts_inter_enabled_flag | u(1) |
| rbsp_trailing_bits( ) | |
| } | |

(b)

| pic_parameter_set_rbsp( ) { | Descriptor |
| --- | --- |
| pps_pic_parameter_set_id | ue(v) |
| pps_seq_parameter_set_id | ue(v) |
| transform_skip_enabled_flag | u(1) |
| single_tile_in_pic_flag | u(1) |
| if( !single_tile_in_pic_flag ) { | |
| num_tile_columns_minus1 | ue(v) |
| num_tile_rows_minus1 | ue(v) |
| uniform_tile_spacing_flag | u(1) |
| if( !uniform_tile_spacing_flag ) { | |
| for( i = 0; i < num_tile_columns_minus1; i++ ) | |
| tile_column_width_minus1[ i ] | ue(v) |
| for( i = 0; i < num_tile_rows_minus1; i++ ) | |
| tile_row_height_minus1[ i ] | ue(v) |
| } | |
| loop_filter_across_tiles_enabled_flag | u(1) |
| } | |
| rbsp_trailing_bits( ) | |
| } | |

| tile_group_header( ) { | Descriptor |
|---|---|
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| **tile_group_type** | ue(v) |
| ... | |
| entry_point() | |
| byte_alignment( ) | |
| } | |

(b)

| entry_point( ) { | Descriptor |
|---|---|
| if( num_tiles_in_tile_group_minus1 > 0 ) { | |
| **offset_len_minus1** | ue(v) |
| for( i = 0; i < NumEntryPoint; i++ ) | |
| **entry_point_offset_minus1[ i ]** | u(v) |
| } | |
| } | |

(c)

| tile_group_data( ) { | Descriptor |
|---|---|
| tileIdx = tile_group_address | |
| for(i=0; i<=num_tiles_in_tile_group_minus1; i++,tileIdx++) { | |
| ctbAddrTs = FirstCtbAddrTs[ tileIdx ] | |
| for (j=0; j<NumCtusInTile[tileIdx]; j++,ctbAddrTs++ ) { | |
| ctbAddrRs = CtbAddrTsToRs[ ctbAddrTs ] | |
| coding_tree_unit( ) | |
| } | |
| **end_of_tile_one_bit** /* equal to 1 */ | ae(v) |
| if( i < num_tiles_in_tile_group_minus1 ) | |
| byte_alignment( ) | |
| } | |
| } | |

FIG. 12

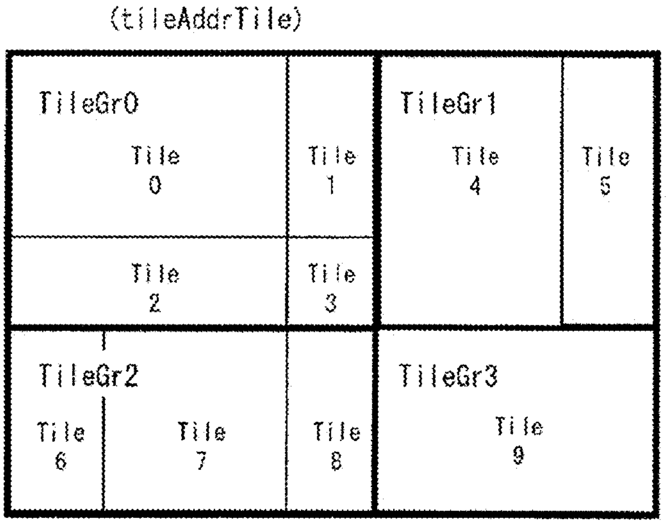

FIG. 13

| pic_parameter_set_rbsp( ) { | Descriptor |
|---|---|
| **pps_pic_parameter_set_id** | ue(v) |
| **pps_seq_parameter_set_id** | ue(v) |
| **transform_skip_enabled_flag** | u(1) |
| **single_tile_group_in_pic_flag** | u(1) |
| if( !single_tile_group_in_pic_flag ) { | |
| **num_tile_group_columns_minus1** | ue(v) |
| **num_tile_group_rows_minus1** | ue(v) |
| for( i = 0; i < num_tile_group_columns_minus1; i++ ) | |
| **tile_group_column_width_minus1[ i ]** | ue(v) |
| for( i = 0; i < num_tile_group_rows_minus1; i++ ) | |
| **tile_group_row_height_minus1[ i ]** | ue(v) |
| } | |
| for ( j = 0; j<numTileGroup; j++) { | |
| **single_tile_in_pic_flag[ j ]** | u(1) |
| if( !single_tile_in_pic_flag[ j ] ) { | |
| **num_tile_columns_minus1[ j ]** | ue(v) |
| **num_tile_rows_minus1[ j ]** | ue(v) |
| **uniform_tile_spacing_flag[ j ]** | u(1) |
| if( !uniform_tile_spacing_flag[ j ] ) { | |
| for( i = 0; i < num_tile_columns_minus1[ j ]; i++ ) | |
| **tile_column_width_minus1[ j ] [ i ]** | ue(v) |
| for( i = 0; i < num_tile_rows_minus1[ j ]; i++ ) | |
| **tile_row_height_minus1[ j ][ i ]** | ue(v) |
| } | |
| } | |
| loop_filter_across_tiles_enabled_flag[ j ] | u(1) |
| } | |
| rbsp_trailing_bits( ) | |
| } | |

FIG. 14

| NUMBER OF TILES | WAVEFRONT PROCESSING ENABLED FLAG (entropy_coding_sync_enabled_flag) | REMARKS |
|---|---|---|
| > 1 (num_tiles_in_tile_group_minus1 > 0) | 0 | USE MULTIPLE TILE SEGMENTS WITHIN TILE GROUP (TILE ENABLED) |
| = 1 (num_tiles_in_tile_group_minus1 == 0) | 1 | USE CTU ROW SEGMENT WITHIN TILE GROUP (WPP ENABLED) |
| = 1 (num_tiles_in_tile_group_minus1 == 0) | 0 | ONE SEGMENT IN TILE GROUP |

(a)

| tile_group_header( ) { | Descriptor |
|---|---|
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| if (num_tiles_in_tile_group_minus1 == 0) | |
| **entropy_coding_sync_enabled_flag** | u(1) |
| **tile_group_type** | ue(v) |
| ... | |
| entry_point() | |
| byte_alignment( ) | |
| } | |

(b)

| entry_point( ) { | Descriptor |
|---|---|
| NumEntryPoint = entropy_coding_sync_enabled_flag ? TileGroupHeightInCtbsY-1 : num_tiles_in_tile_group_minus1 | |
| if( NumEntryPoint>0 ) { | |
| **offset_len_minus1** | ue(v) |
| for( i = 0; i < NumEntryPoint; i++ ) | |
| **entry_point_offset_minus1[ i ]** | u(v) |
| } | |
| } | |

(c)

| tile_group_data( ) { | Descriptor |
|---|---|
| tileIdx = tile_group_address | |
| for( i=0; i<=num_tiles_in_tile_group_minus1; i++,tileIdx++ ) { | |
| ctbAddrTs = FirstCtbAddrTs[ tileIdx ] | |
| ctbAddrInTile = ctbAddrTs-FirstCtbAddrTs[tile_group_address] | |
| for( j=0; j<NumCtusInTile[tileIdx]; j++,ctbAddrTs++ ) { | |
| CtbAddrRs = CtbAddrTsToRs[ ctbAddrTs ] | |
| coding_tree_unit( ) | |
| if ((entropy_coding_sync_enabled_flag && (CtbAddrInTile+1)%TileWidthInCtbsY==0)) { | |
| **end_of_subset_one_bit** | ae(v) |
| if(j < NumCtusInTile[tileIdx]-1 \|\| i < num_tiles_in_tile_group_minus1 ) | |
| byte_alignment( ) | |
| } | |
| } | |
| } | |
| } | |

FIG. 18

| tile_group_header( ) { | Descriptor |
|---|---|
| **tile_group_pic_parameter_set_id** | ue(v) |
| **entropy_coding_sync_enabled_flag** | u(1) |
| if( NumTilesInPic > 1 ) { | |
| **tile_group_address** | u(v) |
| if (entropy_coding_sync_enabled_flag == 0) | |
| **num_tiles_in_tile_group_minus1** | ue(v) |
| } | |
| **tile_group_type** | ue(v) |
| ... | |
| entry_point() | |
| byte_alignment( ) | |
| } | |

FIG. 19

| NUMBER OF TILES | SLICE ENABLED FLAG (slice_enabled_flag) | REMARKS |
|---|---|---|
| > 1 (num_tiles_in_tile_group_minus1 > 0) | 0 | USE MULTIPLE TILE SEGMENTS WITHIN TILE GROUP (TILE ENABLED) |
| = 1 (num_tiles_in_tile_group_minus1 == 0) | 1 | USE SLICE SEGMENT WITHIN TILE GROUP (SLICE ENABLED) |
| = 1 (num_tiles_in_tile_group_minus1 == 0) | 0 | ONE SEGMENT IN TILE GROUP |

| tile_group_header( ) { | Descriptor |
|---|---|
| **tile_group_pic_parameter_set_id** | ue(v) |
| if( NumTilesInPic > 1 ) { | |
| **tile_group_address** | u(v) |
| **num_tiles_in_tile_group_minus1** | ue(v) |
| } | |
| if (num_tiles_in_tile_group_minus1==0 && entropy_coding_sync_enabled_flag==0) { | |
| **slice_enabled_flag** | u(1) |
| } | |
| **tile_group_type** | |
| ... | |
| entry_point() | |
| byte_alignment( ) | |
| } | |

(b)

| entry_point( ) { | Descriptor |
|---|---|
| NumEntryPoint = slice_enabled_flag ? num_slices_in_tile_minus1 : num_tiles_in_tile_group_minus1 | |
| if( NumEntryPoint>0 ) { | |
| **offset_len_minus1** | ue(v) |
| for( i = 0; i < NumEntryPoint; i++ ) | |
| **entry_point_offset_minus1[ i ]** | u(v) |
| } | |
| } | |

(c)

| tile_group_data( ) { | Descriptor |
|---|---|
| tileIdx = tile_group_address | |
| for(i=0; i<=num_tiles_in_tile_group_minus1; i++,tileIdx++) { | |
| ctbAddrTs = FirstCtbAddrTs[ tileIdx ] | |
| for(j=0; j<NumCtusInTile[tileIdx]; j++,ctbAddrTs++) { | |
| ctbAddrRs = CtbAddrTsToRs[ ctbAddrTs ] | |
| coding_tree_unit( ) | |
| if(slice_enabled_flag) { | |
| **end_of_slice_segment_flag** | ae(v) |
| if (end_of_slice_segment_flag && j!=NumCtusInTile[tileIdx]-1) | |
| byte_alignment( ) | |
| } | |
| } | |
| **end_of_tile_one_bit** /* equal to 1 */ | ae(v) |
| if( i <= num_tiles_in_tile_group_minus1 ) | - |
| byte_alignment( ) | |
| } | |
| } | |

FIG. 21

| NUMBER OF TILES | WAVEFRONT PROCESSING ENABLED FLAG (entropy_coding_sync_enabled_flag) | SLICE ENABLED FLAG (slice_enabled_flag) |
|---|---|---|
| > 1 (num_tiles_in_tile_group_minus1 > 0) | 0 | 0 |
| = 1 (num_tiles_in_tile_group_minus1 == 0) | 1 | 0 |
| = 1 (num_tiles_in_tile_group_minus1 == 0) | 0 | 1 |
| = 1 (num_tiles_in_tile_group_minus1 == 0) | 0 | 0 |

| tile_group_header( ) { | Descriptor |
|---|---|
| tile_group_pic_parameter_set_id | ue(v) |
| if( NumTilesInPic > 1 ) { | |
| tile_group_address | u(v) |
| num_tiles_in_tile_group_minus1 | ue(v) |
| } | |
| if(num_tiles_in_tile_group_minus1 == 0) { | |
| entropy_coding_sync_enabled_flag | u(1) |
| if(entropy_coding_sync_enabled_flag==0) | |
| slice_enabled_flag | u(1) |
| } | |
| tile_group_type | ue(v) |
| ... | |
| entry_point() | |
| byte_alignment( ) | |
| } | |

(b)

| tile_group_data( ) { | Descriptor |
|---|---|
| tileIdx = tile_group_address | |
| for(i=0; i<=num_tiles_in_tile_group_minus1; i++,tileIdx++) { | |
| ctbAddrTs = FirstCtbAddrTs[ tileIdx ] | |
| ctbAddrInTile = ctbAddrTs-FirstCtbAddrTs[tile_group_address] | |
| for(j=0; j < NumCtusInTile[tileIdx]; j++,ctbAddrTs++) { | |
| ctbAddrRs = CtbAddrTsToRs[ ctbAddrTs ] | |
| coding_tree_unit( ) | |
| if(slice_enabled_flag) { | |
| **end_of_slice_segment_flag** | ae(v) |
| if (end_of_slice_segment_flag && j!=NumCtusInTile[tileIdx]-1) | |
| byte_alignment( ) | |
| } | |
| else { | |
| if (((entropy_coding_sync_enabled_flag && (CtbAddrInTile+1)%TileWidthInCtbsY==0) \|\| (j==NumCtusInTile[tileIdx]-1)) { | |
| **end_of_subset_one_bit** | ae(v) |
| if(j < NumCtusInTile[tileIdx]-1 \|\| i < num_tiles_in_tile_group_minus1 ) | |
| byte_alignment( ) | |
| } | |
| } | |
| } | |
| } | |
| } | |

FIG. 23

| tile_group_data( ) { | Descriptor |
|---|---|
| tileIdx = tile_group_address | |
| for(i=0; i<=num_tiles_in_tile_group_minus1; i++, tileIdx++) { | |
| ctbAddrTs = FirstCtbAddrTs[tileIdx] | |
| for( j=0; j<NumCtusInTile[tileIdx]; j++, ctbAddrTs++ ) { | |
| CtbAddrInRs = CtbAddrTsToRs[ ctbAddrInTs ] | |
| ctbAddrInTile = ctbAddrTs-FirstCtbAddrTs[tile_group_address] | |
| coding_tree_unit( ) | |
| if(entropy_coding_sync_enabled_flag && ((ctbAddrInTile+1)%TileWidthInCtbsY==0)) { | |
| **end_of_subset_one_bit** /* equal to 1 */ | ae(v) |
| if( j<NumCtusInTile[tileIdx]-1 ) | |
| byte_alignment( ) | |
| } | |
| } | |
| if( !entropy_coding_sync_enabled_flag ) { | |
| **end_of_tile_one_bit** /* equal to 1 */ | ae(v) |
| if( i<num_tiles_in_tile_group_minus1 ) | |
| byte_alignment( ) | |
| } | |
| } | |
| } | |

FIG. 25

| pic_parameter_set_rbsp( ) { | Descriptor |
|---|---|
| **pps_pic_parameter_set_id** | ue(v) |
| **pps_seq_parameter_set_id** | ue(v) |
| **transform_skip_enabled_flag** | u(1) |
| **single_tile_in_pic_flag** | u(1) |
| if( !single_tile_in_pic_flag ) { | |
| **num_tile_columns_minus1** | ue(v) |
| **num_tile_rows_minus1** | ue(v) |
| **uniform_tile_spacing_flag** | u(1) |
| if( !uniform_tile_spacing_flag ) { | |
| for( i = 0; i < num_tile_columns_minus1; i++ ) | |
| **tile_column_width_minus1**[ i ] | ue(v) |
| for( i = 0; i < num_tile_rows_minus1; i++ ) | |
| **tile_row_height_minus1**[ i ] | ue(v) |
| } | |
| **single_tile_per_tile_group_flag** | u(1) |
| if(!single_tile_per_tile_group_flag ) | |
| **rect_tile_group_flag** | u(1) |
| if( rect_tile_group_flag && !single_tile_per_tile_group_flag ) { | |
| **num_tile_groups_in_pic_minus1** | ue(v) |
| for( i = 0; i <= num_tile_groups_in_pic_minus1; i++ ) { | |
| if( i > 0) | |
| **top_left_tile_idx**[ i ] | u(v) |
| **bottom_right_tile_idx**[ i ] | u(v) |
| } | |
| } | |
| **loop_filter_across_tiles_enabled_flag** | u(1) |
| } | |
| if( rect_tile_group_flag ) { | |
| **signalled_tile_group_id_flag** | u(1) |
| if( signalled_tile_group_id_flag ) { | |
| **signalled_tile_group_id_length_minus1** | ue(v) |
| for( i = 0; i <= num_tile_groups_in_pic_minus1; i++ ) | |
| **tile_group_id**[ i ] | u(v) |
| } | |
| rbsp_trailing_bits( ) | |
| } | |

FIG. 28

| tile_group_header( ) { | Descriptor |
|---|---|
| **tile_group_pic_parameter_set_id** | ue(v) |
| if( !rect_tile_group_flag \|\| NumTilesInPic > 1 ) | |
| **tile_group_address** | u(v) |
| if( !rect_tile_group_flag && !single_tile_per_tile_group_flag ) | |
| **num_tiles_in_tile_group_minus1** | ue(v) |
| **tile_group_type** | ue(v) |
| if ( tile_group_type != I ) { | |
| ... | |
| } | |
| **dep_quant_enabled_flag** | u(1) |
| if( !dep_quant_enabled_flag ) | |
| **sign_data_hiding_enabled_flag** | u(1) |
| NumTilesInCurrTileGroup = rect_tile_group_flag ? NumTilesInTileGroup[ tileGroupIdx ] : (num_tiles_in_tile_group_minus1 + 1) | |
| NumEntryPoint = entropy_coding_sync_enabled_flag ? TileGroupHeightInCtbsY-1 : NumTilesInCurrTileGroup - 1 | |
| if(NumEntryPoint > 0) { | |
| **offset_len_minus1** | ue(v) |
| for( i = 0; i < NumEntryPoint; i++ ) | |
| **entry_point_offset_minus1[ i ]** | u(v) |
| } | |
| byte_alignment( ) | |
| } | |

SYN_ENTRY_POINT

FIG. 29

| tile_group_header( ) { | Descriptor |
|---|---|
| **tile_group_pic_parameter_set_id** | ue(v) |
| if( !rect_tile_group_flag \|\| NumTilesInPic > 1 ) | |
| **tile_group_address** | u(v) |
| if( !rect_tile_group_flag && !single_tile_per_tile_group_flag ) | |
| **num_tiles_in_tile_group_minus1** | ue(v) |
| **tile_group_type** | ue(v) |
| if ( tile_group_type != I ) { | |
| ... | |
| } | |
| **dep_quant_enabled_flag** | u(1) |
| if( !dep_quant_enabled_flag ) | |
| **sign_data_hiding_enabled_flag** | u(1) |
| NumTilesInCurrTileGroup = rect_tile_group_flag ? NumTilesInTileGroup[ tileGroupIdx ] : (num_tiles_in_tile_group_minus1 + 1) | |
| if (NumTilesInCurrTileGroup == 1) | |
| **entropy_coding_sync_enabled_flag** | u(1) |
| NumEntryPoint = entropy_coding_sync_enabled_flag ? TileGroupHeightInCtbsY-1 : NumTilesInCurrTileGroup - 1 | |
| if(NumEntryPoint > 0) { | |
| **offset_len_minus1** | ue(v) |
| for( i = 0; i < NumEntryPoint; i++ ) | |
| **entry_point_offset_minus1**[ i ] | u(v) |
| } | |
| byte_alignment( ) | |
| } | |

SYN_ENTRY_POINT

SYN_ENTRY_POINT

FIG. 31

| tile_group_header( ) { | Descriptor |
|---|---|
| **tile_group_pic_parameter_set_id** | ue(v) |
| if( !rect_tile_group_flag \|\| NumTilesInPic > 1 ) | |
| **tile_group_address** | u(v) |
| if( !rect_tile_group_flag && !single_tile_per_tile_group_flag ) | |
| **num_tiles_in_tile_group_minus1** | ue(v) |
| **tile_group_type** | ue(v) |
| ... | |
| NumTilesInCurrTileGroup = rect_tile_group_flag ? NumTilesInTileGroup[ tileGroupIdx ] : (num_tiles_in_tile_group_minus1 + 1) | |
| if (single_tile_in_pic_flag \|\| rect_tile_group_flag \|\| NumTilesInCurrTileGroup == 1) | |
| **entropy_coding_sync_enabled_flag** | u(1) |
| NumEntryPoint = entropy_coding_sync_enabled_flag ? (NumTileColumnsInTileGroupMinus1 + 1) * TileGroupHeightInCtbsY -1 : NumTilesInCurrTileGroup – 1 | |
| if( NumEntryPoint>0 ) { | |
| **offset_len_minus1** | ue(v) |
| for( i = 0; i < NumEntryPoint; i++ ) | |
| **entry_point_offset_minus1**[ i ] | u(v) |
| } | |
| byte_alignment( ) | |
| } | |

SYN_WPP_FLAG

SYN_ENTRY_POINT

FIG. 33

| tile_group_header( ) { | Descriptor |
|---|---|
| **tile_group_pic_parameter_set_id** | ue(v) |
| if( !rect_tile_group_flag \|\| NumTilesInPic > 1 ) | |
| **tile_group_address** | u(v) |
| if( !rect_tile_group_flag && !single_tile_per_tile_group_flag ) | |
| **num_tiles_in_tile_group_minus1** | ue(v) |
| **tile_group_type** | ue(v) |
| ... | |
| NumTilesInCurrTileGroup = rect_tile_group_flag ? NumTilesInTileGroup[ tileGroupIdx ] : (num_tiles_in_tile_group_minus1 + 1) | |
| if (single_tile_in_pic_flag \|\| rect_tile_group_flag ) | |
| **entropy_coding_sync_enabled_flag** | u(1) |
| NumEntryPoint = entropy_coding_sync_enabled_flag ? (NumTileColumnsInTileGroupMinus1 + 1) * TileGroupHeightInCtbsY -1 : NumTilesInCurrTileGroup – 1 | |
| if( NumEntryPoint>0 ) { | |
| **offset_len_minus1** | ue(v) |
| for( i = 0; i < NumEntryPoint; i++ ) | |
| **entry_point_offset_minus1**[ i ] | u(v) |
| } | |
| byte_alignment( ) | |
| } | |

SYN_WPP_FLAG

SYN_ENTRY

FIG. 34

| tile_group_header( ) { | Descriptor |
|---|---|
| **tile_group_pic_parameter_set_id** | ue(v) |
| if( !rect_tile_group_flag \|\| NumTilesInPic > 1 ) | |
| **tile_group_address** | u(v) |
| if( !rect_tile_group_flag && !single_tile_per_tile_group_flag ) | |
| **num_tiles_in_tile_group_minus1** | ue(v) |
| **tile_group_type** | ue(v) |
| if ( tile_group_type != I ) { | |
| ... | |
| } | |
| **dep_quant_enabled_flag** | u(1) |
| if( !dep_quant_enabled_flag ) | |
| **sign_data_hiding_enabled_flag** | u(1) |
| NumTilesInCurrTileGroup = rect_tile_group_flag ? NumTilesInTileGroup[ tileGroupIdx ] : (num_tiles_in_tile_group_minus1 + 1) | |
| if (single_tile_in_pic_flag \|\| rect_tile_group_flag \|\| NumTilesInCurrTileGroup == 1) | |
| **entropy_coding_sync_enabled_flag** | u(1) |
| NumEntryPoint = entropy_coding_sync_enabled_flag ? TileGroupHeightInCtbsY-1 : NumTilesInCurrTileGroup - 1 | |
| if(NumEntryPoint > 0) { | |
| **offset_len_minus1** | ue(v) |
| for( i = 0; i < NumEntryPoint; i++ ) | |
| **entry_point_offset_minus1**[ i ] | u(v) |
| } | |
| byte_alignment( ) | |
| } | |

SYN_WPP_FLAG

SYN_ENTRY

| tile_group_header( ) { | Descriptor |
|---|---|
| tile_group_pic_parameter_set_id | ue(v) |
| if( !rect_tile_group_flag \|\| NumTilesInPic > 1 ) | |
| tile_group_address | u(v) |
| if( !rect_tile_group_flag && !single_tile_per_tile_group_flag ) | |
| num_tiles_in_tile_group_minus1 | ue(v) |
| tile_group_type | ue(v) |
| ... | |
| NumTilesInCurrTileGroup = rect_tile_group_flag ? NumTilesInTileGroup[ tileGroupIdx ] : (num_tiles_in_tile_group_minus1 + 1) | |
| NumEntryPoint = entropy_coding_sync_enabled_flag ? TileGroupHeightInCtbsY-1 : NumTilesInCurrTileGroup - 1 | |
| if( NumEntryPoint>0 ) { | |
| offset_len_minus1 | ue(v) |
| for( i = 0; i < NumEntryPoint; i++ ) | |
| entry_point_offset_minus1[ i ] | u(v) |
| } | |
| byte_alignment( ) | |
| } | |

SYN_ENTRY (b)

| tile_group_header( ) { | Descriptor |
|---|---|
| tile_group_pic_parameter_set_id | ue(v) |
| if( !rect_tile_group_flag \|\| NumTilesInPic > 1 ) | |
| tile_group_address | u(v) |
| if( !rect_tile_group_flag && !single_tile_per_tile_group_flag ) | |
| num_tiles_in_tile_group_minus1 | ue(v) |
| tile_group_type | ue(v) |
| ... | |
| NumTilesInCurrTileGroup = rect_tile_group_flag ? NumTilesInTileGroup[ tileGroupIdx ] : (num_tiles_in_tile_group_minus1 + 1) | |
| NumEntryPoint = entropy_coding_sync_enabled_flag ? (NumTileColumnsInTileGroupMinus1 + 1) * TileGroupHeightInCtbsY - 1: NumTilesInCurrTileGroup - 1 | |
| if( NumEntryPoint>0 ) { | |
| offset_len_minus1 | ue(v) |
| for( i = 0; i < NumEntryPoint; i++ ) | |
| entry_point_offset_minus1[ i ] | u(v) |
| } | |
| byte_alignment( ) | |
| } | |

SYN_ENTRY

FIG. 41

| pic_parameter_set_rbsp( ) { | Descriptor | |
|---|---|---|
| pps_pic_parameter_set_id | ue(v) | |
| pps_seq_parameter_set_id | ue(v) | |
| transform_skip_enabled_flag | u(1) | |
| single_tile_in_pic_flag | u(1) | |
| if( !single_tile_in_pic_flag ) { | | |
| num_tile_columns_minus1 | ue(v) | |
| num_tile_rows_minus1 | ue(v) | |
| uniform_tile_spacing_flag | u(1) | |
| if( !uniform_tile_spacing_flag ) { | | |
| for( i = 0; i < num_tile_columns_minus1; i++ ) | | |
| tile_column_width_minus1[ i ] | ue(v) | |
| for( i = 0; i < num_tile_rows_minus1; i++ ) | | |
| tile_row_height_minus1[ i ] | ue(v) | |
| } | | |
| single_tile_per_tile_group_flag | u(1) | |
| if( !single_tile_per_tile_group_flag ) | | |
| rect_tile_group_flag | u(1) | |
| if( rect_tile_group_flag && !single_tile_per_tile_group_flag ) { | | SYN_RECT_TILE_INFO |
| num_tile_groups_in_pic_minus1 | ue(v) | |
| for( i = 0; i <= num_tile_groups_in_pic_minus1; i++ ) { | | |
| if( i > 0 ) | | |
| top_left_tile_idx[ i ] | u(v) | |
| bottom_right_tile_idx[ i ] | u(v) | |
| } | | |
| } | | |
| loop_filter_across_tiles_enabled_flag | u(1) | |
| } | | |
| entropy_coding_sync_enabled_flag | u(1) | SYN_WPP_FLAG |
| if( rect_tile_group_flag ) { | | |
| signalled_tile_group_id_flag | u(1) | |
| if( signalled_tile_group_id_flag ) { | | |
| signalled_tile_group_id_length_minus1 | ue(v) | |
| for( i = 0; i <= num_tile_groups_in_pic_minus1; i++ ) | | |
| tile_group_id[ i ] | u(v) | |
| } | | |
| rbsp_trailing_bits( ) | | |
| } | | |

FIG. 42

VIDEO CODING APPARATUS AND VIDEO DECODING APPARATUS

TECHNICAL FIELD

Embodiments of the present invention relate to a video decoding apparatus and a video coding apparatus.

BACKGROUND ART

A video coding apparatus which generates coded data by coding a video, and a video decoding apparatus which generates decoded images by decoding the coded data are used for efficient transmission or recording of videos.

Specific video coding schemes include, for example, H.264/AVC and High-Efficiency Video Coding (HEVC), and the like.

In such a video coding scheme, images (pictures) constituting a video are managed in a hierarchical structure including slices obtained by splitting an image, Coding Tree Units (CTUs) obtained by splitting a slice, units of coding (Coding Units; which will be referred to as CUs) obtained by splitting a coding tree unit, and Transform Units (TUs) obtained by splitting a coding unit, and are coded/decoded for each CU.

In such a video coding scheme, usually, a prediction image is generated based on a local decoded image that is obtained by signaling an input image (a source image), and prediction errors (which may be referred to also as "difference images" or "residual images") obtained by subtracting the prediction image from the input image are coded. Generation methods of prediction images include an inter-picture prediction (inter prediction) and an intra-picture prediction (intra prediction).

As a method of splitting a picture into multiple units and transmitting the picture, methods of splitting a picture into slices, CTU rows (wavefront parallel), and tiles are known. Hereinafter, these are referred to as segments.

NPL 1 is cited as a technique of video coding and decoding in recent years, NPL 2 discloses a tile group technology, and NPL 3 discloses specific syntax examples of tile group. NPL 4 discloses rectangular tile group called rectangle tile.

NPL 5 discloses a wavefront parallelization technique in a substream (hereinafter referred to as a tile group) in which multiple tiles are combined into one.

CITATION LIST

Non Patent Literature

NPL 1: "Versatile Video Coding (Draft 4)", JVET-M1001-v6, Joint Video Exploration Team (JVET) of ITU-T SG 16 WP 3 and ISO/IEC JTC 1/SC 29/WG 11, 2019 Mar. 9

NPL 2: "Tile groups for VVC", JVET-L0415, Joint Video Exploration Team (JVET) of ITU-T SG 16 WP 3 and ISO/IEC JTC 1/SC 29/WG 11, 2018 Sep. 25

NPL 3: "Spec text for the agreed starting point on slicing and tiling", JVET-L0686, Joint Video Exploration Team (JVET) of ITU-T SG 16 WP 3 and ISO/IEC JTC 1/SC 29/WG 11, 2018 Oct. 12

NPL 4: "AHG12: On Tile Grouping", JVET-M0853, Joint Video Exploration Team (JVET) of ITU-T SG 16 WP 3 and ISO/IEC JTC 1/SC 29/WG 11, 2019 Jan. 12

NPL 5: "AHG12: Wavefront processing in a tile group", JVET-M0070-v1, Joint Video Exploration Team (JVET) of ITU-T SG 16 WP 3 and ISO/IEC JTC 1/SC 29/WG 11, 2019 Jan. 3

SUMMARY OF INVENTION

Technical Problem

HEVC supports tiles that split a picture into rectangles, Wavefront Parallel Processing (WPP) that splits a picture into CTU rows, and slices that split a picture into a set of continuous CTUs, but there is a problem in that processing becomes complex because the uses of tiles, wavefront, and slices are not exclusive in one region. Because HEVC does not support tile groups such as in NPLs 2 and 3, in a case of using tiles and wavefront parallelization, there is a problem in that the entry points indicating the start positions of the coded data are coded only in picture units, and the picture cannot be coded in split group units.

For the tiles described in NPL 2 and NPL 3, tiles can be signaled in group units, but there is a problem in that wavefront parallel processing that achieves high efficiency and high degree of parallelism or slices that enable delimiter positions of segments at arbitrary positions other than rectangle are not supported. The type of segments also cannot be switched in tile group units.

The tiles described in NPL 2 and NPL 3 define a method for splitting tiles in picture units, so it is not possible to change the width and the height of the tiles in picture group units.

NPL 5 discloses a method of wavefront parallelization in a tile group, but does not disclose a case that a tile group is defined in PPS as described in NPL 1, and it is not possible to achieve wavefront parallelization suitable for a case of defining a tile group in PPS.

Thus, the present invention has been made in view of the above problems, and an object of the present invention is to simplify and improve the efficiency of the coding processing and the decoding processing by exclusively using tiles, wavefront, and slices in a tile group. An object of the present invention is also to change the width and the height of tiles in picture group units.

Solution to Problem

A video decoding apparatus according to an aspect of the present invention is a video decoding apparatus for decoding coded data of a tile group in which a picture is split into one or more rectangular regions, the tile group being composed of one or more segments, the video decoding apparatus including: a header decoder configured to decode the number of tiles in a target tile group, a WPP enabled flag, and a slice enabled flag indicating whether segments in the target tile group are rectangular tiles, CTU rows with a height of one CTU, or slices in CTU units from a tile group header, wherein the header decoder is configured to decode only one of the number of tiles being two or more, the WPP enabled flag being 1, and the slice enabled flag being 1 in one tile group.

BRIEF DESCRIPTION OF DRAWINGS

FIG. 8 is a diagram illustrating tile groups according to the present embodiment.

FIG. 11 is a syntax table for tile information and the like.

FIG. 12 is a diagram illustrating a syntax configuration of a tile group according to the present embodiment.

FIG. 13 is a diagram illustrating tile groups according to the present embodiment.

FIG. 14 is a diagram illustrating a syntax configuration of a picture parameter set according to the present embodiment.

FIG. 18 is a diagram illustrating a syntax configuration of a tile group according to the present embodiment.

FIG. 19 is a diagram illustrating a syntax configuration of a tile group according to the present embodiment.

FIG. 20 is a diagram illustrating an exclusive configuration of tile segments and slice segments.

FIG. 21 is a diagram illustrating a syntax configuration of a tile group according to the present embodiment.

FIG. 22 is a diagram illustrating an exclusive configuration of tile segments, CTU row segments, and slice segments.

FIG. 23 is a diagram illustrating a syntax configuration of a tile group according to the present embodiment.

FIG. 25 is a diagram illustrating a syntax configuration of a tile group according to the present embodiment.

FIG. 28 is a diagram illustrating a syntax configuration of a parameter set according to one form of the present embodiment.

FIG. 29 is a diagram illustrating a syntax configuration of a tile group header including a rectangular tile group.

FIG. 31 is a diagram illustrating a syntax configuration of a tile group header according to one form of the present embodiment.

FIG. 33 is a diagram illustrating a syntax configuration of a tile group header according to one form of the present embodiment.

FIG. 34 is a diagram illustrating a syntax configuration of a tile group header according to one form of the present embodiment.

FIG. 39 is a diagram illustrating a syntax configuration of a tile group header according to one form of the present embodiment.

FIG. 41 is a diagram illustrating a syntax configuration of a tile group header according to one form of the present embodiment.

FIG. 42 is a diagram illustrating a syntax configuration of a picture parameter set according to one form of the present embodiment.

DESCRIPTION OF EMBODIMENTS

First Embodiment

In the following, embodiments of the present invention will be described with reference to the drawings.

Figure 1:
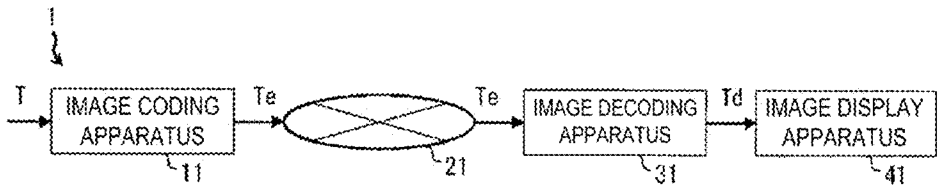
FIG. 1 is a schematic diagram illustrating a configuration of an image transmission system according to the present embodiment.

FIG. 1 is a schematic diagram illustrating a configuration of an image transmission system 1 according to the present embodiment.

The image transmission system 1 is a system in which a coding stream obtained by coding a coding target image is transmitted, the transmitted coding stream is decoded, and thus an image is displayed. The image transmission system 1 includes a video coding apparatus (image coding apparatus) 11, a network 21, a video decoding apparatus (image decoding apparatus) 31, and a video display apparatus (image display apparatus) 41.

An image T is input to the video coding apparatus 11.

The network 21 transmits a coding stream Te generated by the video coding apparatus 11 to the video decoding apparatus 31. The network 21 is the Internet, a Wide Area Network (WAN), a Local Area Network (LAN), or a combination thereof. The network 21 is not necessarily limited to a bidirectional communication network, and may be a unidirectional communication network configured to transmit broadcast waves of digital terrestrial television broadcasting, satellite broadcasting, or the like. The network 21 may be substituted by a storage medium in which the coding stream Te is recorded, such as a Digital Versatile Disc (DVD: trade name) or a Blue-ray Disc (BD: trade name).

The video decoding apparatus 31 decodes each of the coding streams Te transmitted from the network 21 and generates one or more decoded images Td.

The video display apparatus 41 displays all or part of one or more decoded images Td generated by the video decoding apparatus 31. For example, the video display apparatus 41 includes a display device such as a liquid crystal display and an organic Electro-Luminescence (EL) display. Forms of the display include a stationary type, a mobile type, an HMD type, and the like. In a case that the video decoding apparatus 31 has a high processing capability, an image having high image quality is displayed, and in a case that the apparatus has a lower processing capability, an image which does not require high processing capability and display capability is displayed.

Operator

Operators used in the present specification will be described below.

>> is a right bit shift, << is a left bit shift, & is a bitwise AND, | is a bitwise OR, |= is an OR assignment operator, and || indicates a logical sum.

x? y:z is a ternary operator to take y in a case that x is true (other than 0) and take z in a case that x is false (0).

Clip3(a, b, c) is a function to clip c in a value equal to or greater than a and less than or equal to b, and a function to return a in a case that c is less than a (c<a), return b in a case that c is greater than b (c>b), and return c in other cases (provided that a is less than or equal to b (a<=b)).

abs (a) is a function that returns the absolute value of a.

Int (a) is a function that returns the integer value of a.

floor (a) is a function that returns the maximum integer equal to or less than a.

ceil (a) is a function that returns the minimum integer equal to or greater than a.

a/d represents division of a by d (round down decimal places).

Structure of Coding Stream Te

Prior to the detailed description of the video coding apparatus 11 and the video decoding apparatus 31 according to the present embodiment, a data structure of the coding stream Te generated by the video coding apparatus 11 and decoded by the video decoding apparatus 31 will be described.

Figure 4:
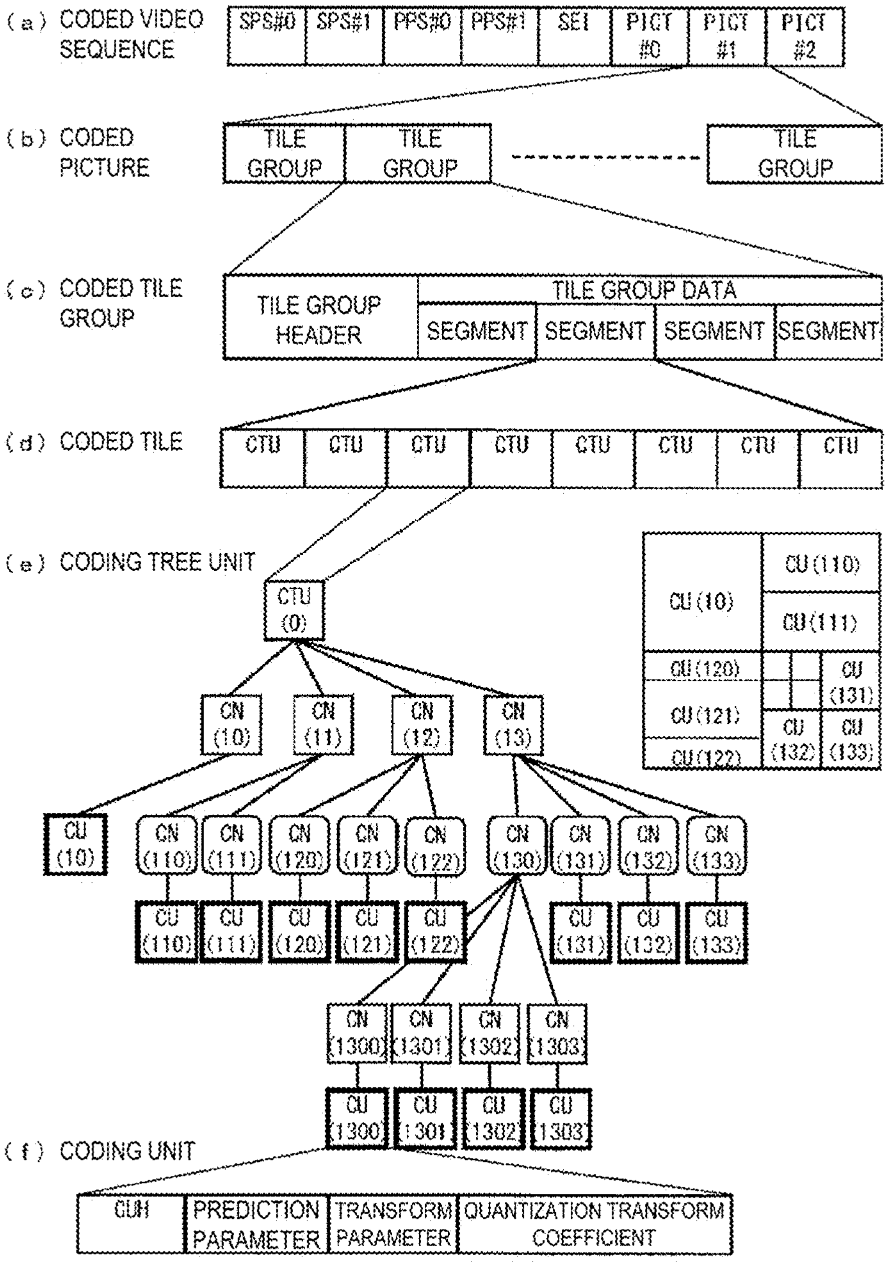
FIG. 4 is a diagram illustrating a hierarchical structure of data of a coding stream.

FIG. 4 is a diagram illustrating a hierarchical structure of data of the coding stream Te. The coding stream Te includes a sequence and multiple pictures constituting the sequence illustratively. FIGS. 4(*a*) to 4(*f*) are diagrams illustrating a coded video sequence defining a sequence SEQ, a coded picture prescribing a picture PICT, a coded tile group prescribing a tile group, a segment prescribing a tile (for example. a coded tile, CTU row, slice), a coding tree unit included in the segment, and a coding unit included in the coding tree unit, respectively.

Coded Video Sequence

In the coded video sequence, a set of data referred to by the video decoding apparatus 31 to decode the sequence SEQ to be processed is defined. As illustrated in FIG. 4(*a*), the sequence SEQ includes a Sequence Parameter Set SPS, a Picture Parameter Set PPS, a picture PICT, and Supplemental Enhancement Information SEI.

In the sequence parameter set SPS, a set of coding parameters referred to by the video decoding apparatus 31 to decode a target sequence is defined. For example, information about the width, height, and shape of the picture and information about turning a decoding tool on and off are defined. Note that multiple SPSs may exist. In that case, any of the multiple SPSs is selected from the PPS.

In the picture parameter set PPS, a set of coding parameters referred to by the video decoding apparatus 31 to decode each picture in a target sequence is defined. For example, information about the number, width, and height of the tiles constituting the picture are included. Note that multiple PPSs may exist. In that case, any of the multiple PPSs is selected from each picture in a target sequence.

Coded Picture

In the coded picture, a set of data referred to by the video decoding apparatus 31 to decode the picture PICT to be processed is defined. As illustrated in FIG. 4(*b*), the picture PICT includes tile group 0 to tile group NTG−1 (NTG is the total number of tiles included in the picture PICT).

Segment and Tile Group

A segment is a unit for splitting and transmitting a picture, and is coded and decoded as a byte-aligned bit string on the coded data.

Each of a tile, a CTU row, and a slice is a segment for splitting and transmitting a picture.

A segment group (tile group) is a group of segments that are sets of CTUs, and may be referred to as a segment group. Note that each of the segments is a unit provided with the following characteristics and can be decoded in parallel.

- Corresponding to a set of CTUs on the picture
- Aligned in byte units on coded data
- Perform CAB AC initialization at the beginning of the segment
- Prediction can be limited between segments in the same picture (references to other segments can be limited)

The limitation of the prediction is to apply a limitation such that, for example, in the case that the segment is a tile, no intra prediction is performed using images of tiles different from the target tile. Similarly, in a case that the segment is a slice, the limitation is applied such that no intra prediction is performed using images of slices different from the target slice.

In a case that the segment is WPP, some intra prediction using images of different CTU rows from the target CTU row is allowed. Specifically, in the WPP, reference can be made to the CTU rows above the target CTU row. However, in the CTU rows above the target CTU row, reference cannot be made to the CTUs that exceed the horizontal coordinates of the target CTU. The reference may be turned on or off by the flag.

In the tile group (segment group), a header common to the segments is coded only once in the segments, thereby achieving an effect of improving the coding efficiency.

Figure 5:
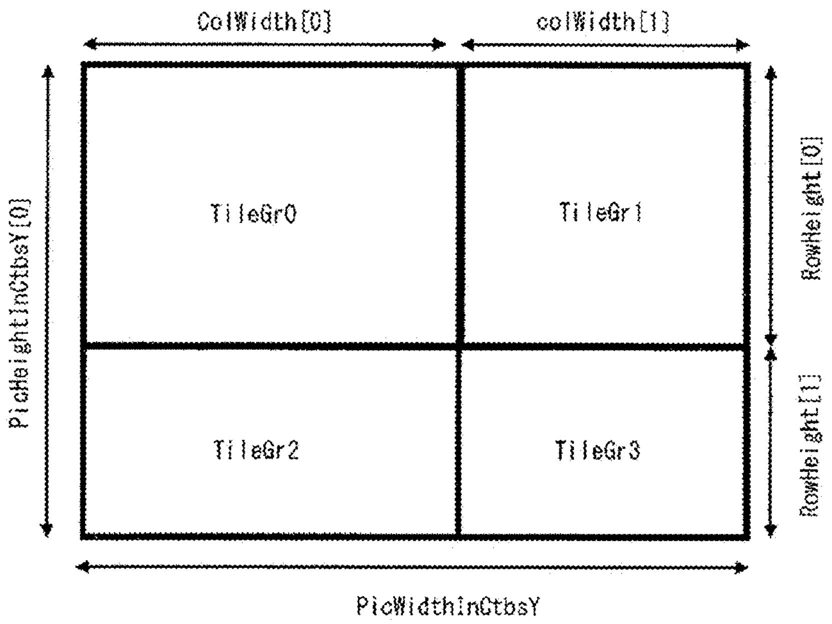
FIG. 5 is a diagram illustrating a split example of a picture.

FIG. 5 is a diagram of a picture split into four tile groups TileGr0 to TileGr3. The tile groups may be further split into one or more segments. The numbers after TileGr (0 to 3 in the figure) are the identifiers of the tile groups and are configured in raster scan order from top left to bottom right of the picture. Tile group identifiers are different values for each tile group and are values that monotonically increase in scan order.

Figure 6:
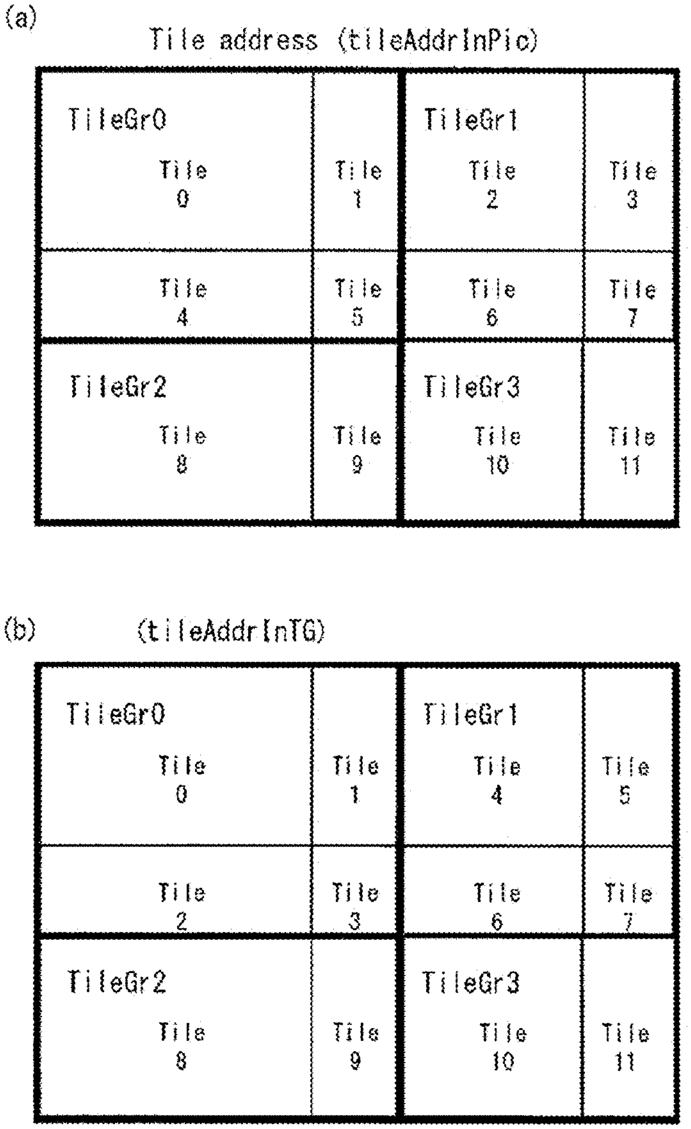
FIG. 6 is a diagram illustrating tile groups.

FIG. 6(*a*) is a diagram illustrating tile addresses in a case that the segments are tiles. The numbers after Tile in the figure are the addresses of the tiles in the picture (TileAddrinPic). TileAddrinPic is configured in raster scan order from top left to bottom right of the picture. The tile group TileGr0 of the figure includes tiles Tile0, Tile1, Tile4, and Tile5. TileGr1 includes Tile2, Tile3, Tile6, and Tile7. TileGr2 includes Tile8 and Tile9. TileGr3 includes Tile10 and Tile11. In a case of using TileAddrinPic as the tile address, tile addresses are not continuous within the tile group.

FIG. 6(*b*) is another diagram illustrating tile addresses in a case that the segments are tiles. The numbers after Tile in the figure are the addresses of the tiles in the tile group (TileAddrinTG). TileAddrinTG is configured in raster scan order from top left to bottom right of the tile group. The tile group TileGr0 of the figure includes tiles Tile0, Tile1, Tile2, and Tile3. TileGr1 includes Tile4, Tile5, Tile6, and Tile7. TileGr2 includes Tile8 and Tile9. TileGr3 includes Tile10 and Tile11. In a case of using TileAddrinTG as the tile address, tile addresses are continuous within the tile group.

Coded Tile Group

In the coded tile group, a set of data referred to by the video decoding apparatus 31 to decode the tile group to be processed is defined. As illustrated in FIG. 4(*c*), a tile group includes a tile group header and tile group data. Furthermore, the tile group may include trailing data for byte alignment (rbsp_tile_group_trailing_bits) after the tile group data.

Figure 7:
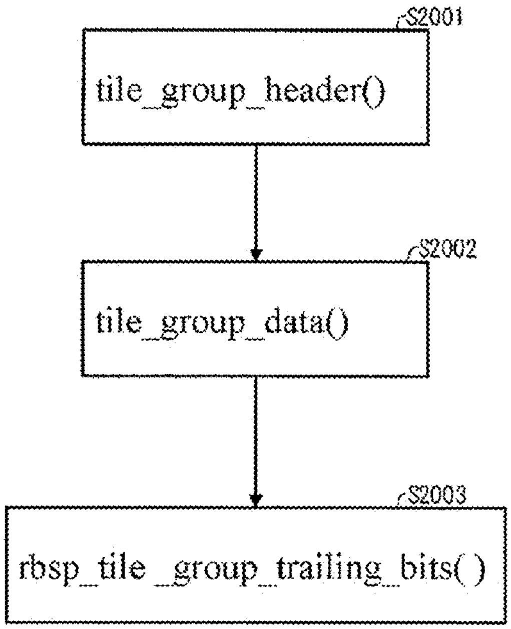
FIG. 7 is a flowchart illustrating coding or decoding of a tile group according to the present embodiment.
Figure 9:
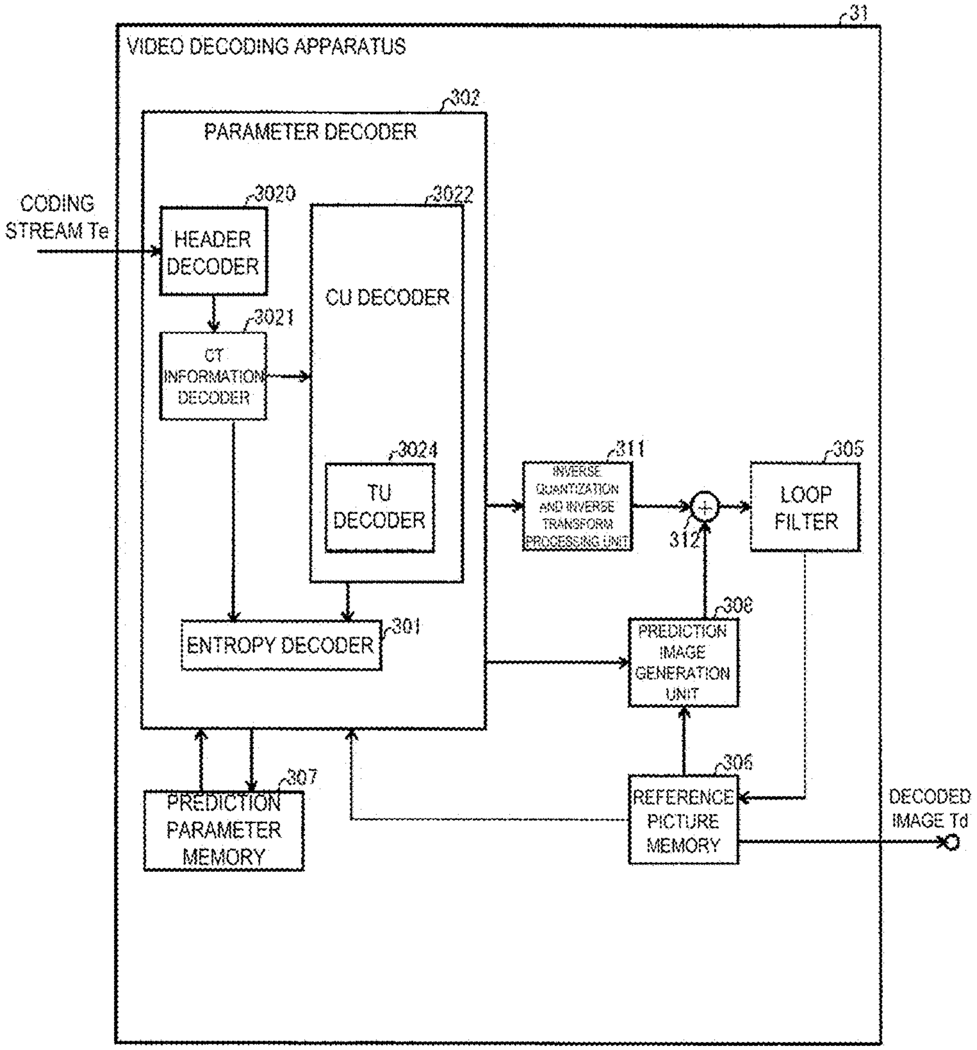
FIG. 9 is a schematic diagram illustrating a configuration of a video decoding apparatus.
Figure 24:
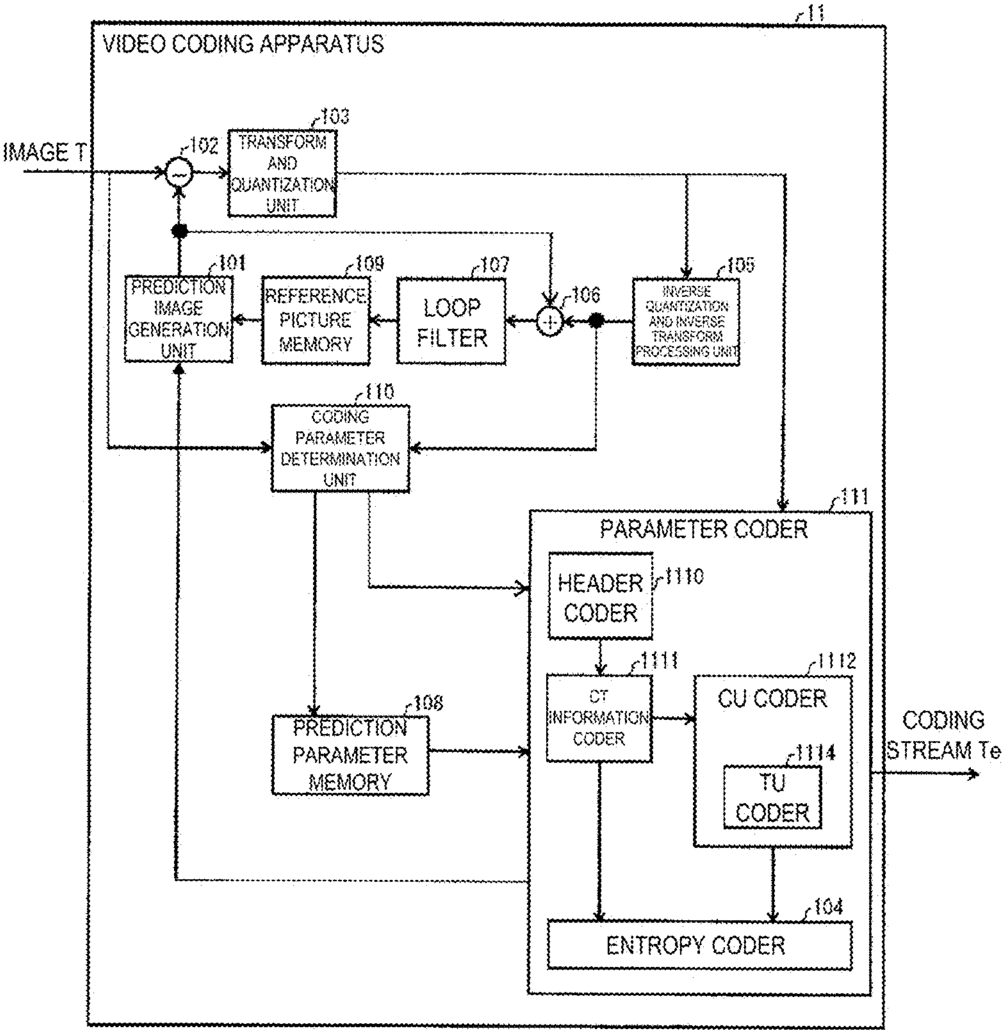
FIG. 24 is a block diagram illustrating a configuration of a video coding apparatus.

FIG. 7 is a flowchart illustrating coding or decoding of a tile group according to the present embodiment. The components for performing the steps are illustrated in FIG. 9 and FIG. 24, and will be described later.

S2001: A header coder 1110 or a header decoder 3020 codes or decodes the tile group header.

S2002: A CT information coder 1111 or a CT information decoder 3021 codes or decodes tile group data.

S2003: The header coder 1110 or the header decoder 3020 codes or decodes the trailing data. The trailing data may include a bit string for byte alignment. The trailing data may include a bit string that further indicates a delimiter before the byte alignment.

The tile group header includes a group of coding parameters for determining the method of decoding the target tile group and a parameter common to tiles of the tile group. The tile group data is composed of coded data of one or more segments included in the tile group. The segments are composed of CTUs. In a case that the segments are tiles, the tile group data is composed of one or more coded tiles.

Tile Group Header

The tile group header may include tile group type indication information (tile_group_type).

Examples of tile group types that can be indicated by the tile group type indication information include (1) I tile group using only an intra prediction in coding, (2) P tile group using a unidirectional prediction or an intra prediction in coding, and (3) B tile group using a unidirectional prediction, a bidirectional prediction, or an intra prediction in coding, and the like. Note that the inter prediction is not limited to a uni-prediction and a bi-prediction, and the prediction image may be generated by using a larger number of reference pictures. Hereinafter, in a case of being referred to as a P or B tile group, a tile group that includes a block in which the inter prediction can be used is indicated.

Note that the tile group header may include a reference to the picture parameter set PPS (tile_group_pic_parameter_set_id).

Coded Tile

In the coded tile, a set of data referred to by the video decoding apparatus 31 to decode the tile to be processed is defined. A tile includes CTUs as illustrated in FIG. 4(*d*). A CTU is a block of a fixed size (for example, 128×128) constituting a tile, and may be called a Largest Coding Unit (LCU).

Tile, WPP, and Slice

FIG. 8(*a*) is an example in which the tile group TileGr0 is split into multiple tiles Tile0 to Tile3 (rectangles with thick solid lines). A tile is a rectangular segment composed of one or more CTUs. The address of each CTU (CTU address ctbAddrTs of tile scan order) is configured in raster scan order from top left to bottom right of each tile.

FIG. 8(*b*) is an example of splitting a tile group into multiple CTU rows. As illustrated, a CTU row is a segment composed of a set of CTUs in one row (the height is the CTU height, the width is the segment width). As described below, segments of CTU rows are used in WPP.

FIG. 8(*c*) is an example of splitting a tile group into a set of continuous CTUs. As illustrated, a slice is a segment composed of a set of CTUs.

Coding Tree Unit

In FIG. 4(*e*), a set of data referred to by the video decoding apparatus 31 to decode the CTU to be processed is defined. The CTU is split into coding unit CUs, each of which is a basic unit of coding processing, by a recursive Quad Tree split (QT split), Binary Tree split (BT split), or Ternary Tree split (TT split). The BT split and the TT split are collectively referred to as a Multi Tree split (MT split). Nodes of a tree structure obtained by recursive quad tree splits are referred to as Coding Nodes. Intermediate nodes of a quad tree, a binary tree, and a ternary tree are coding nodes, and the CTU itself is also defined as the highest coding node.

Coding Unit

As illustrated in FIG. 4(*f*), a set of data referred to by the video decoding apparatus 31 to decode the coding unit to be processed is defined. Specifically, a CU includes a CU header, a prediction parameter, a transform parameter, a quantization transform coefficient, and the like. In the CU header, a prediction mode and the like are defined.

Configuration of Video Decoding Apparatus

The configuration of the video decoding apparatus 31 (FIG. 9) according to the present embodiment will be described.

The video decoding apparatus 31 includes a parameter decoder (a prediction image decoding apparatus) 302, a loop filter 305, a reference picture memory 306, a prediction parameter memory 307, a prediction image generation unit (prediction image generation device) 308, an inverse quantization and inverse transform processing unit 311, and an addition unit 312. Note that a configuration in which the loop filter 305 is not included in the video decoding apparatus 31 may be used in accordance with the video coding apparatus 11 described later. The parameter decoder 302 further includes an entropy decoder 301, a header decoder 3020, a CT information decoder 3021, and a CU decoder 3022, and the CU decoder 3022 further includes a TU decoder 3024.

Decoding Module

General operation of each module will be described below. The parameter decoder 302 performs decoding processing of parameters such as header information, split information, prediction information, and quantization transform coefficients.

The entropy decoder 301 decodes the syntax elements from the binary data. More specifically, the entropy decoder 301 decodes the syntax elements from the coded data by an entropy coding scheme such as CABAC based on the syntax elements input from the supply source and returns them to the supply source. In the example described below, the supply source of the syntax elements is the CT information decoder 3021 and the CU decoder 3022.

Basic Flow of Operation

Figure 10:
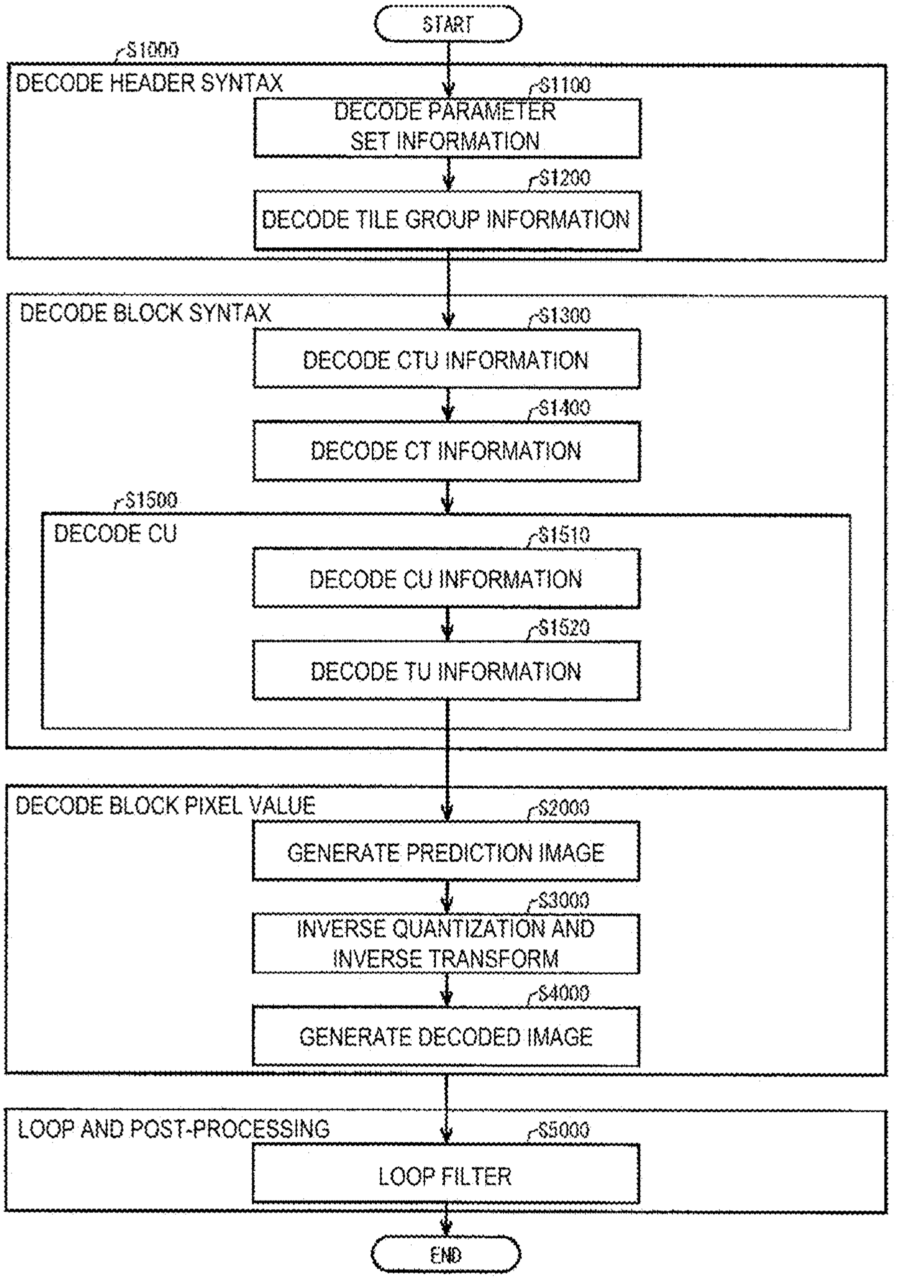
FIG. 10 is a flowchart illustrating a general operation of the video decoding apparatus.

FIG. 10 is a flowchart illustrating a general operation of the video decoding apparatus 31.

(S1100: Decoding of parameter set information) The header decoder 3020 decodes parameter set information and tile information such as the SPS and the PPS from coded data.

Information about the split number and size of the tiles is referred to as tile information. The width ColWidth and the height RowHeight of the tile are derived using the width PicWidthInCtbsY and the height PicHeightInCtbsY of the picture, and the numbers of tiles in the horizontal direction and the vertical direction NumTileColumns and NumTileRows in the picture. The unit of ColWidth, RowHeight, PicWidthInCtbsY, and PicHeightInCtbsY is CTU. The header decoder 3020 derives them from the following equations using the width pic_width_in_luma_samples and the height pic_height_in_luma_samples of the picture in pixel units, and the value obtained by subtracting 2 from the logarithmic value of the CTU size log2_ctu_size_minus2. pic_width_in_luma_samples, pic_height_in_luma_samples, and log2_ctu_size_minus2 are signaled in sequence_parameter_set_rbsp( ) (referred to as SPS) of FIG. 11(*a*). Hereinafter, "signaling" information means that one piece of information is included in the coded data (bit streams), where the information is coded by the video coding apparatus, or the information is decoded in the video decoding apparatus.

```
ctuWidth = ctuHeight = 1 << (log2_ctu_size_minus2 + 2)
PicWidthInCtbsY = Ceil (pic_width_in_luma_samples / ctuWidth)
PicHeightInCtbsY = Ceil (pic_height_in_luma_samples / ctuHeight)
```

The division (/) here is a decimal precision.

The numbers of tiles in the horizontal direction and the vertical direction NumTileColumns and NumTileRows in the picture are signaled by the PPS (pic_parameter_set_rbsp( )) of FIG. 11(*b*). For example, the tile information may be single_tile_in_pic_flag, num_tile_columns_minus1, num_tile_rows_minus1, uniform_tile_spacing_flag, tile_column_width_minus1[i], or tile_row_height_minus1[i]. Here, single_tile_in_pic_flag is a flag indicating whether or not there are multiple tiles in the picture, where 1 indicates that there is one tile in the picture, and the picture corresponds to the tile. 0 indicates that the picture includes multiple tiles. Each of num_tile_columns_minus1 and num_tile_rows_minus1 is a value obtained by subtracting 1 from the number of tiles in the horizontal direction and the vertical direction NumTileColumns and NumTileRows in the picture, respectively. uniform_spacing_flag is a flag indicating whether or not the picture is split into tiles as evenly as possible.

The header decoder 3020 derives the number of tiles in the horizontal direction and the vertical direction NumTileColumns and NumTileRows in the picture and the total number of tiles in the picture NumTilesInPic as follows.

```
NumTileColumns = num_tile_columns_minus1 + 1
NumTileRows = num_tile_rows_minus1 + 1
NumTilesInPic = NumTileColumns * NumTileRows
```

The header decoder 3020 may derive the tile size in the following equations.

```
for (m = 0; m < NumTileColumns; m++)
  ColWidth [m] = (m + 1) * PicWidthInCtbsY /
  NumTileColumns − m *
PicWidthInCtbsY / NumTileColumns
for (n = 0; n < NumTileRows; n++)
  RowHeight [n] = (n + 1) * PicHeightInCtbsY /
  NumTileRows − n *
PicHeightInCtbsY / NumTileRows
```

In a case that the value of uniform_spacing_flag is 0, the width and the height of each tile of the picture are configured separately. In the video coding apparatus, the width ColWidth [m] and the height RowHeight [n] of each tile are coded for each tile. The header decoder 3020 of the video decoding apparatus decodes ColWidth [m] and RowHeight [n] for each tile as described below.

```
ColWidth [m] = tile_column_width_minus1 [m] + 1 (0 <= m < NumTileColumns − 1)
  RowHeight [n] = tile_row_height_minus1 [m] + 1 (0 <= n < NumTileRows − 1)
  ColWidth [NumTileColumns − 1] = PicWidthInCtbsY − sum_m (ColWidth [m])
RowHeight [NumTileRows − 1] = PicHeightInCtbsY − sum_n (RowHeight [n])
  Here, sum_m (ColWidth [m]) represents the sum of ColWidth [m] (0 <= m <
NumTileColumns − 1), and sum_n (RowHeight [n]) represents the sum of RowHeight [n]
(0 <= n < NumTileRows − 1).
```

(S1200: Decoding of tile group information) The header decoder 3020 decodes the tile group header (tile group information) from the coded data.

FIG. 12(*a*) is a syntax indicating the tile group header of the coded tile group. In the tile group header, tile_group_pic_parameter_set_id, tile_group_address, num_tiles_in_tile_group_minus1, tile_group_type, and entry_point( ) are signaled. tile_group_pic_parameter_set_id indicates the picture parameter set identifier pps_pic_parameter_set_id of the picture in which the tile group is included. tile_group_address indicates the tile address of the first tile in the tile group, and is a value ranging from 0 to NumTilesInPic−1. tile_group_address of tile groups included in the same picture are different values from each other. num_tiles_in_tile_group_minus1+1 indicates the number of tiles in the tile group. tile_group_type indicates the coding type of the tile group (I tile group, P tile group, or B tile group). entry_point( ) is the syntax of the entry point, and an example is illustrated in FIG. 12(*b*).

The parameter decoder 302 first decodes tile_group_pic_parameter_set_id. Next, in a case that the number of tiles in the tile group NumTilesInPic is greater than one, tile_group_address and num_tiles_in_tile_group_minus1 are decoded. Otherwise (in a case of NumTilesInPic==1), each of tile_group_address and num_tiles_in_tile_group_minus1 is set equal to 0. Then tile_group_type is decoded.

In a case that the tile group includes multiple tiles (num_tiles_in_tile_group_minus1>0), the parameter decoder 302 decodes offset_len_minus1 and NumEntry-Point of entry points entry_point_offset_minus1 [i]. In a case that the segments are tiles, NumEntryPoint is set equal to num_tiles_in_tile_group_minus1. In a case that there is one tile in the tile group (num_tiles_in_tile_group_minus1=0), then the parameter decoder 302 does not decode the entry point.

The entry point is the starting address of the segment in the coded data (for example, the offset position in byte units with the start point on the coded data of the tile group header to which the target segment belongs or the start point of the preceding segment as the zero point), and is the starting address of each tile in a case that the segment is a tile. entry_point_offset_minus1 [i]+1 may be the difference value between the (i+1)-th entry point and the ith entry point in the coded data. The 0th entry point is the starting address of the tile group header (position of the tile group header start point, that is, zero point) and is not signaled. offset_len_minus1+1 is the number of bits representing entry_point_offset_minus1 [i].

In a case that the offset position in byte units with the start point on the coded data of the tile group header to which the target segment belongs as the zero point is denoted as firstByte [k], and the offset position in byte units at the end of the segment is denoted as lastByte [k], entry_point_offset_minus1 [i] can be derived as follows.

$$firstByte[k]=\Sigma(entry\_point\_offset\_minus1[n-1]+1)$$

Σ represents the sum from n=1 to k.

Afterwards, the video decoding apparatus 31 repeats the processing from S1300 to S5000 for each CTU included in the target picture, and thereby derives a decoded image of each CTU.

(S1300: Decoding of CTU information) The CT information decoder 3021 decodes the CTU from the coded data. Coding Tree (CT) information includes the split information of the coding tree.

FIG. 12(*c*) is an example of a syntax of tile group data for the coded tile group. In the tile group data, the CTU data coding_tree_unit( ) of the tile group is coded or decoded, and the fixed value segment end bit end_of_tile_one_bit is coded or decoded at the end of the segment.

The CT information decoder 3021 decodes the fixed value end_of_tile_one_bit in the CTU at the end of the tile (bottom right of tile) in a case that the segment is a tile, and decodes the bit string byte_alignment( ) for byte alignment. Note that the decoding of byte_alignment( ) may be limited to a case that i is smaller than num_tiles_in_tile_group_minus1. That is, in the last segment in the tile group (i==num_tiles_in_tile_group_minus1), the decoding of byte_alignment( ) may be omitted to subsequently decode the trailing data for byte alignment.

The CT information decoder 3021 sets tile_group_address to tileIdx. tileIdx is the tile identifier, and tile_group_address is the tile address of the first tile in the tile group. To identify each tile of the tile group using tileIdx, the CT information decoder 3021 increments tileIdx by 1 every time the tile is processed.

The CT information decoder 3021 uses tileIdx and FirstCtbAddrTs[ ] to derive the CTU address ctbAddrTs in tile scan order in the tile in the following equation. Tile scan is a scan method that proceeds in the tile from top left to bottom right of the tile in order.

$$ctbAddrTs=FirstCtbAddrTs[tileIdx]$$

FirstCtbAddrTs[ ] is a table that transforms tileIdx to the first CTU address of the tile, which is derived as follows.

```
for (ctbAddrTs = 0, tileIdx = 0, tileStartFlag = 1; ctbAddrTs <
  PicSizeInCtbsY;
ctbAddrTs++) {
   if (tileStartFlag) {
    FirstCtbAddrTs [tileIdx] = ctbAddrTs
    tileStartFlag = 0
   }
      tileEndFlag = (ctbAddrTs = = PicSizeInCtbsY - 1) ||
      (TileId [ctbAddrTs + 1] !=
TileId [ctbAddrTs])
   if (tileEndFlag) {
    tileIdx++
    tileStartFlag = 1
   }
}
```

Here, TileId[ ] is a table for transforming the CTU address in tile scan order to a tile identifier. An example is illustrated below.

```
for (j = 0, tileIdx = 0; j <= num_tile_rows_minus1; j++)
 for (i = 0; i <= num_tile_columns_minus1; 1++, tileIdx++)
  for (y = RowBd [j]; y < RowBd [j + 1]; y++)
    for (x = ColBd [i]; x < ColBd [i + 1]; x++)
     TileId [CtbAddrRsToTs [y * PicWidthInCtbsY + x]] = TileIdx
```

Here, RowBD[ ] and ColBD[ ] are tables for storing the vertical maximum coordinates of each tile row and the horizontal maximum coordinates of each tile column, and are expressed in CTU units. An example is illustrated below.

```
For (RowBd [0] = 0, j = 0; j <= num_tile_rows_minus1; j++)
  RowBd [j + 1] = RowBd [j] + RowHeight [j]
For (ColBd [0] = 0, i = 0; i <= num_tile_columns_minus1; i++)
  ColBd [i + 1] = ColBd [i] + ColWidth [i]
```

Method 1 for Deriving CTU Scan Order in Picture

CtbAddrRsToTs[ ] is a table that transforms CTU addresses in raster scan order in the picture to CTU addresses in tile scan order. The CT information decoder 3021 may derive CtbAddrRsToTs[ ] by the following processes. This derivation method corresponds to the scan order of CTUs in a case that raster scanning is performed in tile order in the picture and raster scanning is further performed in CTU order in the tile. Note that CTU may be referred to as CTB. The CTU scan order may be referred to as a CTB scan order.

```
 for (ctbAddrRs = 0; ctbAddrRs < PicSizeInCtbsY; ctbAddrRs++) {
  tbX = ctbAddrRs % PicWidthInCtbsY
  tbY = ctbAddrRs / PicWidthInCtbsY
  for (i = 0; i <= num_tile_columns_minus1; i++)
   if (tbX >= ColBd [i]) tileX = i
  for (j = 0; j <= num_tile_rows_minus 1; j++)
   if (tbY >= RowBd [j]) tileY = j
  CtbAddrRsToTs [ctbAddrRs] = 0
  for (i = 0; i < tileX; i++)
   CtbAddrRsToTs [ctbAddrRs] += RowHeight [tileY] * ColWidth [i]
  for (j = 0; j < tileY; j++)
   CtbAddrRsToTs [ctbAddrRs] += PicWidthInCtbsY * RowHeight [j]
  CtbAddrRsToTs [ctbAddrRs] += (tbY - RowBd [tileY]) *
  ColWidth [tileX] + tbX -
ColBd [tileX]
}
```

Method 0 for Deriving CTU Scan Order in Picture

The CT information decoder 3021 uses ctbAddrTs and CtbAddrTsToRs[ ] to derive the CTU address ctbAddrRs in raster scan order in the following equation.

ctbAddrRs=CtbAddrTsToRs[ctbAddrTs]

CtbAddrTsToRs[ ] is a table that transforms CTU addresses in tile scan order to CTU addresses in raster scan order, which is derived as described below.

```
for (ctbAddrRs = 0; ctbAddrRs < PicSizeInCtbsY; ctbAddrRs++)
  CtbAddrTsToRs [CtbAddrRsToTs [ctbAddrRs]] = ctbAddrRs
```

Note that the derivations of CtbAddrTsToRs[ ] and CtbAddrTsToRs[ ] are performed by the CT information coder 1111 in the video coding apparatus 11. The header coder 1110 and the header decoder 3020 may be used.

CtbAddrTsToRs[ ] may be derived first, and CtbAddrRsToTs[ ] may be derived using CtbAddrTsToRs[ ] in the equation below.

```
for (ctbAddrTs = 0; ctbAddrTs < PicSizeInCtbsY; ctbAddrTs++)
  CtbAddrRsToTs [CtbAddrTsToRs [ctbAddrTs]] = ctbAddrTs
```

The CT information decoder 3021 decodes each CTU in the tile in tile scan order and decodes end_of_tile_one_bit after the end of the decoding of all CTUs.

(S1400: Decoding of CT information) The CT information decoder 3021 decodes the CT from the coded data.

(S1500: Decoding of CU) The CU decoder 3022 decodes the CU from the coded data by performing S1510 and S1520.

(S1510: Decoding of CU information) The CU decoder 3022 decodes, for example, CU information, prediction information, a TU split flag split_transform_flag, CU residual flags cbf_cb, cbf_cr, and cbf_luma from the coded data.

(S1520: Decoding of TU information) In a case that a prediction error is included in the TU, the TU decoder 3024 decodes QP update information (quantization correction value) and a quantization prediction error (residual_coding) from the coded data. Note that the QP update information is a difference value from a quantization parameter prediction value qPpred, which is a prediction value of a quantization parameter QP.

(S2000: Generation of prediction image) The prediction image generation unit 308 generates a prediction image, based on the prediction information, for each block included in the target CU.

(S3000: Inverse quantization and inverse transform) The inverse quantization and inverse transform processing unit 311 performs inverse quantization and inverse transform processing on each TU included in the target CU.

(S4000: Generation of decoded image) The addition unit 312 generates a decoded image of the target CU by adding the prediction image supplied from the prediction image generation unit 308 and the prediction error supplied from the inverse quantization and inverse transform processing unit 311.

(S5000: Loop filter) The loop filter 305 generates a decoded image by applying a loop filter such as a deblocking filter, an SAO, and an ALF to the decoded image.

Modified Example 1: Example of Changing Tile Size for Each Tile Group

In the example described above, the width and the height of the tiles are defined in the picture units (PPS), but in Modified Example 1, an example of flexibly configuring the tile size for each tile group that splits the picture will be described.

FIG. 13 is an example of splitting a picture into four tile groups TileGr0 to TileGr3 and further splitting the tile groups into tiles. Unlike the tile splits in FIG. 6, it is characterized in that different tile widths and heights are configured for each tile group. The numbers after Tile in the figure are the addresses of the tiles in the tile group (TileAddrInTG). The tile group TileGr0 of the figure includes tiles Tile0, Tile1, Tile2, and Tile3. TileGr1 includes Tile4 and Tile5. TileGr2 includes Tile6, Tile7, and Tile8. TileGr3 includes Tile9.

FIG. 14 illustrates an example of the syntax of Modified Example 1. As illustrated, the syntax may be, for example, single_tile_group_in_pic_flag, num_tile_group_columns_minus1, num_tile_rows_group_minus1, tile_group_column_width_minus1[i], or tile_group_row_height_minus1[i].

Here, single_tile_group_in_pic_flag is a flag indicating whether or not there are multiple tile groups in the picture, where 1 indicates that there is one tile group in the picture, and the picture corresponds to the tile group. 0 indicates that the picture includes multiple tile groups. Each of num_tile_group_columns_minus1 and num_tile_group_rows_minus1 is a value obtained by subtracting 1 from the number of tile groups in the horizontal direction and the vertical direction NumTileGrColumns and NumTileGrRows in the picture, respectively.

Then, the syntax of tiles is signaled for each tile group. For example, for each tile in the jth tile group, single_tile_in_pic_flag [j], num_tile_columns_minus1 [j], num_tile_rows_minus1[j], uniform_tile_spacing_flag [j], tile_column_width_minus1[j] [i], tile_row_height_minus1 [j] [i] are signaled. The meaning of each syntax is the same as the syntax of FIG. 11(*b*).

The header decoder 3020 derives the width and the height (CTU units) of the jth tile group as follows.

```
TileGrWidthInCtbsY [j] = Ceil ((tile__group__column__width__minus1 [j] + 1) / ctuWidth)
TileGrHeightInCtbsY [j] = Ceil ((tile__group__rows__height__minus1 [j] + 1) / ctuHeight)
```

The header decoder 3020 derives the number of tile groups in the horizontal direction and the vertical direction NumTileGrColumns and NumTileGrRows in the picture and the total number of tile groups in the picture NumTileGrsInPic as follows.

```
NumTileGrColumns = num__tile__group__columns__minus1 + 1
NumTileGrRows = num__tile__group__rows__minus1 + 1
NumTilesGrsInPic = NumTileGrColumns * NumTileGrRows
```

The header decoder 3020 derives the numbers of tiles in the horizontal direction and the vertical direction NumTileColumns [j] and NumTileRows [j] in the jth tile group and the total number of tiles in the tile group NumTilesInPic [j] as follows.

```
NumTileColumns [j] = num_tile_columns_minus1 [j] + 1
NumTileRows [j] = num_tile_rows_minus1 [j] + 1
NumTilesInPic [j] = NumTileColumns [j] * NumTileRows [j]
```

The header decoder 3020 decodes the width ColWidth [j] [m] and the height RowHeight [j] [n] of each tile of the jth tile group as described below.

```
ColWidth [j] [m] = tile_column_width_minus1 [j] [m] + 1 (0 <= m <
NumTileColumns [j] − 1)
  RowHeight [j] [n] = tile_row_height_minus1
  [j] [m] + 1 (0 <= n < NumTileRows
[j] − 1)
  ColWidth [j] [NumTileColumns [j] − 1] = TileGrWidthInCtbsY
  [j] − sum_m
(ColWidth [j] [m])
  RowHeight [j] [NumTileRows [j] − 1] = TileGrHeightInCtbsY
  [j] − sum_n
(RowHeight j] [n])
```

Here, sum_m (ColWidth [j][m]) represents the sum of ColWidth [j] [m] (0<=m<NumTileColumns [j]−1), and sum_n (RowHeight [j] [n]) represents the sum of RowHeight [j] [n] (0<=n<NumTileRows [j]−1).

In Modified Example 1, the syntaxes of the tile group header and tile group data are the same as those in FIGS. 12(*a*) and 12(*c*), but the method for deriving the table TileId[ ] for transforming the CTU addresses in tile scan order to tile identifiers is different. The method for deriving the table in Modified Example 1 is illustrated below.

```
for (k = 0; k < NumTileGrRows; k++)
 for (1 = 0; 1 < NumTileGrColumns; 1++)
  for (j = 0, tileIdx = 0; j <= num_tile_rows_minus1 [k]; j++)
    for (i = 0; i <= num_tile_columns_minus1 [1]; i++, tileIdx++)
      for (y = RowBd [k] [j]; y < RowBd [k] [j + 1]; y++)
        for (x = ColBd [1] [i]; x < ColBd [1] [i + 1]; x++)
          TileId [CtbAddrRsToTs [y * PicWidthInCtbsY + x]] =
          TileIdx
```

Other than that, the processing of the header decoder 3020 is the same as the example described above in which the width and the height of the tiles are defined by the PPS.

As described above, by coding or decoding the syntax indicating the width and the height of tiles for each tile group, tiles of different sizes can be used for each tile group, allowing for more flexible tile splits.

Wavefront Parallel Processing

Wavefront Parallel Processing (WPP) can implement parallel coding or parallel decoding of a large number of segments while suppressing a decrease in coding efficiency by using CTU rows as segments.

Exclusive Configuration Within Segment Group

Figures 15, 16:
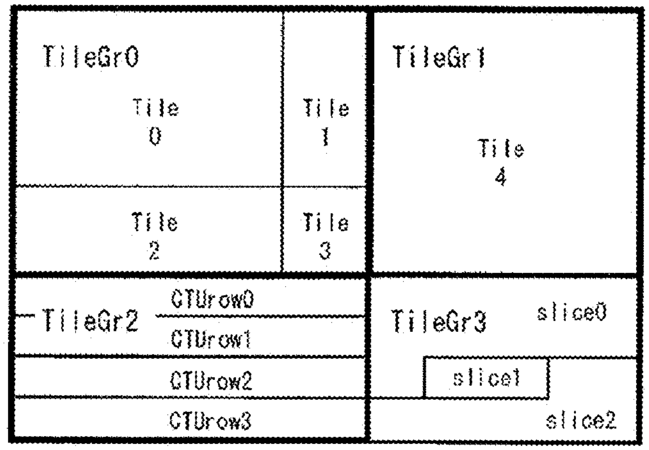
FIG. 15 is an example of utilizing different types of segments in a tile group (segment group) unit.
FIG. 16 is a diagram illustrating an exclusive configuration of tile segments and CTU row segments.

FIG. 15 illustrates an example of utilizing different types of segments in a tile group (segment group) unit. In this example, TileGr0 and TileGr1 use tiles as segments, TileGr2 uses CTU rows as segments, and TileGr3 uses slices as segments.

In the following embodiments, within one segment group (within a tile group), the type of segment is limited to one, and tiles, CTU rows, and slices are exclusively processed. That is, within one tile group (segment group), only one of the tile segments (multiple tile segments), the CTU row segments, and the slice segments can be enabled. For example, within one tile group, only one of the tiles and CTU rows can be enabled. Enabling tiles in the above means a case that the tile group is composed of two or more tiles (splitting the tile group into two or more tiles).

Modified Example 2: Processing in a Case that Segment can Take Tile or CTU Row In Modified Example 2, a case will be described that the segments are either tiles or CTU rows, and either tiles or CTUs are used in tile group units.

FIG. 16 is a diagram illustrating an exclusive configuration of tile segments and CTU row segments.

entropy_coding_sync_enabled_flag is a flag (WPP enabled flag) indicating whether or not the CTU row is a segment (whether to perform WPP). Note that, in a case that the CTU row is a segment, synchronization processing of the CABAC is performed. In other words, the CABAC initialization of the starting CTU of the CTU row is performed using the CABAC state at the time when the second CTU of the CTU row one row above has ended. As illustrated, in a case that num_tiles_in_tile_group_minus1 is greater than 0, that is, in a case that there are multiple tiles, then entropy_coding_sync_enabled_flag takes only 0. In this case, only multiple tiles are enabled. In a case that num_tiles_in_tile_group_minus1 is 0, that is, in a case that there is one tile, then entropy_coding_sync_enabled_flag may take 1. In this case, only multiple CTU rows (wavefront) are enabled. Finally, in a case that num_tiles_in_tile_group_minus1 is 0 and entropy_coding_sync_enabled_flag is 0, then there is one tile in the tile group. As described below, slices may be enabled in this case.

Note that in a case that entropy_coding_sync_enabled_flag is 1, the CABAC initialization of the starting CTU of the CTU row may be performed using the CABAC state at the time when the starting CTU processing of the CTU row one row above has ended.

The above-described configuration achieves the effect that entry points of the tile and the wavefront can be shared in one tile group (within a segment group).

The above-described configuration also achieves the effect that the tile (multiple tiles) can be enabled in one tile group, and the wavefront can be enabled in another tile group.

In Modified Example 2, in order to achieve the exclusive configuration of the tile and the wavefront, in a case that the number of tiles in the tile group is one (the tile group and the tile are the same, that is, multiple tiles are not enabled in the target tile group), by signaling the entropy_coding_sync_enabled_flag flag, the CTU row is made available as a segment, or otherwise (in a case that the tile group includes multiple tiles), the tile is used as a segment. Thus, in a case that the picture is split into four tile groups as in FIG. 5, there are a case that each tile group is split into multiple tiles as illustrated in FIG. 8(*a*), a case that each tile group is split into multiple CTU rows as illustrated in FIG. 8(*b*), and a case that the tile group is composed of one tile (in a case that there is one tile in the tile group and the tile group is not split by CTU rows).

In order to code or decode multiple tiles or multiple CTU rows included in a tile group in parallel, the starting addresses (entry point) of the tiles or CTU rows are coded or decoded in the tile group header.

Figure 17:
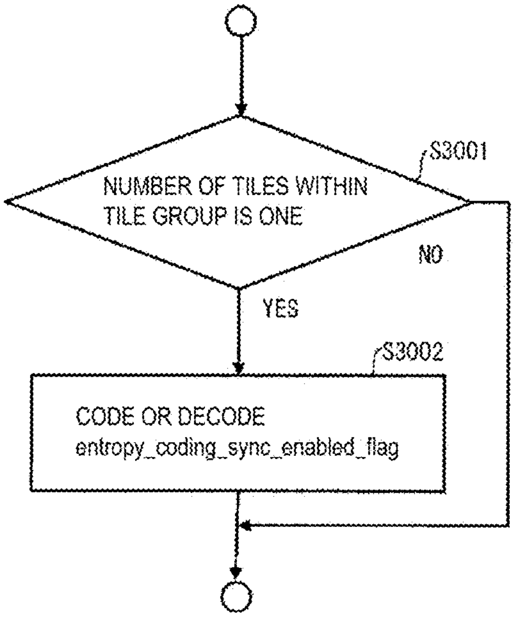
FIG. 17 is a diagram illustrating an operation of a header decoder in an exclusive configuration of the tile and the wavefront.

FIG. 17 is a diagram illustrating operations of the header coder 1110 and the header decoder 3020 in a configuration including an exclusive configuration of the tile and the wavefront. FIG. 18(*a*) illustrates a syntax configuration of a tile group header for coding and decoding according to the present embodiment.

As illustrated in the flowchart and the syntax configuration of the figures, the header coder 1110 or the header decoder 3020 is configured to: in a case that num_tiles_in_tile_group_minus1 is 0 (YES at S3001), that is, in a case that there is one tile in the tile group, code or decode entropy_coding_sync_enabled_flag (S3002). Otherwise, entropy_coding_sync_enabled_flag is set equal to 0 (WPP off).

```
if (num_tiles_in_tile_group_minus1 = = 0)
  entropy_coding_sync_enabled_flag
else
  entropy_coding_sync_enabled_flag = 0
```

FIG. 18(*b*) illustrates a syntax configuration of an entry point. In the figure, TileGrHeightInCtbsY is the height of the tile group in CTU units, and num_tiles_in_tile_group_minus1 is the value obtained by subtracting 1 from the number of tiles in the tile group.

The header coder 1110 or the header decoder 3020 derives the number of entry points NumEntryPoint. In a case that the segments included in the tile group use WPP (in a case of entropy_coding_sync_enabled_flag=1), the number of CTU rows−1 (here TileGrHeightInCtbsY−1) included in the tile group is set equal to NumEntryPoint.

NumEntryPoint=TileGrHeightInCtbsY−1

Otherwise, the number of tiles−1 (here num_tiles_in_tile_group_minus1) included in the tile group is set equal to NumEntryPoint.

NumEntryPoint=num_tiles_in_tile_group_minus1

The header coder 1110 or the header decoder 3020 codes or decodes information of entry points (offset_len_minus1 and NumEntryPoint of entry_point_offset_minus1) in a case that NumEntryPoint is greater than 0.

FIG. 18(*c*) illustrates a syntax configuration of tile group data. coding_tree_unit( ) is coded data of the CTUs included in the CTU row. end_of_subset_one_bit is a flag indicating the end of the segment.

The CT information coder 1111 or the CT information decoder 3021 codes or decodes the target CTU coding_tree_unit( ) in the loop processing (loop variable i) for processing the tiles in the tile group, and further in the loop processing (loop variable j) for the CTUs in the tiles.

The CT information coder 1111 or the CT information decoder 3021 derives ctbAddrInTile using ctbAddrTs and FirstCtbAddrTs[ ] in the following equation. ctbAddrInTile is the address of the current CTU within the tile, ctbAddrTs is the address in tile scan order of the current CTU, and FirstCtbAddrTs[ ] is the address of the first CTU of the tile group.

```
ctbAddrInTile=ctbAddrTs−FirstCtbAddrTs
    [tile_group_address]
```

Note that ctbAddrInTile is j in a configuration that decodes the CTUs (coding_tree_unit( )) such that the CTUs in the tiles are looped from 0 to the number of tiles NumCtusInTile [tileIdx] in the tile group using the index j which is a loop variable.

The CT information coder 1111 or the CT information decoder 3021 codes or decodes end_of_subset_one_bit after the end of the decoding of the CTU row in a case that the WPP is on. end_of_subset_one_bit is the bit that is inserted at the end of the CTU row. Whether or not it is the end of the CTU row is determined by the following equation.

entropy_coding_sync_enabled_flag && (CtbAddrInTile+1) % TileWidthInCtbsY==0

In other words, the CT information decoder 3021 is configured to: in a case of (entropy_coding_sync_enabled_flag && (CtbAddrInTile+1) % TileWidthInCtbsY==0), that is, in a case that entropy_coding_sync_enabled_flag is 1, decode the fixed value end_of_subset_one_bit after CTU decoding at the right corner of the CTU row. In a case that the target CTU is the beginning (left corner) of the CTU row, the same processing can be performed by decoding the bit string indicating the end of the segment (here, the CTU row) before coding or decoding the target CTU coding_tree_unit( ). For example, before the target CTU coding_tree_unit( ), end_of_subset_one_bit may be coded or decoded with the determination of entropy_coding_sync_enabled_flag && ((CtbAddrInTile) % TileWidthInCtbsY)==0 && CtbAddrInTile !=0.

Note that the CTU width TileWidthInCtbsY of the target tile may be derived as follows.

TileWidthInCtbsY=ColWidth [tileIdx % (num_tile_columns_minus1+1)]

Here, tileIdx is the raster scan position of the target tile. num_tile_columns_minus1 is the number of rows of tiles in the picture of the tile. tileIdx % (num_tile_columns_minus1+1) derives the CTU row position of the tile. The width of the target tile of the target tile in CTU units is derived by referring to ColWidth [ ] using the CTU row position of the tile as an index.

tileIdx may be derived from the tile address i in the group in the tile using the table TgTileIdx [i] for obtaining the tile index (tileIdx) in the picture. In this case, TileWidthInCtbsY=ColWidth [TgTileIdx [i] % (num_tile_columns_minus1+1)]]

In a case that the following equation holds after coding or decoding the target CTU coding_tree_unit( ), the equation being represented using the loop variable j, which is the tile index in the tile group, the CT information coder 1111 or the CT information decoder 3021 may code or decode end_of_subset_one_bit, which is a bit string that indicates the end of the segment (here the CTU row).

```
if (entropy_coding_sync_enabled_flag && ((j + 1) % ColWidth
  [TgTileIdx [i] %
(num_tile_columns_minus1 + 1)] = = 0)) {
   end_of_subset_one_bit
```

The CT information coder 1111 or the CT information decoder 3021 codes or decodes the fixed value end_of_subset_one_bit in a case of j==NumCtusInTile [tileIdx]−1 (in a case of the last CTU in the tile group).

In addition, the CT information coder 1111 or the CT information decoder 3021 decodes the bit string of the byte alignment after end_of_subset_one_bit, except for the last segment of the tile group (except the case of immediately coding the trailing data). Note that j<NumCtusInTile [tileIdx]−1 is other than the last CTU in the segment, i<num_tiles_in_tile_group_minus1 is other than the last segment, and the CTUs other than the last segment of the tile group can be determined from the union of both.

Figure 26:
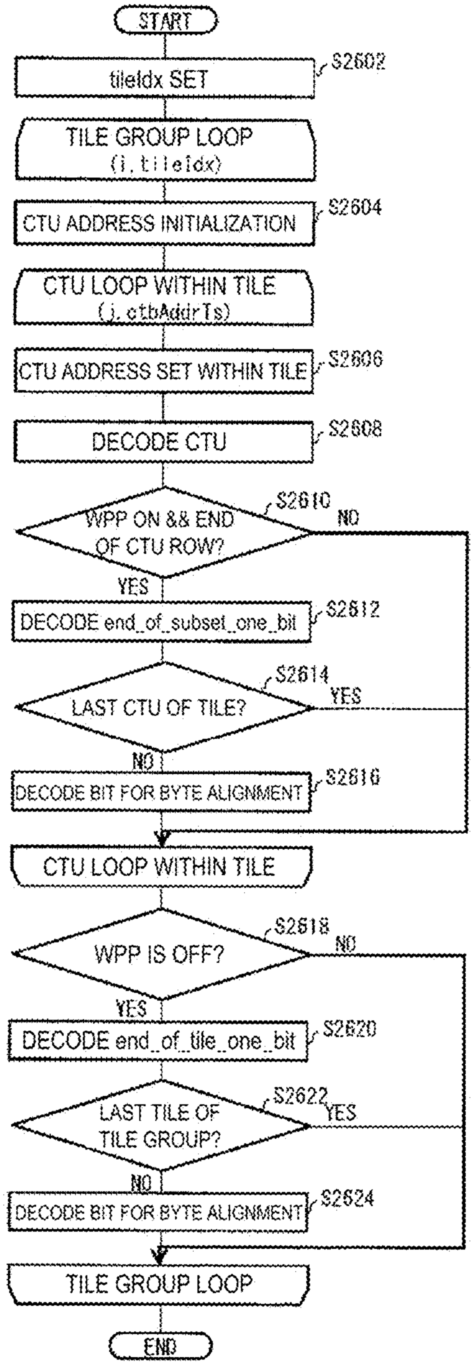
FIG. 26 is a flowchart illustrating a general operation of the video decoding apparatus.

FIG. 25 is a diagram illustrating another syntax configuration of tile group data in an exclusive configuration of the tile and the wavefront. The configurations of the tile group header and the entry point are the same as in FIGS. 18(*a*) and 18(*b*). The figure includes end_of_tile_one_bit, which represents the end of the tile, in addition to end_of_subset_one_bit, which represents the end of the WPP, as a fixed value segment end bit that is signaled at the end of the segment. FIG. 26 is a flowchart illustrating operations of the CT information decoder 3021 decoding the syntax of FIG. 25.

The tile identifier is configured (S2602).

The processes of S2604 to S2624 are performed for each tile (loop variable i) in the tile group. Note that in a case that the WPP is on, the tile group is composed of one tile, and the tile group and the tile are equal. As described above, even in a configuration where the WPP is on in a case that the tile group is composed of one tile, the configuration may be such that the tile group is composed of one tile in a case that the WPP is on.

The starting CTU address of the tile group is configured (S2604).

ctbAddrInTile=ctbAddrTs−FirstCtbAddrTs [tile_group_address]

In the loop processing for the CTUs in the tile (loop variable j), the CTU address in the tile is configured (S2606) and the target CTU is decoded (S2608).

Whether or not the WPP is on and whether or not it is the last CTU in the CTU row is determined, for example, by the following equation (S2610).

```
entropy_coding_sync_enabled_flag && ((CtbAddrInTile + 1) %
TileWidthInCtbsY) = = 0
```

In a case that the WPP is on and it is the last CTU in the CTU row, then the process proceeds to S2612. If not, the process proceeds to the next CTU decoding processing. As previously described, the loop variable j, which indicates the CTU address in the tile, may be used to derive CtbAddrInTile=j and derive TileWidthInCtbsY=ColWidth [TgTileIdx [i] % (num_tile_columns_minus1+1)]. Before coding or decoding the target CTU coding_tree_unit( ), end_of_subset_one_bit may be coded or decoded with the determination of entropy_coding_sync_enabled_flag && ((CtbAddrInTile) % TileWidthInCtbsY)==0 && CtbAddrInTile !=0.

end_of_subset_one_bit is decoded (S2612). end_of_subset_one_bit is the bit that is inserted at the end of the CTU row.

Whether or not it is the last CTU of the tile is determined, for example, by the following relationship (S2614).

$j$<NumCtusInTile[tileIdx]−1

In a case that it is the last CTU of the tile group, then the process proceeds to the next CTU decoding processing. If not, the bit string for the byte alignment is decoded (S2616).

The processes from S2606 to S2616 are repeated until processing of all CTUs in the tile is ended.

Whether or not the WPP is off is determined (S2618). In a case that the WPP is not off, then the process ends. In a case that the WPP is off, then the process proceeds to S2620.

end_of_tile_one_bit is decoded. end_of_tile_one_bit is the bit that is inserted at the end of the tile (S2620).

Whether or not it is the last tile of the tile group is determined (S2622). In a case of the last tile of the tile group, then the process ends. If not, the bit string of the byte alignment is decoded (S2624).

The above processes are repeated until processing of all tiles in the tile group is ended.

Note that, in the CT information coder 1111, processing in which "decoding" in FIG. 26 is replaced with "coding" is performed.

As described in FIG. 18, the determination of (S2610) and the processing of (S2612) may be derived as follows. In a case that the following equation holds after coding or decoding the target CTU coding_tree_unit( ), the equation being represented using the loop variable j, which is the tile index in the tile group, the CT information coder 1111 or the CT information decoder 3021 may code or decode end_of_subset_one_bit, which is a bit string that indicates the end of the segment (here the CTU row).

```
if (entropy_coding_sync_enabled_flag && ((j + 1) % ColWidth
[TgTileIdx [i] %
(num_tile_columns_minus1 + 1)] = = 0)) {
  end_of_subset_one_bit
```

In the above process, in a case of using the WPP (in the case of entropy_coding_sync_enabled_flag==1), the bit indicating the end of the segment and the byte alignment are inserted at the end of each CTU row, but in the last CTU row corresponding to the end of the tile group (j==NumCtusInTile [tileIdx]−1), the byte alignment is omitted. Because the tile group is composed of CTU rows at the WPP, the end of the tile group is the end of the last CTU row. In a case that the WPP is not used (in the case of entropy_coding_sync_enabled_flag==0), the bit indicating the end of the segment and the byte alignment are inserted at the end of the tile, but at the end of the tile group (i==num_tiles_in_tile_group_minus1), the byte alignment is omitted. This is to avoid overlapping with the byte alignment inserted in the trailing data in the configuration including the trailing data for the byte alignment (rbsp_tile_group_trailing_bits) after the tile group data as already described in FIG. 4(*c*). In a configuration that does not perform the byte alignment in the trailing data, the byte alignment may be inserted in the data of the tile group even at the end of the tile group.

In FIG. 25 and FIG. 26, the wavefront and the tile may be distinctly distinguished by distinguishing the bit (end_of_subset_one_bit) inserted at the end of the CTU row in the wavefront and the bit (end_of_tile_one_bit) inserted at the end of the tile in the tile.

As described above, by using either the tile or the CTU row in tile group units, it is possible to exclusively perform multiple processes having a parallel processing function in one tile group, so that the coding efficiency is good. The entry point can be used in common for the tile and the CTU row, and it is known whether the entry point indicates the starting address of the tile or the starting address of the CTU row for each tile group, so that the processing is simple.

FIG. 19 is another example of a syntax configuration of a tile group header for coding and decoding according to the present embodiment. As illustrated in the figure, entropy_coding_sync_enabled_flag may be coded and decoded first, and num_tiles_in_tile_group_minus1 may be signaled in a case that entropy_coding_sync_enabled_flag is 0, that is, in a case that the WPP is off. In this case, the header coder 1110 and the header decoder 3020 code or decode entropy_coding_sync_enabled_flag, and code or decode num_tiles_in_tile_group_minus1 in a case that NumTilesInPic is greater than 1, and entropy_coding_sync_enabled_flag is 0. Otherwise (in a case that NumTilesInPic is less than or equal to 1, or entropy_coding_sync_enabled_flag is 1), the header coder 1110 and the header decoder 3020 set 0 to num_tiles_in_tile_group_minus1.

Modified Example 3: Processing in a Case that Segment can Take Tile or Slice In Modified Example 3, a case of using either the tile or the slice exclusively as a segment in the tile group will be described.

FIG. 20 is a diagram illustrating an exclusive configuration of tile segments and slice segments.

slice_enabled_flag is a flag that indicates whether or not a slice is a segment (using a slice). Note that the CABAC is initialized at the beginning of the slice. As illustrated, in a case that num_tiles_in_tile_group_minus1 is greater than 0, that is, in a case that there are multiple tiles in the tile group, then slice_enabled_flag takes only 0. In this case, only tiles are enabled. In a case that num_tiles_in_tile_group_minus1 is 0, that is, in a case that there is one tile in the tile group, then slice_enabled_flag may take 1. In this case, only slices are enabled. Finally, in a case that num_tiles_in_tile_group_minus1 is 0 and entropy_coding_sync_enabled_flag is 0, then there is one tile in the tile group. In this case, the WPP may be enabled.

In Modified Example 3, in a case that the number of tiles in the tile group is one (the tile group and the tile are the same), the slice is made available as a segment, or otherwise (in a case that the tile group includes multiple tiles), the tile is used as a segment. For example, in a case that the picture is split into four tile groups as in FIG. 5, there are a case that each tile group is split into multiple tiles as illustrated in FIG. 8(*a*), and a case that each tile group is split into multiple slices as illustrated in FIG. 8(*c*). There may be a case that each tile group is split into one tile. That is, in a case that there is one tile in the tile group, and the tile group is not split in CTU rows or slices, the tile group includes one tile.

For the slice, the segment can be ended at an arbitrary position in CTU units by signaling the slice end flag end_of_slice_segment_flag indicating whether or not it is the end of the segment at the end of the coded data of the CTU. Such a segment whose size can be changed in CTU units is referred to as a slice segment. For example, slices are used in a case that segments are to be delimited within an indicated amount of bits. Furthermore, for the purpose of parallel decoding of slices, a marker (unique code, start code) may be inserted at the beginning of the slice. By using the marker, the video decoding apparatus can search for the starting position of each slice on the bit stream and identify the position. Note that in the configuration in which the marker is inserted at the beginning of the slice, the tile group may be ended each time the slice is inserted (that is, in a case that end_of_slice_segment_flag is 1). In this configuration, because a tile group includes one slice, the tile group header is always added to the beginning of the slice and acts as a marker.

In a case of coding or decoding the beginning of the slice with a marker, a unique code, for example, "0x00000100" (32 bits), may be inserted before the slice, and the video decoding apparatus may search for the beginning of the slice in the coded data by scanning the coded data in advance.

In order to process tiles and slices in parallel, the starting address (entry point) of the tile may be signaled in the tile group header. FIG. 21(*a*) illustrates an example of a tile group header. In FIG. 21, slice_enabled_flag is signaled. slice_enabled_flag is a flag indicating whether or not to split into slices.

The header coder 1110 or the header decoder 3020 codes or decodes slice_enabled_flag in a case that num_tiles_in_tile_group_minus1 is 0, that is, in a case that there is one tile in the tile group. Otherwise, slice_enabled_flag is set equal to 0 (slice off).

Note that num_slices_in_tile_minus1 may not be signaled in the tile group header.

The coding and decoding order of the number of tiles num_tiles_in_tile_group_minus1 and the slice enabled flag slice_enabled_flag is not limited to the above. The processing may be performed as follows.

Slice and Tile

In a case of signaling the slice enabled flag slice_enabled_flag and the number of tiles num_tiles_in_tile_group_minus1 in this order, the following processing is performed. The header coder 1110 or the header decoder 3020 codes or decodes slice_enabled_flag in the tile group header. In a case that slice_enabled_flag is 0, num_tiles_in_tile_group_minus1 is coded or decoded. In a case that num_tiles_in_tile_group_minus1 and slice_enabled_flag are not decoded, each of them is set equal to 0.

The header coder 1110 and the header decoder 3020 derive NumEntryPoint. NumEntryPoint is the number of entry points, and num_tiles_in_tile_group_minus1 is set in a case that tiles are used. The header coder 1110 or the header decoder 3020 codes or decodes information of entry points (offset_len_minus1 and NumEntryPoint of entry_point_offset_minus1) in a case that NumEntryPoint is greater than 0.

In a case that the slice is on, the CT information decoder 3021 decodes end_of_slice_segment_flag after the end of the decoding of one CTU. end_of_slice_segment_flag is the bit that is inserted at the end of the CTU row.

FIG. 21(*c*) is an example of a syntax of tile group data for the coded tile group. The figure illustrates a configuration of coding or decoding end_of_slice_segment_flag after the end of the decoding of one CTU. end_of_slice_segment_flag is a flag that indicates whether or not it is the end of the slice, indicating that it is the end of the slice in a case of 1, or otherwise indicating that it is not the end of the slice.

As described above, by using either the tile or the slice in tile group units, it is possible to exclusively perform multiple processes having a parallel processing function in one tile group, so that the efficiency is good.

Modified Example 4: Processing in a Case of Using Entry Point in Slice

The following example illustrates a configuration that indicates the starting position of the slice on the bit stream by coding or decoding the starting address of the slice as an entry point.

In order to process tiles and slices in parallel, the starting address (entry point) of the tile and the slice is signaled in the tile group header. In one example of the tile group header illustrated in FIG. 21(*a*), num_slices_in_tile_minus1 may be signaled after slice_enabled_flag. num_slices_in_tile_minus1 is a value obtained by subtracting 1 from the number of slices in the tile.

The syntax of the entry point is illustrated in FIG. 21(*b*). FIG. 21(*c*) illustrates a configuration using slice_enabled_flag and num_slices_in_tile_minus1 for derivation of NumEntryPoint.

The header decoder 3020 decodes slice_enabled_flag and num_slices_in_tile_minus1 in a case that num_tiles_in_tile_group_minus1 is 0, that is, in a case that there is one tile in the tile group. Otherwise, slice_enabled_flag is set equal to 0 (slice off).

The header decoder 3020 derives NumEntryPoint. NumEntryPoint is the number of entry points, and num_slices_in_tile_minus1 is set in a case that slices are used, and num_tiles_in_tile_group_minus1 is set in a case that tiles are used. The header decoder 3020 decodes information of entry points (offset_len_minus1 and NumEntryPoint of entry_point_offset_minus1) in a case that NumEntryPoint is greater than 0.

The processing other than the above is the same as in Modified Example 2.

The tile group data will now be described.

FIG. 21(*c*) is an example of a syntax of tile group data for the coded tile group. FIG. 21(*c*) illustrates a configuration of coding or decoding end_of_slice_segment_flag after the end of the decoding of one CTU. end_of_slice_segment_flag is a flag (bit) that indicates whether or not it is the end of the slice, indicating that it is the end of the slice in a case of 1, or otherwise indicating that it is not the end of the slice.

In a case that the slice is on, the CT information decoder 3021 decodes end_of_slice_segment_flag after the end of the decoding of one CTU.

As described above, by using either the tile or the slice in tile group units, it is possible to exclusively perform multiple processes having a parallel processing function in one tile group, so that the efficiency is good. The entry point can be used in common for the tile and the slice, and it is known whether the entry point indicates the starting address of the tile or the starting address of the slice for each tile group, so that the processing is simple. Alternatively, the beginning of the slice may be signaled with a unique marker without using an entry point.

Modified Example 5: Segment Using Tile, CTU Row, or Slice

In Modified Example 5, an example in which tiles, CTU rows, and slices are exclusively configured will be described. FIG. 22 is a diagram illustrating an exclusive configuration of tile segments, CTU row segments, and slice segments. As illustrated in the figure, in Modified Example 5, there are a case that there are multiple tile segments in the tile group, a case that there are CTU row segments in the tile group, a case that there are slice segments in the tile group, and a case that there is a single segment (here referred to as a tile) in the tile group.

More specifically, tiles may be used in a case that multiple tiles are included in the tile group and CTU rows or slices may be used in a case that the tile group is composed of one tile. In a case that the tile group is composed of one tile and neither CTU row nor slice is used, the tile group is configured as one tile.

Configuration of Signaling Number of Tiles, WPP Enabled Flag, and Slice Enabled Flag in this Order FIG. 23(*a*) is an example of a tile group header. In the figure, entropy_coding_sync_enabled_flag is signaled in a case that the number of tiles is one, and slice_enabled_flag is signaled in a case that entropy_coding_sync_enabled_flag is 0 (WPP off).

The header coder 1110 or the header decoder 3020 codes or decodes entropy_coding_sync_enabled_flag in a case that num_tiles_in_tile_group_minus1 is 0. Next, in a case that entropy_coding_sync_enabled_flag is 0, slice_enabled_flag is coded or decoded. entropy_coding_sync_enabled_flag and slice_enabled_flag are set equal to 0 in a case that num_tiles_in_tile_group_minus1 is not 0. In a case that num_tiles_in_tile_group_minus1 is 0 and entropy_coding_sync_enabled_flag is other than 0, then slice_enabled_flag is set equal to 0.

The processing other than these is the same as the example in which the segments are only tiles.

FIG. 23(*b*) is an example of a syntax of tile group data for the coded tile group. As illustrated, in the present embodiment, in a case that the segments are tiles and in a case of CTU rows (wavefront), end_of_subset_one_bit that is always 1 at the end of the segment is coded or decoded, and in a case that the segments are slices, end_of_slice_segment_flag, which may take 0 and 1 indicating whether or not the CTU is at the end of the segment is coded or decoded. The method for coding or decoding end_of_subset_one_bit is as previously described in FIG. 18(*c*), and thus descriptions thereof will be omitted. The method for coding or decoding end_of_slice_segment_flag is as previously described in FIG. 21(*c*), and thus descriptions thereof will be omitted.

As described above, the coding and decoding processing of segments can be simplified by exclusively using tiles, CTU rows, and slices in tile group units. It has the effect of clarifying the start point and the end point of the segment. For example, there is no mixture such as being at the beginning of a slice and at the beginning of a tile and at the beginning of a CTU row.

The coding and decoding order of the number of tiles num_tiles_in_tile_group_minus1, the WPP enabled flag entropy_coding_sync_enabled_flag, and the slice enabled flag slice_enabled_flag is not limited to the above. The processing may be performed as follows.

Tile, Slice, and WPP

In a case of signaling num_tiles_in_tile_group_minus1, slice_enabled_flag, and entropy_coding_sync_enabled_flag in this order, the following processing is performed. The header coder 1110 or the header decoder 3020 codes or decodes num_tiles_in_tile_group_minus1. In a case that num_tiles_in_tile_group_minus1 is 0, slice_enabled_flag is coded or decoded. Next, in a case that slice_enabled_flag is 0, entropy_coding_sync_enabled_flag is coded or decoded. In a case that num_tiles_in_tile_group_minus1, entropy_coding_sync_enabled_flag, and slice_enabled_flag are not decoded, each of them is set equal to 0.

WPP, Tile, and Slice

In a case of signaling entropy_coding_sync_enabled_flag, num_tiles_in_tile_group_minus1, and slice_enabled_flag in this order, the following processing is performed. The header coder 1110 or the header decoder 3020 codes or decodes entropy_coding_sync_enabled_flag in the tile group header. In a case that entropy_coding_sync_enabled_flag is 0, num_tiles_in_tile_group_minus1 is coded or decoded. Next, in a case that num_tiles_in_tile_group_minus1 is 0, slice_enabled_flag is coded or decoded. In a case that num_tiles_in_tile_group_minus1, entropy_coding_sync_enabled_flag, and slice_enabled_flag are not decoded, each of them is set equal to 0.

WPP, Slice, and Tile

In a case of signaling entropy_coding_sync_enabled_flag, slice_enabled_flag, and num_tiles_in_tile_group_minus1 in this order, the following processing is performed. The header coder 1110 or the header decoder 3020 codes or decodes entropy_coding_sync_enabled_flag in the tile group header. In a case that entropy_coding_sync_enabled_flag is 0, slice_enabled_flag is coded or decoded. Next, in a case that slice_enabled_flag is 0, num_tiles_in_tile_group_minus1 is coded or decoded. In a case that num_tiles_in_tile_group_minus1, entropy_coding_sync_enabled_flag, and slice_enabled_flag are not decoded, each of them is set equal to 0.

Slice, Tile, and WPP

In a case of signaling slice_enabled_flag, num_tiles_in_tile_group_minus1, and entropy_coding_sync_enabled_flag in this order, the following processing is performed. The header coder 1110 or the header decoder 3020 codes or decodes slice_enabled_flag in the tile group header. In a case that slice_enabled_flag is 0, num_tiles_in_tile_group_minus1 is coded or decoded. Next, in a case that num_tiles_in_tile_group_minus1 is 0, entropy_coding_sync_enabled_flag is coded or decoded. In a case that num_tiles_in_tile_group_minus1, entropy_coding_sync_enabled_flag, and slice_enabled_flag are not decoded, each of them is set equal to 0.

Slice, WPP, and Tile

In a case of signaling slice_enabled_flag, entropy_coding_sync_enabled_flag, and num_tiles_in_tile_group_minus1 in this order, the following processing is performed. The header coder 1110 or the header decoder 3020 codes or decodes slice_enabled_flag in the tile group header. In a case that slice_enabled_flag is 0, entropy_coding_sync_enabled_flag is coded or decoded. Next, in a case that entropy_coding_sync_enabled_flag is 0, num_tiles_in_tile_group_minus1 is coded or decoded. In a case that num_tiles_in_tile_group_minus1, entropy_coding_sync_enabled_flag, and slice_enabled_flag are not decoded, each of them is set equal to 0.

The entropy decoder 301 outputs an inter prediction parameter to an inter prediction parameter decoder 303. An intra prediction parameter is output to an intra prediction parameter decoder 304. Quantization transform coefficients are output to an inverse quantization and inverse transform processing unit 311.

The entropy decoder 301 includes a CABAC initialization unit 3011, a CABAC decoder 3012, an initialization table 3013, and a spatial prediction storage unit 3015 (including a spatial prediction table 3016). The spatial prediction storage unit 3015 stores the CABAC state in an internal spatial prediction table 3016. The stored CABAC state is referenced during decoding of segments other than the target segment, such as a subsequent segment of the target picture, and utilized for initialization of the CABAC state. The CABAC decoder 3012 decodes the syntax from the coded data (the bit stream) in accordance with the stored CABAC state.

The entropy decoder 301 initializes the CABAC state by using the CABAC initialization unit 3011 at the beginning of the segment. The CABAC state is, for example, StateIdx indicating a state of the probability in context units, MpsVal indicating which of 0 and 1 has a higher probability, and a coefficient StatCoeff. The context is defined for each element of the binary string (a string consisting of 0s and 1s) that constitutes the syntax. The Context-adaptive binary arithmetic coding (CABAC) is to infer the probability of coding 0 or 1 for each context, and code the binary based on the probability. At this time, the initial value of the probability StateIdx and MpsVal need to be configured, which is referred to as CABAC initialization. TableStateIdx, TableMpsVal, and TableStatCoeff are tables composed of StateIdx, MpsVal, and StatCoeff.

In a case that the segment is a tile, the CABAC initialization unit 3011 initializes the CABAC state using the initialization table at the top left CTU of the tile. In a case that the segment is a CTU row (in a case that entropy_coding_sync_enabled_flag is 1, or in a case of the WPP), the initialization is performed using the CABAC state stored in the spatial prediction storage unit 3015 at the left corner of the CTU row. In the case of the WPP, the CABAC state of the second CTU of each CTU row is stored in the spatial prediction storage unit 3015 and utilized in subsequent segments. In a case that the segment is a slice (slice_enabled_flag is 1), the initialization of the CABAC state may be performed using an initialization table. Here, the determination of the tile boundary may use whether or not the identifiers of the tiles of the adjacent CTUs are different (TileId [CtbAddrTs] !=TileId [CtbAddrTs−1]). Here, the determination at the left corner of the CTU row may be (CtbAddrInTile % TileWidthInCtbsY==0). The determination of the beginning of the slice may be made whether the CTU address CtbAddrRs matches the CTU address at the beginning of the slice (CtbAddrRs==slice_segment_address).

Configuration of Initialization at the Beginning of CTU Row of Each Tile in Tile Group Here, an example will be described in which CTUs are raster scanned within individual tiles in a tile group and CABAC initialization is performed at the beginning (left corner) of the CTU row in the tile.

The entropy decoder 301 according to the present embodiment stores the CABAC state (for example, the state TableStateIdx0Wpp, the state TableStateIdx1Wpp, and the value of MPS TableMpsValWpp) in the storage in a case that the WPP enabled flag is 1 at the end of the CTU syntax parsing, and at the position of one CTU from the beginning of the CTU row of each tile in the tile group (ctbAddrInTile % TileWidthInCtbsY==1. TableStateIdx0Wpp and TableStateIdx1Wpp are the states of the CTU at the beginning of the CTU row one row above the target CTU and its next CTU.

However, the CTU address in the tile may be derived as follows.

ctbAddrInTile=ctbAddrTs−FirstCtbAddrTs [tile_group_address]

In a case that loop processing is performed such that the CTU in the tile is incremented from j=0 to the number of CTUs in the tile−1, the loop variable j may be used as ctbAddrInTile.

Note that the entropy decoder 301 according to the present embodiment may store the CABAC state (for example, the state TableStateIdx0Wpp, the state TableStateIdx1Wpp, and the value of MPS TableMpsValWpp) in the storage in a case that the WPP enabled flag is 1 at the end of the CTU syntax parsing, and that the tile ID (TileId [CtbAddrInTs]) at the position of the one CTU from the beginning of the CTU row in the picture (CtbAddrInRs % PicWidthInCtbsY==1) or the current position is different from the tile ID (TileId [CtbAddrRsToTs [CtbAddrInRs−2]]) at the position two positions before in raster order.

Note that, in order to achieve a lower delay, the CABAC state may be stored in the case of the starting position of the CTU row of the tile (ctbAddrinTile % TileWidthInCtbsY==0).

For example, the entropy decoder 301 according to the present embodiment may store the CABAC state (for example, the state TableStateIdx0Wpp, the state TableStateIdx1Wpp, and the value of MPS TableMpsValWpp) in the storage in a case that the WPP enabled flag is 1 at the end of the CTU syntax parsing, and that the tile ID (TileId [CtbAddrInTs]) at the starting position of the CTU row in the picture (CtbAddrInRs % PicWidthInCtbsY==1) or the current position is different from the tile ID (TileId [CtbAddrRsToTs [CtbAddrInRs−1]]) at the position one position before in raster order.

In the case that the WPP enabled flag is 1, the entropy decoder 301 according to the present embodiment may perform initialization using the CABAC state held in the storage at the starting CTU of the CTU row of each tile in the tile group (CtbAddrInRs % PicWidthInCtbsY==0).

The entropy decoder 301 according to the present embodiment may perform initialization using the CABAC state held in the storage in the case that the WPP enabled flag is 1, and the tile ID (TileId [CtbAddrInTs]) of the starting CTU in the next CTU row (CtbAddrInRs % PicWidthInCtbsY==0) or the current position is different from the tile ID (TileId [CtbAddrRsToTs [CtbAddrInRs−1]]) at the position one position before in raster order.

Configuration of Initialization at the Beginning of CTU Row in Each Tile Group

Here, an example will be described in which CTUs in the tile group are raster scanned and CAB AC initialization is performed at the beginning (left corner) of the CTU row in the tile group.

The entropy decoder 301 according to the present embodiment stores the CABAC state (for example, the state TableStateIdx0Wpp, the state TableStateIdx1Wpp, and the value of MPS TableMpsValWpp) in the storage in a case that the WPP enabled flag is 1 at the end of the CTU syntax parsing, and at the position of one CTU from the beginning of the CTU row of each tile in the tile group (ctbAddrInTileGroup % TileGroupWidthInCtbsY==1).

However, the CTU address in the tile group may be derived as follows. ctbAddrInTileGroup=ctbAddrTs−FirstCtbAddrTs [tile_group_address]

In a case that loop processing is performed such that the CTU in the tile is incremented from j=0 to the number of CTUs in the tile group−1, the loop variable j may be used as ctbAddrInTileGroup.

Note that, in order to achieve a lower delay, the CABAC state may be stored in the case of the starting position of the CTU row of the tile (ctbAddrInTileGroup % TileGroupWidthInCtbsY==0).

For example, the entropy decoder 301 according to the present embodiment may store the CABAC state (for example, the state TableStateIdx0Wpp, the state TableStateIdx1Wpp, and the value of MPS TableMpsValWpp) in the storage in a case that the WPP enabled flag is 1 at the end of the CTU syntax parsing, and of the starting position of the CTU row in the tile group (ctbAddrInTileGroup % TileGroupWidthInCtbsY==0).

In the case that the WPP enabled flag is 1, the entropy decoder 301 according to the present embodiment may perform initialization using the CABAC state held in the storage at the starting CTU of the CTU row in the tile group (ctbAddrInTileGroup % TileGroupWidthInCtbsY==0).

The loop filter 305 is a filter provided in the coding loop, and is a filter that removes block distortion and ringing distortion and improves image quality. The loop filter 305 applies a filter such as a deblocking filter, a Sample Adaptive Offset (SAO), and an Adaptive Loop Filter (ALF) on a decoded image of a CU generated by the addition unit 312.

Rectangular Tile Group

Figure 27:
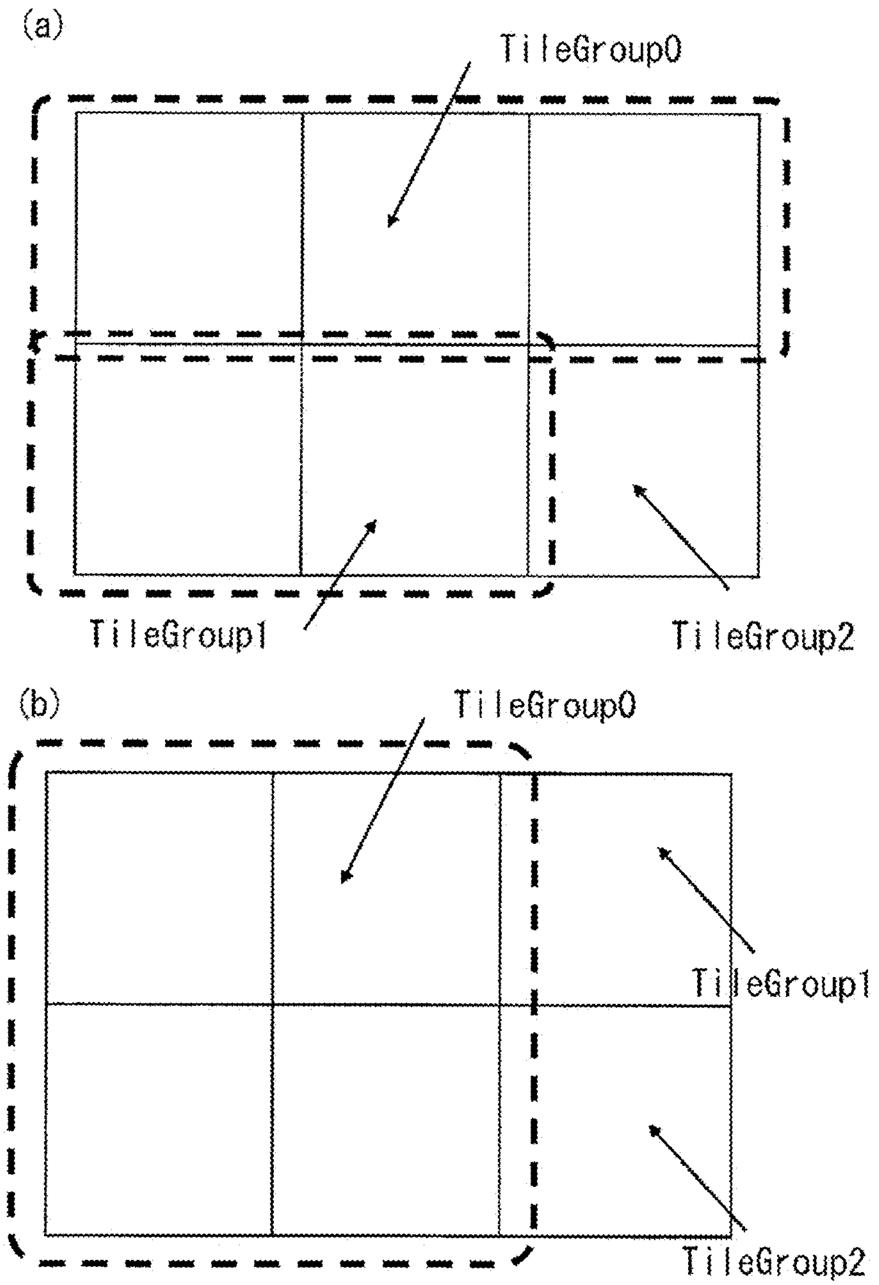
FIG. 27 is a diagram illustrating a tile group including a rectangular tile group.

FIG. 27 is a diagram illustrating a tile group including a rectangular tile group. Tile group is a technique for splitting a picture into multiple tiles and then grouping and transmitting multiple tiles. By grouping tiles and transmitting them and transmitting headers in units of groups, header overhead can be reduced. Even in a case that a picture is extracted in units of tile groups, they can be split into tiles within the tile groups, so that parallel processing is possible. The tile group may be a rectangular tile group or not a rectangular tile group, and is identified by 1 or 0 using the syntax element rect_tile_group_flag described below.

The rectangular tile group is a grouping of tiles according to the definition of the parameter set, and can configure tile regions that are not necessarily continuous in raster scan order. It also has a feature that a specific tile or tile group can be extracted without rewriting the tile group header. The non-rectangular tile group (continuous tiles) is a grouping of tiles according to the definition of the tile group header, and is limited to continuous tiles in raster scan order.

FIG. 27(*a*) is a diagram illustrating a tile group in a case of not a rectangular tile group (rect_tile_group_flag==0). In the case of not a rectangular tile group, a syntax element num_tiles_in_tile_group_minus1 indicating the number of tiles grouped as a tile group is transmitted. num_tiles_in_tile_group_minus1+1 of tiles are grouped. In FIG. 27(*a*), an example is illustrated in which, in a case that there are 3×2 tiles, the first three continuous tiles are TileGroup0, the next two continuous tiles are TileGroup1, and the next one tile is TileGroup2.

FIG. 27(*b*) is a diagram illustrating a tile group in a case of a rectangular tile group (rect_tile_group_flag==1). In the case of a rectangular tile group, the syntax element top_left_tile_idx, which indicates the tile located at the top left of the rectangular region, and the syntax element bottom_right_tile_idx, which indicates the tile located at the bottom right, are transmitted, and the tiles represented by the two elements are grouped.

In FIG. 27(*b*), an example is illustrated in which, in a case that there are 3×2 tiles, 2×2 tiles on the left side are TileGroup0, 1×1 tile is TileGroup2, and 1×1 tile is TileGroup2.

FIG. 28 is a diagram illustrating a syntax configuration of a parameter set of a tile group according to one form of the present embodiment.

single_tile_in_pic_flag indicates whether or not there is one tile in the picture. In the case of single_tile_in_pic_flag==1, the entire picture is processed as one tile and no more syntax elements are transmitted.

num_tile_columns_minus1 and num_tile_rows_minus1 are the syntax elements that are transmitted in the case of single_tile_in_pic_flag==0, and indicate the number of columns and the number of rows of the tiles in the picture.

uniform_tile_spacing_flag is a syntax element that indicates whether or not to implicitly derive the size of each tile from the number of columns and the number of rows of the tiles. In a case of uniform_tile_spacing_flag==1, the tile size is implicitly derived.

tile_column_width_minus1 and tile_row_height_minus1 are transmitted in a case of uniform_tile_spacing_flag==0, and are syntax elements that explicitly indicate the width and the height of the tile size.

single_tile_per_tile_group_flag is a syntax element that indicates whether or not one tile is used per tile group. In a case that single_tile_per_tile_group_flag does not appear in the coded data (for example, single_tile_in_pic_flag=1), single_tile_per_tile_group_flag may be derived as 1 (infer rule 1).

rect_tile_group_flag is a syntax element that indicates whether or not a rectangular tile group is used as a tile group. rect_tile_group_flag=1 indicates that a rectangular tile group is used. In this case, in the picture parameter set, the information about the tile groups (num_tile_groups_in_pic_minus1, top_left_tile_idx, and bottom_right_tile_idx) is transmitted. In a case that single_tile_per_tile_group_flag is 1, that is, in a case that one tile is used in one tile group, rect_tile_group_flag is not decoded from the coded data and rect_tile_group_flag is derived as 1 (infer rule 2).

num_tile_groups_in_pic_minus1 is a syntax element that indicates the number of tile groups in the picture. For each tile group, tiles included in tile groups are indicated by transmitting top_left_tile_idx and bottom_right_tile_idx. In the PPS, in a case that the number of tiles in the tile group is indicated as one (single_tile_per_tile_group_flag is 1), then num_tile_groups_in_pic_minus1 is not decoded. In the case that num_tile_groups_in_pic_minus1 is not decoded (in a case that num_tile_groups_in_pic_minus1 does not appear), num_tile_groups_in_pic_minus1 is set equal to 0.

top_left_tile_idx is a syntax element that indicates the index of the top left tile of the tile group. bottom_right_tile_idx is a syntax element that indicates the index of the bottom right tile of the tile group.

The coded data of the tile group is composed of header information tile_group_header( ) and data information tile_group_data( ). tile_group_header( ) illustrated in FIG. 29 transmits information common to the tiles in the tile group. For tiles, the syntax elements tile_group_address and num_tiles_in_tile_group_minus1 may be included. Here, tile_group_address is included in a case that it is not a rectangular tile group, and indicates the tile index at the beginning of the tile group. num_tiles_in_tile_group_minus1 is included in a case that it is not a rectangular tile group, and indicates the number of tiles included in the tile group. In the case that it is not a rectangular tile group, the tile group is composed of num_tiles_in_tile_group_minus1+1 of continuous tiles.

tile_group_type may be included as a syntax element common to tile groups. tile_group_type corresponds to the conventional coded syntax slice_type, and identifies whether the tile group is coded data constituted only by intra prediction or coded data constituted by inter prediction. tile_group_type may identify a P picture that generates a prediction image from one reference picture and a B picture that generates a prediction image from two or more reference pictures even in the coded data constituted by the inter prediction.

Tile Group and WPP Enabled Flag

Both the tile and the WPP (CTU rows) in the tile group split the tile group into segments and perform parallel processing in segment units. Intra prediction between segments is basically prohibited in the tiles and basically allowed in the CTU rows. Except for the beginning of the tile group, the entry point for indicating the byte position of the bit stream is transmitted at the beginning of the segment.

The configuration is as follows.

Syntax to signal the WPP enabled flag entropy_coding_sync_enabled_flag

Value limit or decoding limit of the WPP enabled flag

CTU scan order in the tile group (tile based CTU scan order (tile scan) or tile group based CTU scan order)

In the following, a configuration will be described in which the WPP enabled flag entropy_coding_sync_enabled_flag is signaled in the tile group, and then a configuration will be described in which entropy_coding_sync_enabled_flag is signaled in the picture parameter set. The value limit or the decoding limit of the WPP enabled flag and the CTU scan order will be described as a sub configuration of each configuration.

Configuration of Transmitting WPP Enabled Flag in Tile Group

Figure 30:
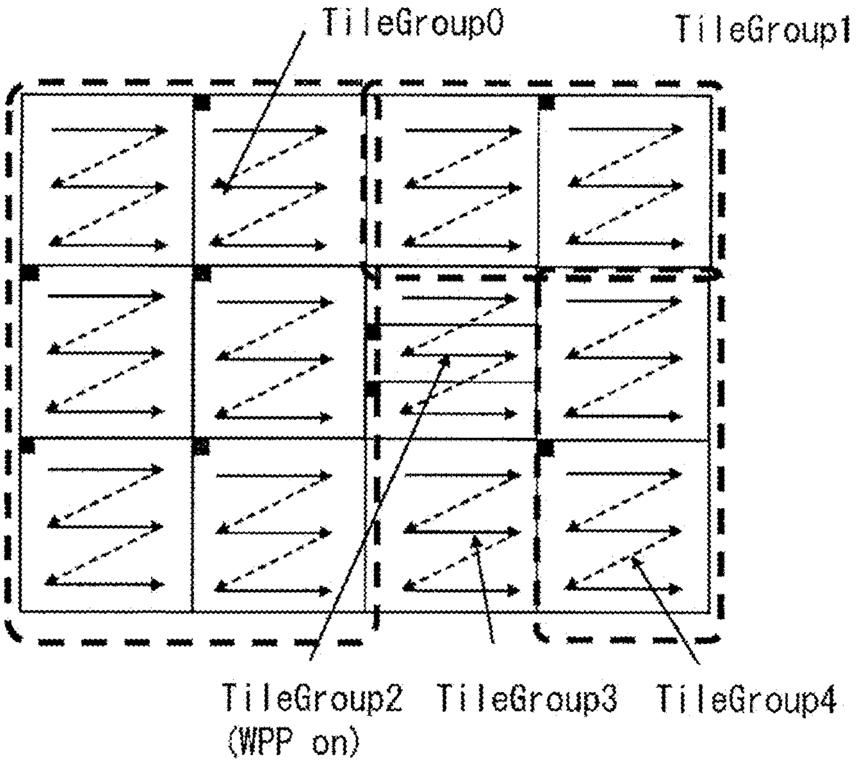
FIG. 30 is a diagram illustrating a relationship between tile groups and a tile based CTU scan order of a wavefront processing (CTU row segment) according to one form of the present embodiment.

FIG. 30 is a diagram illustrating a relationship between tile groups and a wavefront processing (CTU row segment) according to one form of the present embodiment. Here, the scan order of the CTUs is the tile scan order, and the raster scan of the CTUs is performed in tile units. In this figure, an example is illustrated in which, in a case that there are 4×3 tiles in the picture, 2×3 tiles on the left side are TileGroup0, 2×1 tiles on the top right are TileGroup1, 1×1 tile is TileGroup2, 1×1 tile is TileGroup3, and 1×2 tiles are TileGroup4. TileGroup2 composed of 1×1 tile is the tile group in which wavefront processing (WPP) is on. In other words, TileGroup2 is coded by further splitting the tile (tile group) into segments of CTU rows. Note that tile indexes in the picture are given in raster scan order.

FIG. 31 is a diagram illustrating a syntax configuration of a header of a tile group and wavefront processing according to one form of the present embodiment. The same parts as the syntax elements described in FIG. 29 are omitted from the description. In the present embodiment, entropy_coding_sync_enabled_flag is included in the coded data and transmitted in a case that the number of tiles in the tile group is one.

The header coder 1110 or the header decoder 3020 codes or decodes information about tiles included in the tile group in the parameter set or the tile group header. Specifically, the header coder 1110 or the header decoder 3020 codes or decodes top_left_tile_idx and bottom_right_tile_idx in a case of rect_tile_group_flag=1, and decodes tile_group_address and num_tiles_in_tile_group_minus1 in a case of rect_tile_group_flag=0.

The header coder 1110 and the header decoder 3020 derive the number of tiles included in the tile group NumTilesInTileGroup from top_left_tile_idx and bottom_right_tile_idx by the following pseudocode in the case of rect_tile_group_flag=1. That is, by dividing the difference deltaTileIdx between the top left tile index and the bottom right tile index by the number of rows of tiles in the picture (num_tile_columns_minus1+1), the number of rows of tiles in the tile group (number of tiles in the vertical direction) NumTileRowsInTileGroupMinus1 and the number of columns of tiles (number of tiles in the horizontal direction) NumTileColumnsInTileGroupMinus1 are derived. NumTilesInTileGroup is derived from the product of the number of tiles in the horizontal direction and the number of tiles in the vertical direction. Specifically, the difference deltaTileIdx [i] between the top left tile index top_left_tile_idx [i] and the bottom right tile index bottom_right_tile_idx [i] is derived. I is the identifier of the tile group.

deltaTileIdx [i]=bottom_right_tile_idx [i]−top_left_tile_idx [i]

Next, the number of tiles in the horizontal direction and the number of tiles in the vertical direction of the tile group are derived from the difference deltaTileIdx [i] and the number of tiles in the horizontal direction in the picture (num_tile_columns_minus1+1). Here, a value obtained by subtracting 1 from the number of tiles is derived.

```
NumTileRowsInTileGroupMinus1 [i] = (deltaTileIdx [i] /
(num_tile_columns_minus1 + 1))
NumTileColumnsInTileGroupMinus1 [i] = (deltaTileIdx [i] %
(num_tile_columns_minus1 + 1))
```

Finally, the number of tiles in the tile group NumTilesInTileGroup is derived from the product of the tile width and height of the tile group.

```
NumTilesInTileGroup [i] = (NumTileRowsInTileGroupMinus1 [i] + 1) *
(NumTileColumnsInTileGroupMinus1 [i] + 1)
```

For example, in the example of FIG. 30, the picture is 4×3 tiles, so that num_tile_columns_minus1+1=4. The top left tile index top_left_tile_idx and the bottom right tile index bottom_right_tile_idx for each tile group i=0, . . . , 4 is as follows.

```
top_left_tile_idx [0] = 0, bottom_right_tile_idx [0] = 9
top_left_tile_idx [1] = 2, bottom_right_tile_idx [1] = 3
top_left_tile_idx [2] = 6, bottom_right_tile_idx [2] = 6
top_left_tile_idx [3] = 7, bottom_right_tile_idx [3] = 11
top_left_tile_idx [4] = 10, bottom_right_tile_idx [4] = 10
Thus, TileGroup0 is
NumTileRowsInTileGroupMinus1 [0] = deltaTileIdx [0]
= bottom_right_tile_idx [0] − top_left_tile_idx [0] /
(num_tile_columns_minus1 + 1)
= (9 − 0) / 4 = 2
NumTileColumnsInTileGroupMinus1 [0] = (9 − 0) % 4 = 1
NumTilesInTileGroup [0] = (1 + 1) * (2 + 1) = 6
TileGroup1 is derived as
NumTileRowsInTileGroupMinus1 [1] = (3 − 2) / 4 = 0
NumTileColumnsInTileGroupMinus1 [1] = (3 − 2) % 4 = 1
NumTilesInTileGroup [1] = (0 + 1) * (1 + 1) = 2.
TileGroup2 is derived as
NumTileRowsInTileGroupMinus1 [2] = (6 − 6) / 4 = 0
NumTileColumnsInTileGroupMinus1 [2] = (6 − 6) % 4 = 0
NumTilesInTileGroup [2] = (0 + 1) * (0 + 1) = 1.
TileGroup3 is derived as
NumTileRowsInTileGroupMinus1 [3] = (11 − 7) / 4 = 1
NumTileColumnsInTileGroupMinus1 [3] = (11 − 7) % 4 = 0
NumTilesInTileGroup [2] = (1 + 1) * (0 + 1) = 2.
TileGroup4 is derived as
NumTileRowsInTileGroupMinus1 [4] = (10 − 10) / 4 = 0
NumTileColumnsInTileGroupMinus1 [4] = (10 − 10) % 4 = 0
NumTilesInTileGroup [4] = (0 + 1) * (0 + 1) = 1.
```

Furthermore, the header coder 1110 and the header decoder 3020 may derive the index TgTileIdx [tIdx] of tiles within the tile group as follows. Here, TgTileIdx [tIdx] is a table for deriving the index tileIdx of tiles in the picture from the index tIdx of the tiles in the tile group.

```
tileGroupIdx = 0
  while (tile_group_address != rect_tile_group_id [tileGroupIdx])
    tileGroupIdx++
NumTilesInCurrTileGroup = NumTilesInTileGroup [tileGroupIdx]
tileIdx = top_left_tile_idx [tileGroupIdx]
for (j = 0, tIdx = 0; j < (NumTileRowsInTileGroupMinus1
[tileGroupIdx] + 1);
j++, tileIdx += num_tile_columns_minus1 + 1) {
  for (i = 0, currTileIdx = tileIdx; i <
  (NumTileColumnsInTileGroupMinus1
[tileGroupIdx] + 1); i++, currTileIdx++, tIdx++) {
    TgTileIdx [tIdx] = currTileIdx
  }
}
```

The header coder 1110 and the header decoder 3020 derives the number of tiles included in the tile group NumTilesInTileGroup and the index TgTileIdx [tIdx] of tiles in the tile group by the following pseudocode from num_tiles_in_tile_group_minus1 in the case of rect_tile_group_flag==0.

```
NumTilesInTileGroup = num_tiles_in_tile_group_minus 1 + 1
TgTileIdx [0] = tile_group_address
for (i = 1; i < NumTilesInTileGroup; i++)
  TgTileIdx [i] = TgTileIdx [i − 1] + 1
```

Furthermore, the header coder 1110 and the header decoder 3020 may derive the number of tiles included in the target tile group by the following equation at the time of coding and decoding the tile group header according to the following equation.

```
NumTilesInCurrTileGroup = rect_tile_group_flag ?
NumTilesInTileGroup
[tileGroupIdx] : (num_tiles_in_tile_group_minus1 + 1)
```

The header coder 1110 or the header decoder 3020 codes or decodes entropy_coding_sync_enabled_flag in a case that the number of tiles included in the tile group NumTilesInCurrTileGroup is one.

As illustrated in FIG. 30, in the picture, scan is performed in order of each tile group. Each tile is scanned in raster order within the tile group and CTB (CTU) is scanned in raster order in each tile (tile scan). The method for deriving the tile scan order described above is as described already (Method 1 for Deriving CTU Scan Order in Picture). In the tile groups (TileGroup0, TileGroup1, TileGroup3, and TileGroup4) of WPP off (entropy_coding_sync_enabled_flag==0), the segments are tile units, and in the tile groups (TileGroup2) of WPP on (entropy_coding_sync_enabled_flag==1), the segments are CTU row units in the tile. The entry point is coded or decoded except for the starting segment of the tile group. That is, the tile group in the case that the WPP is off has entry points of the number of tiles−1, and the tile group in the case that the WPP is on has entry points of the number of CTU rows in the tile−1. The entry points are signaled at the positions illustrated in FIG. 30.

The header coder 1110 or the header decoder 3020 codes or decodes NumEntryPoint (=number of CTU rows included in the tile group TileGroupHeightInCtbsY−1) of entry points in the case that the WPP is on (entropy_coding_sync_enabled_flag==1). The header coder 1110 or the header decoder 3020 codes or decodes NumEntryPoint (=number of tiles in the tile group NumTilesInCurrTileGroup−1) of entry points in the case that the WPP is off (entropy_coding_sync_enabled_flag==0). The number of entry points may be derived in the following equations.

Here, in a case that the number of tiles included in the target tile group is one, the number of CTU rows included in the target tile group TileGroupHeightInCtbsY (height of the target tile in CTU units TileHeightInCtbsY) may be derived by the following equations.

```
ctbAddrInTs = FirstCtbAddrTs [tileIdx]
CtbAddrInRs = CtbAddrTsToRs [ctbAddrInTs]
tbX = CtbAddrInRs % PicWidthInCtbsY
tbY = CtbAddrInRs / PicWidthInCtbsY
for (j = 0; j <= num_tile_rows_minus1; j++)
  if (tbY >= RowBd [j])
    tileY = j
TileGroupHeightInCtbsY = RowHeight [tileY]
```

TileGroupHeightInCtbsY is also referred to as the number of CTUs indicating the height of the tile group, and TileHeightInCtbsY is also referred to as the number of CTUs indicating the height of the tile.

Taking into account the case that the number of tiles in the tile group is not one, the height RowHeight of each tile in the tile group may be added to derive the number of CTUs indicating the height of the tile group TileGroupHeightInCtbsY as follows. For example, the height of each tile RowHeight is added for the number of tiles in the height of the tile group (NumTileRowsInTileGroupMinus1 [tileGroupIdx]+1).

```
tbX = CtbAddrInRs % PicWidthInCtbsY
tbY = CtbAddrInRs / PicWidthInCtbsY
for (j = 0; j <= num_tile_rows_minus1; j++)
 if (tbY >= RowBd [j])
  tileY = j
TileHeightInCtbsY = RowHeight [tileY]
TileGroupHeightInCtbsY = 0
for (j = 0; j < (NumTileRowsInTileGroupMinus1 [tileGroupIdx] + 1;
j = j + 1)
 TileGroupHeightInCtbsY += RowHeight [tileY + j]
```

Here, tileY is a value indicating the position in the picture (or in a sub-picture) of the top left tile of the target tile group, and may be derived by the method described above. Note that tileY is a value in tile units.

Derivation of TileGroupWidthInCtbsY

The number of CTUs indicating the width of the tile group TileGroupWidthInCtbsY may be derived as follows. For example, the height of each tile ColWidth is added for the number of tiles in the width of the tile group (NumTileColsInTileGroupMinus1 [tileGroupIdx]+1).

```
tbX = CtbAddrInRs % PicWidthInCtbsY
tbY = CtbAddrInRs / PicWidthInCtbsY
 for (i = 0; i <= num_tile_columns_minus1; i++)
  if (tbX >= ColBd [i])
   tileX = i
TileWidthInCtbsY = ColWidth [tileX]
TileGroupWidthInCtbsY = 0
for (j = 0; j < (NumTileColsInTileGroupMinus1 [tileGroupIdx] + 1;
j = j + 1)
 TileGroupWidthInCtbsY += ColWidth [tileX + j]
```

Here, tileX is a value indicating the position in the picture (or in a sub-picture) in the tile units of the top left tile of the target tile group, and may be derived in the method described above.

The configuration described above achieves the effect that entry points of the tile and the wavefront can be shared in one tile group (within a segment group).

The above-described configuration also achieves the effect that the tile (multiple tiles) can be enabled in one tile group, and the wavefront can be enabled in another tile group.

Figure 32:
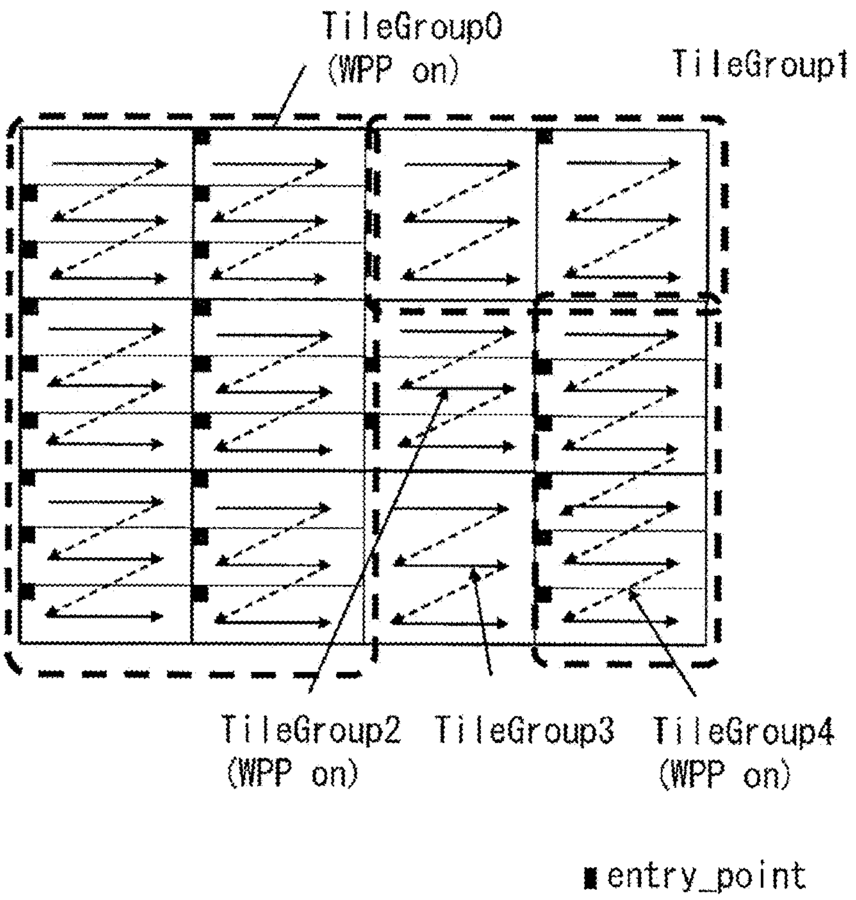
FIG. 32 is a diagram illustrating a relationship between tile groups and a tile based CTU scan order of a wavefront processing (CTU row segment) according to one form of the present embodiment.

Configuration that WPP is Available in a Case of Rectangular Tile Group or a Case that the Number of Tiles is One FIG. 32 is a diagram illustrating a relationship between tile groups and a wavefront processing (CTU row segment) according to one form of the present embodiment. In the example of FIG. 30, the WPP is available only in the case that the number of tiles in the tile group is one, but in the present example, the WPP is available in a case of a rectangular tile group or in a case that there is one tile in tile group. In this figure, an example is illustrated in which the rectangular tile group is enabled, and the WPP is enabled in TileGroup0, TileGroup2, and TileGroup4. In TileGroup0 and TileGroup4, multiple tiles are included in the tile groups, but the WPP are turned on within the tiles. Regardless of the WPP turning on or off, the tile groups are scanned for each tile in raster order, and the CTUs are further scanned in raster order in each tile (tile scan order).

Figure 35:
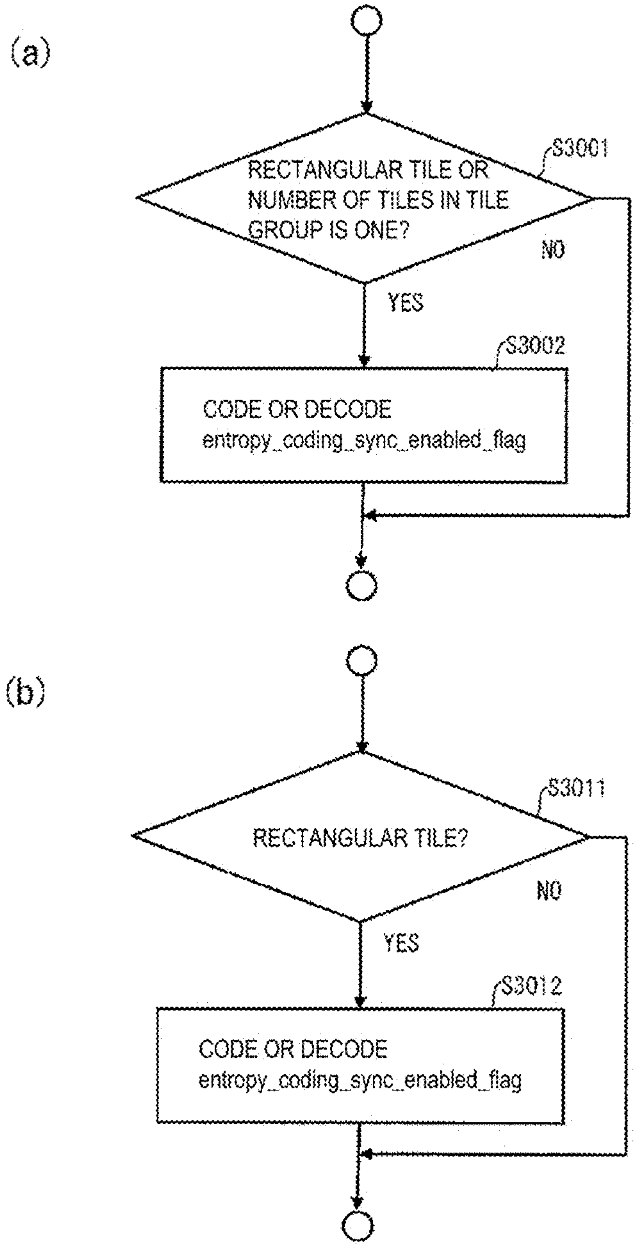
FIG. 35 is a diagram illustrating operations of a header coder 1110 and a header decoder 3020 in a configuration including an exclusive configuration of the tile and the wavefront.

FIG. 33 is a diagram illustrating a syntax configuration of a header of a tile group and wavefront processing according to one form of the present embodiment. FIG. 35(*a*) is a diagram illustrating operations of the header coder 1110 and the header decoder 3020 including an exclusive configuration of the tile and the wavefront.

As illustrated in the syntax configuration and the flowchart of the figures, in a case that the number of tiles in the picture is one (single_tile_in_pic_flag==1), or in a case of a rectangular tile group (rect_tile_group_flag==1), or in a case of NumTilesInCurrTileGroup==1 (YES at S3001), the header coder 1110 or the header decoder 3020 codes or decodes entropy_coding_sync_enabled_flag (S3002). Otherwise, entropy_coding_sync_enabled_flag is set equal to 0 (WPP off).

```
  if (single_tile_in_pic_flag || rect_tile_group_flag ||
  NumTilesInCurrTileGroup =
= 1)
entropy_coding_sync_enabled_flag
```

As illustrated in FIG. 32, in the picture, each tile group is scanned in order. Each tile is scanned in raster scan order within the tile group and CTUs are scanned in raster scan order in each tile. In the tile groups (TileGroup1, and TileGroup3) of WPP off (entropy_coding_sync_enabled_flag==0), the segments are tile units, and in the tile groups (TileGroup0, TileGroup2, TileGroup4) of WPP on (entropy_coding_sync_enabled_flag==1), the segments are CTU row units in the tile. The entry point is coded or decoded except for the starting segment of the tile group. That is, the tile group of the WPP being off has entry points of the number of tiles−1, and the tile group in the case that the WPP is on has entry points of the number of CTU rows in the tile−1. The entry points are as illustrated in FIG. 32.

The header coder 1110 or the header decoder 3020 codes or decodes entry points of the product of the number of tiles in the horizontal direction NumTileColumnsInTileGroupMinus1+1 and the number of CTU rows TileGroupHeightInCtbsY included in the tile group−1 in the case that the WPP is on (entropy_coding_sync_enabled_flag==1). The header coder 1110 or the header decoder 3020 codes or decodes entry points of the number of tiles in the tile group NumTilesInCurrTileGroup−1 in the case that the WPP is off (entropy_coding_sync_enabled_flag==0). The number of entry points may be derived in the following equation.

```
  NumEntryPoint = entropy_coding_sync_enabled_flag ?
(NumTileColumnsInTileGroupMinus1 + 1) *
TileGroupHeightInCtbsY − 1 :
NumTilesInCurrTileGroup − 1
```

The configuration described above achieves the effect that the tiles in the tile group can be further split into CTU row segments for processing, so that the number of parallels can be increased.

The configuration described above also achieves the effect that the degree of parallelism can be freely selected because the tile group can select whether or not to further split the tiles in the tile group into segments of CTU rows.

The configuration described above also achieves the effect of preventing the processing from becoming complicated by splitting the tiles into CTU row segments in the case that the tile group is not rectangular because the tiles in the tile group can be split into CTU row segments only in a case of a rectangular tile group or in a case that the number of tiles in the tile group is one.

Configuration that WPP is Available in a Case of Rectangular Tile Group

FIG. 34 is a diagram illustrating a syntax configuration of a header of a tile group and wavefront processing according to one form of the present embodiment. FIG. 35(*b*) is a diagram illustrating operations of the header coder 1110 and the header decoder 3020 in a configuration including an exclusive configuration of the tile and the wavefront.

As illustrated in the figure, in a case that the number of tiles in the picture is one (single_tile_in_pic_flag==1), or in a case of a rectangular tile group (rect_tile_group_flag==1) (S3011), the header coder 1110 or the header decoder 3020 codes or decodes entropy_coding_sync_enabled_flag (S3012). Otherwise, entropy_coding_sync_enabled_flag is set equal to 0 (WPP off).

```
if (single_tile_in_pic_flag || rect_tile_group_flag)
  entropy_coding_sync_enabled_flag
```

The header decoder 3020 may derive rect_tile_group_flag as 1 in a case that single_tile_in_pic_flag is 1. For example, in a case that single_tile_per_tile_group_flag does not appear in the coded data (for example, in a case of single_tile_in_pic_flag=1), single_tile_per_tile_group_flag may be derived as 1, and in a case of single_tile_per_tile_group_flag, rect_tile_group_flag may be derived as 1. In this case, in the case of a rectangular tile group (rect_tile_group_flag==1) (S3011), the header coder 1110 or the header decoder 3020 codes or decodes entropy_coding_sync_enabled_flag (S3012). Otherwise, entropy_coding_sync_enabled_flag is set equal to 0 (WPP off).

```
if (rect_tile_group_flag)
  entropy_coding_sync_enabled_flag
```

The configuration described above achieves the effect that the tiles in the tile group can be further split into CTU row segments for processing, so that the number of parallels can be increased.

Figure 37:
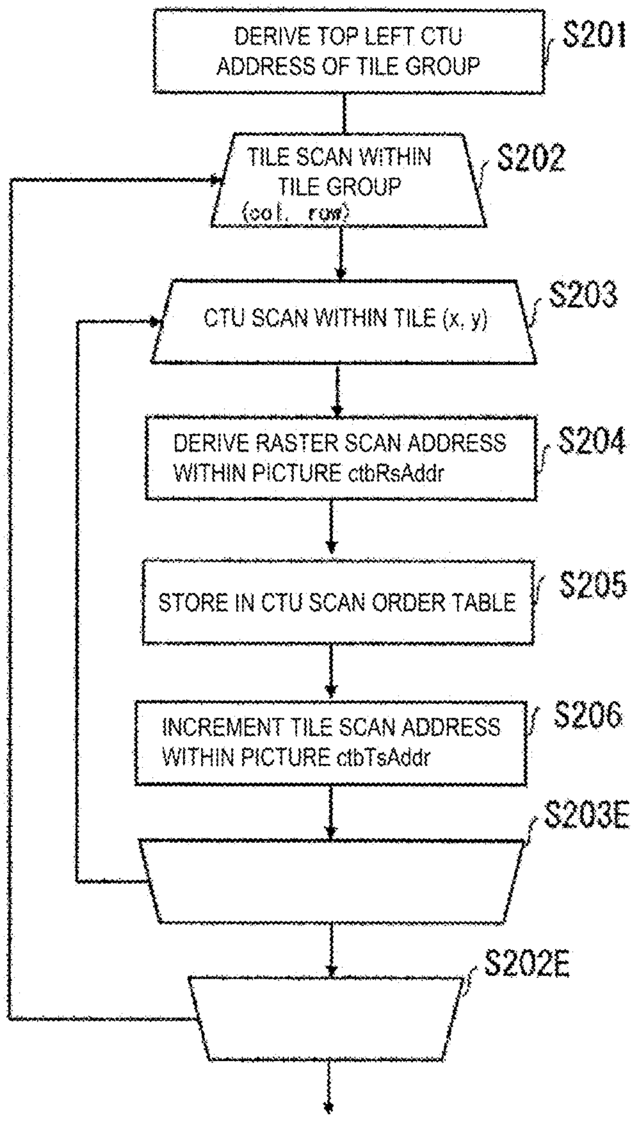
FIG. 37 is a flowchart diagram illustrating a method for deriving a tile based CTU scan order.

The configuration described above also achieves the effect of preventing the processing from becoming complicated by splitting the tiles into CTU row segments in the case that the tile group is not rectangular because the tiles in the tile group can be split into CTU row segments only in a case of a rectangular tile group. Tile Based CTU Scan Order FIG. 37 is a flowchart diagram illustrating a method for deriving a tile based CTU scan order.

The CT information decoder 3021 (or the parameter decoder 302) or the CT information coder 1111 (or the header coder 1110) may derive CtbAddrRsToTs[ ] by the following processing.

```
(S201)
    tileGroupTLCol = top_left_tile_idx [i] % (num_tile_columns_minus1 + 1)
    tileGroupTLRow = top_left_tile_idx [i] / (num_tile_columns_minus 1 + 1)
    tileGroupXInCtbY = 0
    tileGroupYInCtbY = 0
    for (j = 0; j < tileGroupTLCol; j++)
      tileGroupXInCtbY = tileGroupXInCtbY + ColWidth [j]
    for (j = 0; j < tileGroupTLRow; j++)
      tileGroupYInCtbY = tileGroupYInCtbY + RowHeight [j]
tileYInCtb = tileGroupYInCtbY
(S202)
    for (row = 0; row <= NumTileRowsInTileGroupMinus1 [i]; row++) {//
TileRasterScanInTileGroup
      tileYInCtb = tileYInCtb + RowHeight [tileGroupTLRow + row]
      tileXInCtb = tileGroupXInCtbY
      for (col = 0; col <= NumTileColsInTileGroupMinus1 [i]; col++) {//
TileRasterScanInTileGroup
        tileXInCtb = tileXInCtb + ColWidth [tileGroupTLCol + col]
    (S203)
    for (y = 0; y < RowHeight [tileGroupTLRow + row]; y++) {// CtbRasterScan in
Tile
      for (x = 0; x < ColWidth [tileGroupTLCol + col]; x++) {// CtbRasterScan in
Tile
      (S204)
      ctbAddrRs = (x + tileXInCtb) + (y + tileYInCtb) * PicHeightInCtbsY
      (S205)
      CtbAddrRsToTs [ctbAddrRs] = ctbAddrTs
      CtbAddrTsToRs [ctbAddrTs] = ctbAddrRs
      (S206)
      ctbAddrTs++
      }
    }
  }
}
```

S201: The top left tile addresses of the tile group tileGroupTLCol and tileGroupTLRow are derived. The top left CTU addresses of the tile group tileGroupXInCtbY and tileGroupYInCtbY are derived.

S202: The tiles in the target tile group are raster scanned using the height in tile units (NumTileRowsInTileGroupMinus1) and the width in tile units (NumTileColumnsInTileGroupMinus1) of the tile group.

S203: The CTUs in the tile are raster scanned using the height in CTU units ColHeight and ColWidth in CTU units of the tile.

S204: The raster scan CTU address ctbAddrRs in the picture of the target CTU is derived from the X coordinate (x+tileGroupXInCtbY) and the Y coordinate (y+tileGroupYInCtbY) in the CTU units in the picture.

S205: CTU addresses are stored in the table associating ctbAddrRs and ctbAddrTs. Here, both CtbAddrRsToTs[ ] and CtbAddrTsToRs[ ] are derived, but only one (for example, CtbAddrRsToTs[ ]) may be derived and the other (CtbAddrTsToRs[ ]) may be derived using (Method 0 for Deriving CTU Scan Order in Picture).

S206: ctbAddrTs is incremented by 1.

Figure 36:
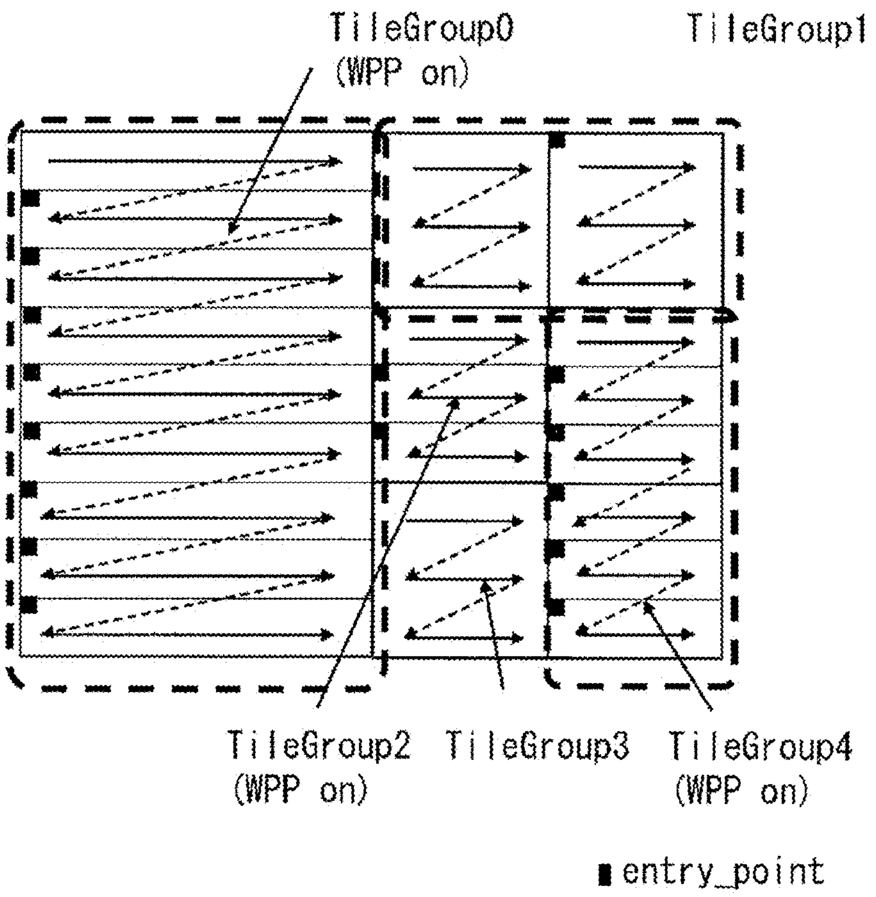
FIG. 36 is a diagram illustrating a relationship between tile groups and a wavefront processing (CTU row segment) according to one form of the present embodiment. TileGroup1, 3 are by a tile based CTU scan order with a WPP enabled flag of 0, and TileGroup0, 2, 4 are by a tile group based CTU scan order with a WPP enabled flag of 1.

In this example, in a case of a rectangular tile group or in a case that the number of tiles in a tile group is one, the WPP is available. In FIG. 36, an example is illustrated of the rectangular tile group in which the WPP is enabled in TileGroup0, TileGroup2, and TileGroup4. In a case that the WPP is enabled in a rectangular tile group, instead of scanning the CTUs in raster scan order within the tile, the CTUs are scanned in raster scan order within the tile group. That is, the scan order of 2×3 tiles of TileGroup0 is as follows. In a case that the WPP is off, the tile group is scanned in raster order for each tile, and the CTUs is scanned in raster order in each tile. In a case that the WPP is on, the CTUs are scanned in each tile group unit without distinguishing between tiles within the tile group. For example, in a case that the CTUs in the picture are arranged in raster order as follows, and each tile is composed of 3×3 CTUs, 0 1 2 3 4 5 6 7 8 9 10 11
12 13 14 15 16 17 18 19 20 21 22 23
24 25 26 27 28 29 30 31 32 33 34 35
36 37 38 39 40 41 42 43 44 45 46 47
48 49 50 51 52 53 54 55 56 57 58 59
60 61 62 63 64 65 66 67 68 69 70 71
72 73 74 75 76 77 78 79 80 81 82 83
84 85 86 87 88 89 90 91 92 93 94 95
96 97 98 99 100 101 102 103 104 105 106 107

In the case of WPP off, the CTU scan order of TileGroup0 is as follows.

0 1 2 12 13 14 24 25 26
3 4 5 15 16 17 27 28 29
36 37 38 48 49 50 60 61 62
39 40 41 51 52 53 63 64 65
72 73 74 84 85 86 96 97 98
75 76 77 87 88 89 99 100 101

In the case of WPP on, the CTU scan order of TileGroup0 is as follows.

0 1 2 3 4 5
12 13 14 15 16 17
24 25 26 27 28 29
36 37 38 39 40 41
48 49 50 51 52 53
60 61 62 63 64 65
72 73 74 75 76 77
84 85 86 87 88 89
96 97 98 99 100 101

FIG. 39 is a diagram illustrating a syntax configuration of a header of a tile group and wavefront processing according to one form of the present embodiment.

Furthermore, the header coder 1110 and the header decoder 3020 may derive the number of tiles included in the target tile group by the following equation at the time of coding and decoding the tile group header according to the following equation.

```
NumTilesInCurrTileGroup = rect_tile_group_flag ?
NumTilesInTileGroup
[tileGroupIdx] : (num_tiles_in_tile_group_minus1 + 1)
```

In a case that the number of tiles in the picture is one (single_tile_in_pic_flag==1) or in a case of a rectangular tile group (rect_tile_group_flag==1) or in a case that the number of tiles included in the tile group NumTilesInCurrTileGroup is one, the header coder 1110 and the header decoder 3020 codes or decodes entropy_coding_sync_enabled_flag.

```
if (single_tile_in_pic_flag || rect_tile_group_flag ||
NumTilesInCurrTileGroup =
= 1)
  entropy_coding_sync_enabled_flag
```

Note that in the case that the number of tiles in the picture is one (single_tile_in_pic_flag==1) or in the case of a rectangular tile group (rect_tile_group_flag==1), the header coder 1110 and the header decoder 3020 may code or decode entropy_coding_sync_enabled_flag.

```
if (single_tile_in_pic_flag || rect_tile_group_flag)
  entropy_coding_sync_enabled_flag
```

Figure 38:
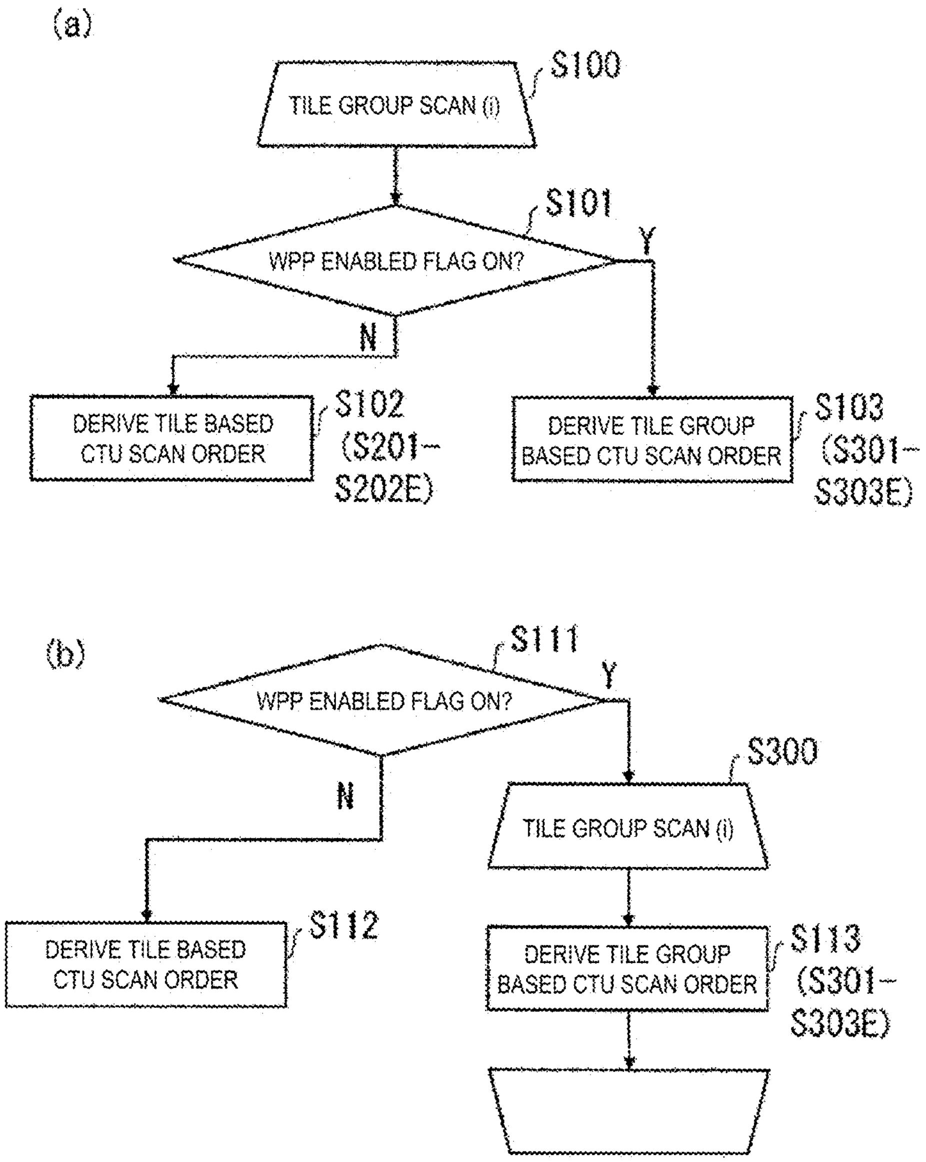
FIG. 38 is an example of a flowchart in a case of deriving a CTU scan for the entire picture. (a) thereof indicates the case that the switching unit is a tile group, and (b) thereof indicates the case that the switching unit is a picture.

Method 2 for Deriving CTU Scan Order in Picture, Tile Group Based CTU Scan Order In a case that entropy_coding_sync_enabled_flag signaled in the picture parameter set is on, the CT information decoder 3021 may derive CtbAddrRsToTs[ ] by the following processing. In this derivation method, the CTU scan order is derived by performing a scan in the picture in a tile group order (TileGroupLoop) and then performing a raster scan (CtbRasterScan in TileGroup) in the tile group in CTU order. FIG. 38(b) illustrates a flowchart of the present configuration. Note that in a case that entropy_coding_sync_enabled_flag signaled in picture units is off, CtbAddrRsToTs[ ] is derived using the tile based CTU scan order as already described in Method 1 for Deriving CTU Scan Order in Picture.

According to the configuration described above, in the case that the WPP is on and the tile group is composed of multiple tiles, one region gathering tiles in a tile group can be split into CTU row segments by changing the CTU scan order. As a result, the tile group is not unnecessarily split, and the performance is improved. The segmentation of the tile and the WPP (CTU rows) is exclusive in the tile group, so the effect of simplifying the process is achieved.

Note that the configuration of the tile group header is as illustrated in FIG. 41(a) and is the same as that of FIG. 39 except that entropy_coding_sync_enabled_flag is not included. That is, the number of entry points is derived according to the following equation.

```
NumEntryPoint = entropy__coding__sync__enabled__flag ?
TileGroupHeightInCtbsY − 1
NumTilesInCurrTileGroup − 1
```

Configuration of Transmitting WPP Enabled Flag in Parameter Set

In the following, a configuration for signaling the WPP enabled flag in the parameter set instead of the tile group header will be described. The following configuration achieves the common effect of knowing whether or not parallel decoding of segments is possible before decoding the tile group. The following configuration also achieves the effect that the positions of the entry points are clear throughout the picture by selecting whether or not to use WPP in picture units. The following configuration also achieves the effect that capability can be easily exchanged between the video decoding apparatus and the video coding apparatus or the image transmission system.

Parameter Set Transmission+Tile Based CTU Scan

FIG. 42 is a diagram illustrating a syntax configuration of a parameter set of a tile group and wavefront processing according to one form of the present embodiment. In this configuration, the header coder 1110 or the header decoder 3020 codes or decodes one entropy_coding_sync_enabled_flag in a picture in a parameter set instead of a tile group header.

Figure 40:
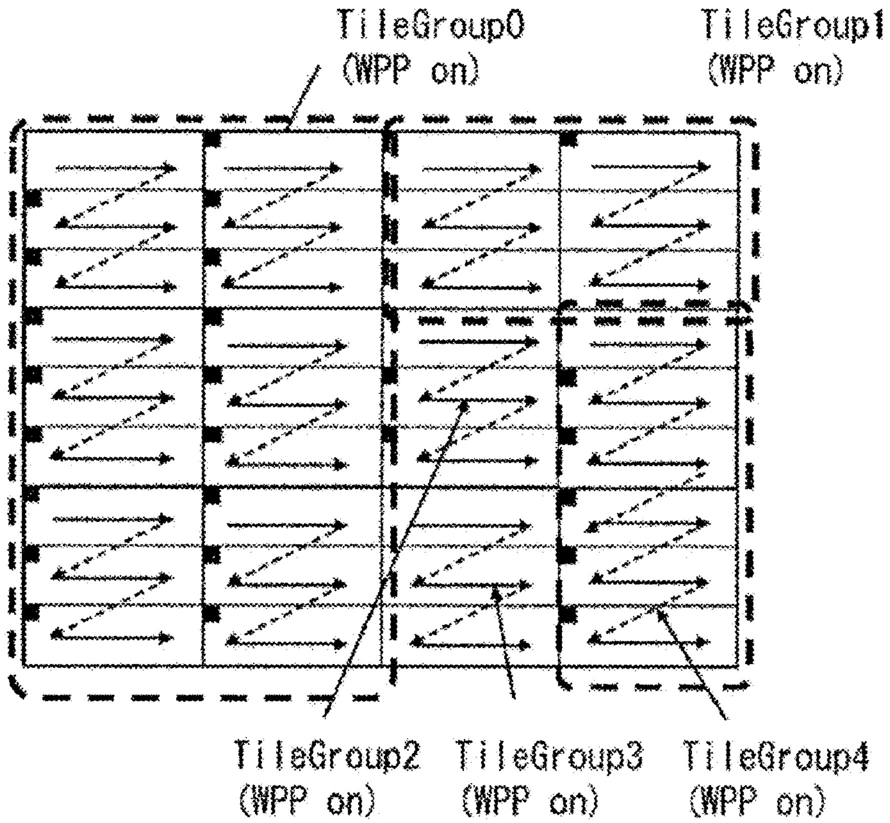
FIG. 40 is a diagram illustrating a relationship between tile groups and a wavefront processing (CTU row segment) according to one form of the present embodiment.

FIG. 40 is a diagram illustrating a relationship between tile groups and a wavefront processing (CTU row segment) according to one form of the present embodiment. FIG. 40 illustrates an example in which the WPP is used in all tile groups, TileGroup0, TileGroup1, TileGroup2, TileGroup3, and TileGroup4. This configuration achieves the effect that processing of the decoding apparatus is easy by selecting whether or not to use WPP in picture units.

In the present embodiment, as described in Method 1 for Deriving CTU Scan Order in Picture and FIG. 37, a tile based scan (scanning of the tiles in the tile groups and scanning of the CTUs in the tiles) is performed. Thus, tile groups are split into segments with the tile width in the horizontal direction and the CTU height included in tile groups. The number of segments in the tile group is the product of the number of tiles in the horizontal direction (NumTileColumnsInTileGroupMinus1+1) and the number of CTU rows (TileGroupHeightInCtbsY). The configuration of the tile group header is as illustrated in FIG. 41(*b*) and does not signal entropy_coding_sync_enabled_flag. Instead, reference is made to entropy_coding_sync_enabled_flag of the picture parameter set. Here, entry points of the number of segments−1 are decoded.

```
NumEntryPoint = entropy__coding__sync__enabled__flag ?
(NumTileColumnsInTileGroupMinus1 + 1) *
TileGroupHeightInCtbsY − 1 :
NumTilesInCurrTileGroup − 1
```

This configuration achieves the effect of knowing whether or not parallel decoding of segments is possible before decoding the tile group because whether or not it is a rectangular tile group can be identified by the picture parameter set.

In addition, only in a case that the number of tiles in the picture is one or the number of tiles in the tile group is one, the decoding apparatus for decoding the coded data with the limitation that entropy_coding_sync_enabled_flag is 1 decodes the following number of entry points as in the configuration of FIG. 41(*a*).

```
NumEntryPoint = entropy__coding__sync__enabled__flag ?
TileGroupHeightInCtbsY −
1 : NumTilesInCurrTileGroup − 1
```

In this case, the configuration achieves the effect that the tiles and the CTU row segments can be exclusively processed in the tile group.

Configuration 3 of Parameter Set Transmission+Tile Based CTU Scan+Rectangular Tile Group In a case of a tile group including two or more tiles (tile index is i), the video decoding apparatus that decodes the coded data in which entropy_coding_sync_enabled_flag [i] is always 1 achieves the effect that the tiles and CTU row segments can be exclusively processed in the tile group.

In this configuration, tile groups are split into segments with the CTU height. The number of segments in the tile group is the number of CTU rows (TileGroupHeightInCtbsY). The configuration of the tile group header is as illustrated in FIG. 41(*a*) and refers to entropy_coding_sync_enabled_flag of the picture parameter set without including entropy_coding_sync_enabled_flag. Here, entry points of the number of segments−1 (TileGroupHeightInCtbsY−1) are decoded.

```
NumEntryPoint = entropy__coding__sync__enabled__flag ?
TileGroupHeightInCtbsY
− 1 : NumTilesInCurrTileGroup − 1
```

Parameter Set Transmission+Tile Group Based CTU Scan Order

In the following, in a configuration in which the WPP enabled flag is signaled in the parameter set instead of the tile group header, a configuration will be described in which the CTU scan order in the tile group is changed from the tile based CTU scan order to the tile group based CTU scan order in a case that the WPP enabled flag is 1.

Parameter Set Transmission+Tile Group Based CTU Scan Order

FIG. 42 is a diagram illustrating a syntax configuration of a parameter set of a tile group and wavefront processing according to one form of the present embodiment. In this configuration, the header coder 1110 or the header decoder 3020 codes or decodes one entropy_coding_sync_enabled_flag in a picture in a parameter set instead of a tile group header.

In this configuration, tile groups are split into segments with the CTU height. The number of segments in the tile group is the number of CTU rows (TileGroupHeightInCtbsY). The configuration of the tile group header is as illustrated in FIG. 41(*a*) and refers to entropy_coding_sync_enabled_flag of the picture parameter set without including entropy_coding_sync_enabled_flag. Here, entry points of the number of segments−1 (TileGroupHeightInCtbsY−1) are decoded.

```
NumEntryPoint = entropy__coding__sync__enabled__flag ?
TileGroupHeightInCtbsY −
1 : NumTilesInCurrTileGroup − 1
```

The reference picture memory 306 stores a decoded image of the CU generated by the addition unit 312 in a predetermined position for each target picture and target CU.

The prediction parameter memory 307 stores a prediction parameter in a position predetermined for each CTU or CU to be decoded. Specifically, the prediction parameter memory 307 stores a parameter decoded by the parameter decoder 302, the prediction mode predMode separated by the entropy decoder 301, and the like.

To the prediction image generation unit 308, the prediction parameter and the like are input. In addition, the prediction image generation unit 308 reads a reference picture from the reference picture memory 306. The prediction image generation unit 308 generates a prediction image of a block or a subblock by using the prediction parameter and the reference picture (reference picture block). Here, the reference picture block refers to a set of pixels (referred to as a block because they are normally rectangular) on a reference picture and is a region that is referred to for generating a prediction image.

The inverse quantization and inverse transform processing unit 311 performs inverse quantization on a quantization transform coefficient input from the entropy decoder 301 to calculate a transform coefficient. These quantization transform coefficients are coefficients obtained by performing a frequency transform such as Discrete Cosine Transform (DCT) on prediction errors to quantize in coding processing. The inverse quantization and inverse transform processing unit 311 performs an inverse frequency transform such as an inverse DCT on the calculated transform coefficient to calculate a prediction error. The inverse quantization and inverse transform processing unit 311 outputs the calculated prediction error to the addition unit 312.

The addition unit 312 adds the prediction image of the block input from the prediction image generation unit 308 and the prediction error input from the inverse quantization and inverse transform processing unit 311 to each other for each pixel, and generates a decoded image of the block.

The addition unit 312 stores the decoded image of the block in the reference picture memory 306, and also outputs it to the loop filter 305.

Configuration of Video Coding Apparatus

Next, a configuration of the video coding apparatus 11 according to the present embodiment will be described. FIG. 24 is a block diagram illustrating a configuration of the video coding apparatus 11 according to the present embodiment. The video coding apparatus 11 includes a prediction image generation unit 101, a subtraction unit 102, a transform and quantization unit 103, an inverse quantization and inverse transform processing unit 105, an addition unit 106, a loop filter 107, a prediction parameter memory 109, a coding parameter determination unit 110, a parameter coder 111, and an entropy coder 104.

The prediction image generation unit 101 generates a prediction image for each CU that is a region obtained by splitting each picture of an image T. The operation of the prediction image generation unit 101 is the same as that of the prediction image generation unit 308 already described.

The subtraction unit 102 subtracts a pixel value of the prediction image of a block input from the prediction image generation unit 101 from a pixel value of the image T to generate a prediction error. The subtraction unit 102 outputs the prediction error to the transform and quantization unit 103.

The transform and quantization unit 103 performs a frequency transform on the prediction error input from the subtraction unit 102 to calculate a transform coefficient, and derives a quantization transform coefficient by quantization. The transform and quantization unit 103 outputs the quantization transform coefficient to the entropy coder 104 and the inverse quantization and inverse transform processing unit 105.

The inverse quantization and inverse transform processing unit 105 is the same as the inverse quantization and inverse transform processing unit 311 (FIG. 9) in the video decoding apparatus 31. The calculated prediction error is output to the addition unit 106.

The parameter coder 111 includes a header coder 1110, a CT information coder 1111, and a CU coder 1112 (prediction mode coder), and an entropy coder 104, and an inter prediction parameter coder 112 and an intra prediction parameter coder 113 (not illustrated). The CU coder 1112 further includes a TU coder 1114.

General operation of each module will be described below. The parameter coder 111 performs coding processing of parameters such as header information, split information, prediction information, and quantization transform coefficients.

The CT information coder 1111 codes the QT and MT (BT, TT) split information and the like.

The CU coder 1112 codes the CU information, the prediction information, the TU split flag, the CU residual flag, and the like.

In a case that a prediction error is included in the TU, the TU coder 1114 codes the QP update information (quantization correction value) and the quantization prediction error (residual_coding).

The entropy coder 104 transforms the syntax elements input from the supply source into binary data, and generates and outputs the coded data by an entropy coding scheme such as CABAC. In the example illustrated in FIG. 24, the supply source of the syntax elements are the CT information coder 1111 and the CU coder 1112.

The addition unit 106 adds a pixel value of the prediction image of the block input from the prediction image generation unit 101 and the prediction error input from the inverse quantization and inverse transform processing unit 105 to each other for each pixel, and generates a decoded image. The addition unit 106 stores the generated decoded image in the reference picture memory 109.

The loop filter 107 applies a deblocking filter, an SAO, and an ALF to the decoded image generated by the addition unit 106. Note that the loop filter 107 need not necessarily include the above-described three types of filters.

The prediction parameter memory 108 stores the prediction parameters generated by the coding parameter determination unit 110 for each target picture and CU at a predetermined position.

The reference picture memory 109 stores the decoded image generated by the loop filter 107 for each target picture and CU at a predetermined position.

The coding parameter determination unit 110 selects one set among multiple sets of coding parameters. The coding parameters include QT, BT, or TT split information described above, a prediction parameter, or a parameter to be coded which is generated related thereto. The prediction image generation unit 101 generates the prediction image by using these coding parameters.

The coding parameter determination unit 110 calculates, for each of the multiple sets, an RD cost value indicating the magnitude of an amount of information and a coding error, and selects the set of coding parameters that minimizes the cost value. In this manner, the entropy coder 104 outputs a set of selected coding parameters as the coding stream Te.

The coding parameter determination unit 110 stores the determined coding parameters in the prediction parameter memory 108.

Note that, some of the video coding apparatus 11 and the video decoding apparatus 31 in the above-described embodiments, for example, the entropy decoder 301, the parameter decoder 302, the loop filter 305, the prediction image generation unit 308, the inverse quantization and inverse transform processing unit 311, the addition unit 312, the prediction image generation unit 101, the subtraction unit 102, the transform and quantization unit 103, the entropy coder 104, the inverse quantization and inverse transform processing unit 105, the loop filter 107, the coding parameter determination unit 110, and the parameter coder 111, may be realized by a computer. In that case, this configuration may be realized by recording a program for realizing such control functions on a computer-readable recording medium and causing a computer system to read the program recorded on the recording medium for execution. Note that the "computer system" mentioned here refers to a computer system built into either the video coding apparatus 11 or the video decoding apparatus 31 and is assumed to include an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system. Moreover, the "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. Furthermore, the above-described program may be one for realizing some of the above-described functions, and also may be one capable of realizing the above-described functions in combination with a program already recorded in a computer system.

Furthermore, a part or all of the video coding apparatus 11 and the video decoding apparatus 31 in the embodiment described above may be realized as an integrated circuit such as a Large Scale Integration (LSI). Each function block of the video coding apparatus 11 and the video decoding apparatus 31 may be individually realized as processors, or part or all may be integrated into processors. The circuit integration technique is not limited to LSI, and the integrated circuits for the functional blocks may be realized as dedicated circuits or a multi-purpose processor. In a case that with advances in semiconductor technology, a circuit integration technology with which an LSI is replaced appears, an integrated circuit based on the technology may be used.

The embodiment of the present invention has been described in detail above referring to the drawings, but the specific configuration is not limited to the above embodiment and various amendments can be made to a design that fall within the scope that does not depart from the gist of the present invention.

Application Examples

The above-mentioned video coding apparatus 11 and the video decoding apparatus 31 can be utilized being installed to various apparatuses performing transmission, reception, recording, and regeneration of videos. Note that, the video may be a natural video imaged by camera or the like, or may be an artificial video (including CG and GUI) generated by computer or the like.

At first, referring to FIG. 2, it will be described that the above-mentioned video coding apparatus 11 and the video decoding apparatus 31 can be utilized for transmission and reception of videos.

Figure 2:
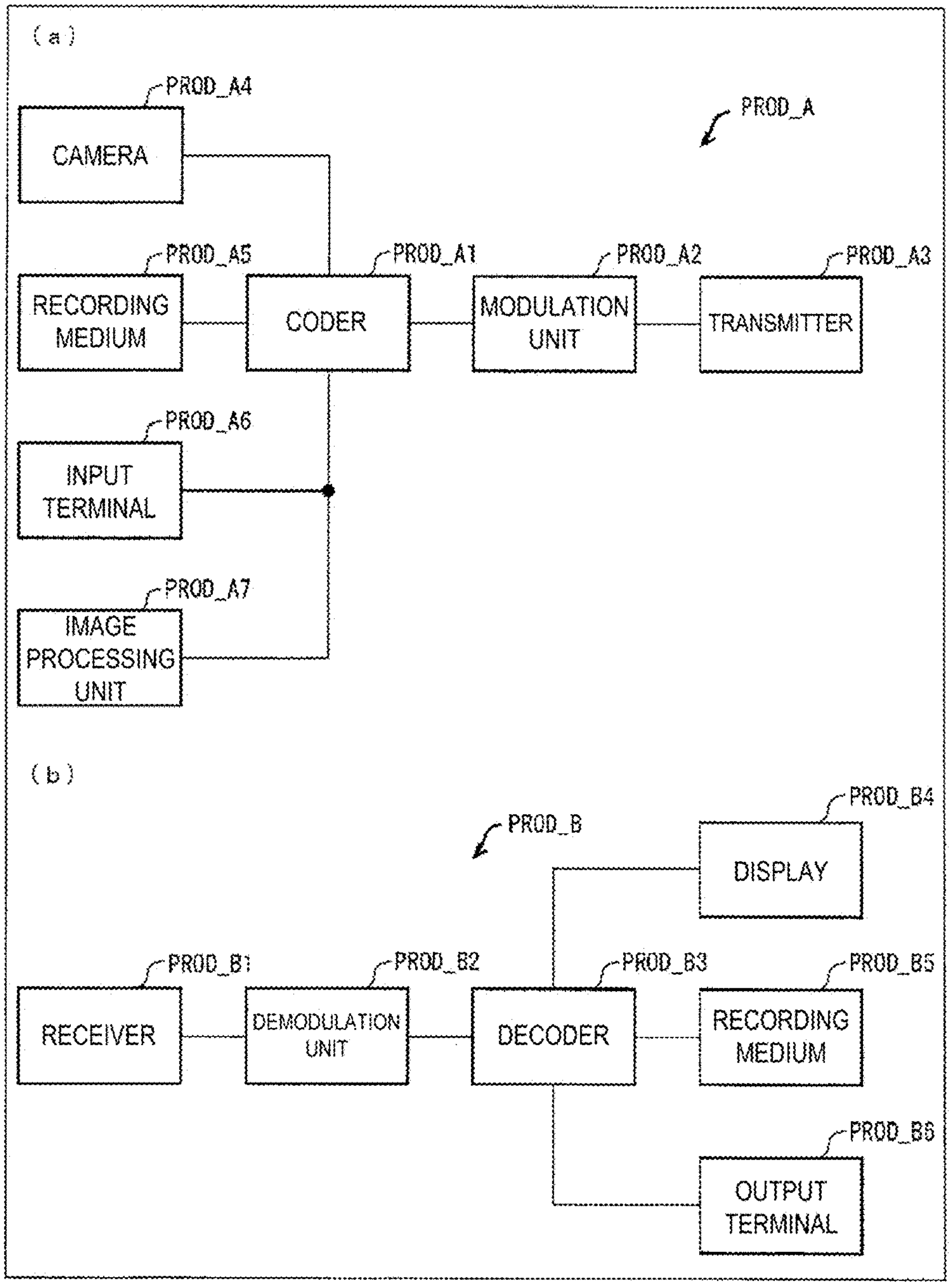
FIG. 2 is a diagram illustrating configurations of a transmitting apparatus equipped with a video coding apparatus and a receiving apparatus equipped with a video decoding apparatus according to the present embodiment. (a) thereof illustrates the transmitting apparatus equipped with the video coding apparatus, and (b) thereof illustrates the receiving apparatus equipped with the video decoding apparatus.

FIG. 2(*a*) is a block diagram illustrating a configuration of a transmitting apparatus PROD_A installed with the video coding apparatus 11. As illustrated in FIG. 2(*a*), the transmitting apparatus PROD_A includes a coder PROD_A1 which obtains coded data by coding videos, a modulation unit PROD_A2 which obtains modulation signals by modulating carrier waves with the coded data obtained by the coder PROD_A1, and a transmitter PROD_A3 which transmits the modulation signals obtained by the modulation unit PROD_A2. The above-mentioned video coding apparatus 11 is utilized as the coder PROD_A1.

The transmitting apparatus PROD_A may further include a camera PROD_A4 that images videos, a recording medium PROD_A5 that records videos, an input terminal PROD_A6 for inputting videos from the outside, and an image processing unit A7 which generates or processes images, as supply sources of videos to be input into the coder PROD_A1. Although an example configuration in which the transmitting apparatus PROD_A includes all of the constituents is illustrated in FIG. 2(*a*), some of the constituents may be omitted.

Note that the recording medium PROD_A5 may record videos which are not coded or may record videos coded in a coding scheme for recording different from a coding scheme for transmission. In the latter case, a decoder (not illustrated) to decode coded data read from the recording medium PROD_A5 according to the coding scheme for recording may be present between the recording medium PROD_A5 and the coder PROD_A1.

FIG. 2(*b*) is a block diagram illustrating a configuration of a receiving apparatus PROD_B installed with the video decoding apparatus 31. As illustrated in FIG. 2(*b*), the receiving apparatus PROD_B includes a receiver PROD_B1 that receives modulation signals, a demodulation unit PROD_B2 that obtains coded data by demodulating the modulation signals received by the receiver PROD_B1, and a decoder PROD_B3 that obtains videos by decoding the coded data obtained by the demodulation unit PROD_B2. The above-mentioned video decoding apparatus 31 is utilized as the decoder PROD_B3.

The receiving apparatus PROD_B may further include a display PROD_B4 that displays videos, a recording medium PROD_B5 for recording the videos, and an output terminal PROD_B6 for outputting the videos to the outside, as supply destinations of the videos to be output by the decoder PROD_B3. Although an example configuration that the receiving apparatus PROD_B includes all of the constituents is illustrated in FIG. 2(*b*), some of the constituents may be omitted.

Note that the recording medium PROD_B5 may record videos which are not coded, or may record videos which are coded in a coding scheme for recording different from a coding scheme for transmission. In the latter case, a coder (not illustrated) that codes videos acquired from the decoder PROD_B3 according to the coding scheme for recording may be present between the decoder PROD_B3 and the recording medium PROD_B5.

Note that a transmission medium for transmitting the modulation signals may be a wireless medium or may be a wired medium. In addition, a transmission mode in which the modulation signals are transmitted may be a broadcast (here, which indicates a transmission mode in which a transmission destination is not specified in advance) or may be a communication (here, which indicates a transmission mode in which a transmission destination is specified in advance). That is, the transmission of the modulation signals may be realized by any of a wireless broadcast, a wired broadcast, a wireless communication, and a wired communication.

For example, a broadcasting station (e.g., broadcasting equipment)/receiving station (e.g., television receiver) for digital terrestrial broadcasting is an example of the transmitting apparatus PROD_A/receiving apparatus PROD_B for transmitting and/or receiving the modulation signals in the wireless broadcast. In addition, a broadcasting station (e.g., broadcasting equipment)/receiving station (e.g., television receivers) for cable television broadcasting is an example of the transmitting apparatus PROD_A/receiving apparatus PROD_B for transmitting and/or receiving the modulation signals in the wired broadcast.

In addition, a server (e.g., workstation)/client (e.g., television receiver, personal computer, smartphone) for Video On Demand (VOD) services, video hosting services and the like using the Internet is an example of the transmitting apparatus PROD_A/receiving apparatus PROD_B for transmitting and/or receiving the modulation signals in communication (usually, any of a wireless medium or a wired medium is used as a transmission medium in LAN, and the wired medium is used as a transmission medium in WAN). Here, personal computers include a desktop PC, a laptop PC, and a tablet PC. In addition, smartphones also include a multifunctional mobile telephone terminal.

A client of a video hosting service has a function of coding a video imaged with a camera and uploading the video to a server, in addition to a function of decoding coded data downloaded from a server and displaying on a display. Thus, the client of the video hosting service functions as both the transmitting apparatus PROD_A and the receiving apparatus PROD_B.

Next, referring to FIG. 3, it will be described that the above-mentioned video coding apparatus 11 and the video decoding apparatus 31 can be utilized for recording and regeneration of videos.

Figure 3:
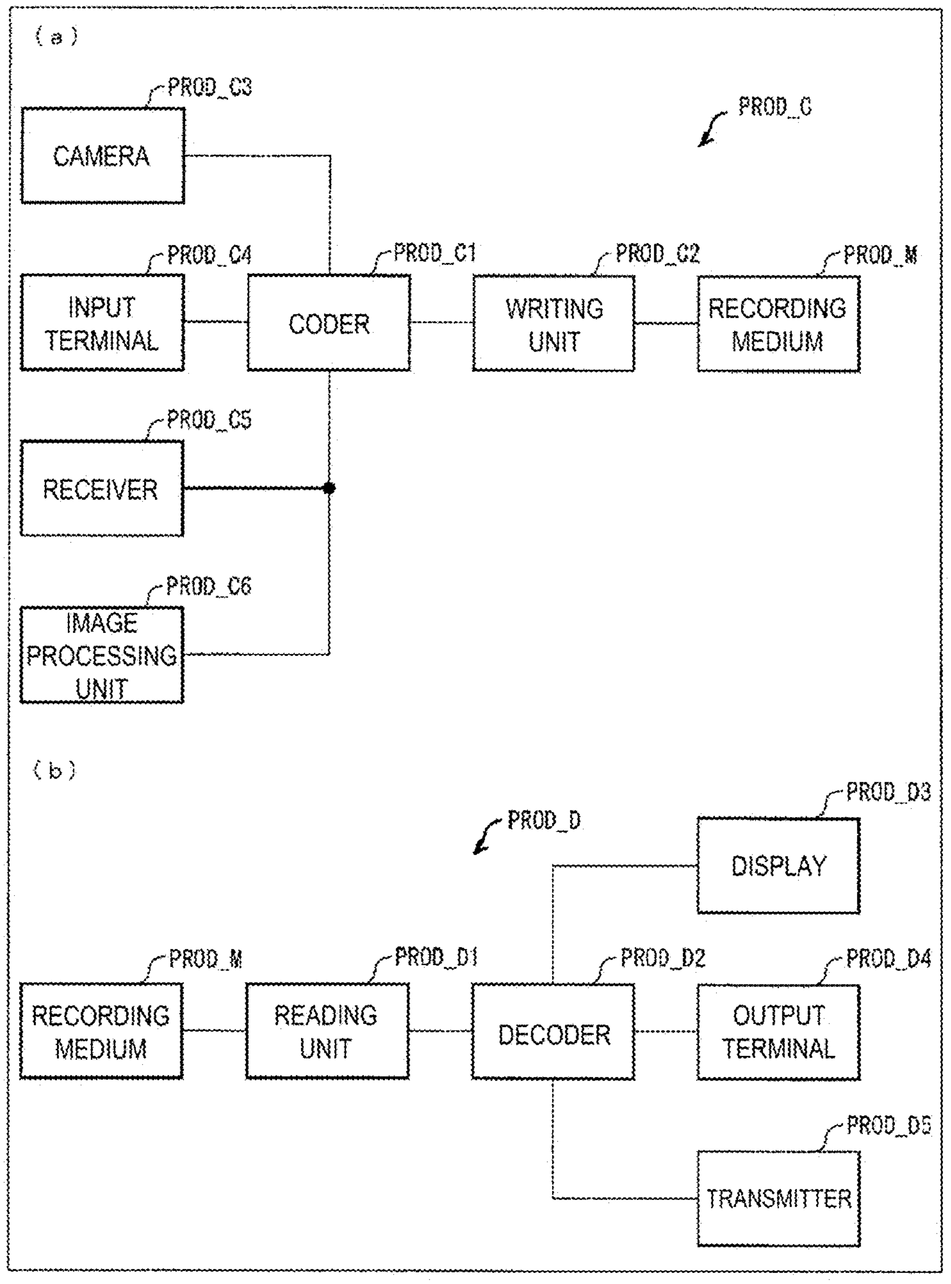
FIG. 3 is a diagram illustrating configurations of a recording apparatus equipped with the video coding apparatus and a reconstruction apparatus equipped with the video decoding apparatus according to the present embodiment. (a) thereof illustrates the recording apparatus equipped with the video coding apparatus, and (b) thereof illustrates the reconstruction apparatus equipped with the video decoding apparatus.

FIG. 3(*a*) is a block diagram illustrating a configuration of a recording apparatus PROD_C installed with the above-mentioned video coding apparatus 11. As illustrated in FIG. 3(*a*), the recording apparatus PROD_C includes a coder PROD_C1 that obtains coded data by coding a video, and a writing unit PROD_C2 that writes the coded data obtained by the coder PROD_C1 in a recording medium PROD_M. The above-mentioned video coding apparatus 11 is utilized as the coder PROD_C1.

Note that the recording medium PROD_M may be (1) a type of recording medium built in the recording apparatus PROD_C such as Hard Disk Drive (HDD) or Solid State Drive (SSD), may be (2) a type of recording medium connected to the recording apparatus PROD_C such as an SD memory card or a Universal Serial Bus (USB) flash memory, and may be (3) a type of recording medium loaded in a drive apparatus (not illustrated) built in the recording apparatus PROD_C such as Digital Versatile Disc (DVD: trade name) or Blu-ray Disc (BD: trade name).

In addition, the recording apparatus PROD_C may further include a camera PROD_C3 that images a video, an input terminal PROD_C4 for inputting the video from the outside, a receiver PROD_C5 for receiving the video, and an image processing unit PROD_C6 that generates or processes images, as supply sources of the video input into the coder PROD_C1. Although an example configuration that the recording apparatus PROD_C includes all of the constituents is illustrated in FIG. 3(*a*), some of the constituents may be omitted.

Note that the receiver PROD_C5 may receive a video which is not coded, or may receive coded data coded in a coding scheme for transmission different from the coding scheme for recording. In the latter case, a decoder for transmission (not illustrated) that decodes coded data coded in the coding scheme for transmission may be present between the receiver PROD_C5 and the coder PROD_C1.

Examples of such recording apparatus PROD_C include, for example, a DVD recorder, a BD recorder, a Hard Disk Drive (HDD) recorder, and the like (in this case, the input terminal PROD_C4 or the receiver PROD_C5 is the main supply source of videos). In addition, a camcorder (in this case, the camera PROD_C3 is the main supply source of videos), a personal computer (in this case, the receiver PROD_C5 or the image processing unit C6 is the main supply source of videos), a smartphone (in this case, the camera PROD_C3 or the receiver PROD_C5 is the main supply source of videos), or the like is an example of the recording apparatus PROD_C as well.

FIG. 3(B) is a block illustrating a configuration of a reconstruction apparatus PROD_D installed with the above-mentioned video decoding apparatus 31. As illustrated in FIG. 3(*b*), the reconstruction apparatus PROD_D includes a reading unit PROD_D1 which reads coded data written in the recording medium PROD_M, and a decoder PROD_D2 which obtains a video by decoding the coded data read by the reading unit PROD_D1. The above-mentioned video decoding apparatus 31 is utilized as the decoder PROD_D2.

Note that the recording medium PROD_M may be (1) a type of recording medium built in the reconstruction apparatus PROD_D such as HDD or SSD, may be (2) a type of recording medium connected to the reconstruction apparatus PROD_D such as an SD memory card or a USB flash memory, and may be (3) a type of recording medium loaded in a drive apparatus (not illustrated) built in the reconstruction apparatus PROD_D such as a DVD or a BD.

In addition, the reconstruction apparatus PROD_D may further include a display PROD_D3 that displays a video, an output terminal PROD_D4 for outputting the video to the outside, and a transmitter PROD_D5 that transmits the video, as the supply destinations of the video to be output by the decoder PROD_D2. Although an example configuration that the reconstruction apparatus PROD_D includes all of the constituents is illustrated in FIG. 3(*b*), some of the constituents may be omitted.

Note that the transmitter PROD_D5 may transmit a video which is not coded or may transmit coded data coded in the coding scheme for transmission different from a coding scheme for recording. In the latter case, a coder (not illustrated) that codes a video in the coding scheme for transmission may be present between the decoder PROD_D2 and the transmitter PROD_D5.

Examples of the reconstruction apparatus PROD_D include, for example, a DVD player, a BD player, an HDD player, and the like (in this case, the output terminal PROD_D4 to which a television receiver, and the like are connected is the main supply destination of videos). In addition, a television receiver (in this case, the display PROD_D3 is the main supply destination of videos), a digital signage (also referred to as an electronic signboard or an electronic bulletin board, and the like, and the display PROD_D3 or the transmitter PROD_D5 is the main supply destination of videos), a desktop PC (in this case, the output terminal PROD_D4 or the transmitter PROD_D5 is the main supply destination of videos), a laptop or tablet PC (in this case, the display PROD_D3 or the transmitter PROD_D5 is the main supply destination of videos), a smartphone (in this case, the display PROD_D3 or the transmitter PROD_D5 is the main supply destination of videos), or the like is an example of the reconstruction apparatus PROD_D.

Realization by Hardware and Realization by Software

Each block of the above-mentioned video decoding apparatus 31 and the video coding apparatus 11 may be realized as a hardware by a logical circuit formed on an integrated circuit (IC chip), or may be realized as a software using a Central Processing Unit (CPU).

In the latter case, each of the above-described apparatuses includes a CPU that performs a command of a program to implement each of functions, a Read Only Memory (ROM) that stores the program, a Random Access Memory (RAM) to which the program is loaded, and a storage apparatus (recording medium), such as a memory, that stores the program and various kinds of data. In addition, an objective of the embodiment of the present invention can be achieved by supplying, to each of the apparatuses, the recording medium that records, in a computer readable form, program codes of a control program (executable program, intermediate code program, source program) of each of the apparatuses that is software for realizing the above-described functions and by reading and performing, by the computer (or a CPU or an MPU), the program codes recorded in the recording medium.

As the recording medium, for example, tapes including a magnetic tape, a cassette tape and the like, discs including a magnetic disc such as a floppy (trade name) disk/a hard disk and an optical disc such as a Compact Disc Read-Only Memory (CD-ROM)/Magneto-Optical disc (MO disc)/Mini Disc (MD)/Digital Versatile Disc (DVD)/CD Recordable (CD-R)/Blu-ray Disc (trade name), cards such as an IC card (including a memory card)/an optical card, semiconductor memories such as a mask ROM/Erasable Programmable Read-Only Memory (EPROM)/Electrically Erasable and Programmable Read-Only Memory (EEPROM: trade name)/a flash ROM, logical circuits such as a Programmable logic device (PLD) and a Field Programmable Gate Array (FPGA), or the like can be used.

In addition, each of the apparatuses is configured to be connectable to a communication network, and the program codes may be supplied through the communication network. The communication network is required to be capable of transmitting the program codes, but is not limited to a particular communication network. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network, and the like are available. In addition, a transmission medium constituting this communication network is also required to be a medium which can transmit a program code, but is not limited to a particular configuration or type of transmission medium. For example, a wired transmission medium such as Institute of Electrical and Electronic Engineers (IEEE) 1394, a USB, a power line carrier, a cable TV line, a telephone line, an Asymmetric Digital Subscriber Line (ADSL) line, and a wireless transmission medium such as infrared ray of Infrared Data Association (IrDA) or a remote control, BlueTooth (trade name), IEEE 802.11 wireless communication, High Data Rate (HDR), Near Field Communication (NFC), Digital Living Network Alliance (DLNA: trade name), a cellular telephone network, a satellite channel, a terrestrial digital broadcast network are available. Note that the embodiment of the present invention can be also realized in the form of computer data signals embedded in a carrier such that the transmission of the program codes is embodied in electronic transmission.

The embodiment of the present invention is not limited to the above-described embodiment, and various modifications are possible within the scope of the claims. That is, an embodiment obtained by combining technical means modified appropriately within the scope defined by claims is included in the technical scope of the present invention as well.

CROSS-REFERENCE OF RELATED APPLICATION

This application claims the benefit of priority to JP 2019-021630 filed on Feb. 8, 2019 and to JP 2019-057031 filed on Mar. 25, 2019, which are incorporated herein by reference in its entirety.

INDUSTRIAL APPLICABILITY

The embodiment of the present invention can be preferably applied to a video decoding apparatus that decodes coded data in which image data is coded, and a video coding apparatus that generates coded data in which image data is coded. The embodiment of the present invention can be preferably applied to a data structure of coded data generated by the video coding apparatus and referred to by the video decoding apparatus.

REFERENCE SIGNS LIST

11 Video coding apparatus
31 Video decoding apparatus
101, 308 Prediction image generation unit
104 Entropy coder (coder)
107, 305 Loop filter
111 Parameter coder
301 Entropy decoder
302 Parameter decoder (splitting unit)
3020 Header decoder
3021 CT information decoder
3022 CU decoder
109, 306 Reference picture memory
108, 307 Prediction parameter memory
105, 311 Inverse quantization and inverse transform processing unit
102 Subtraction unit
103 Transform and quantization unit
104 Entropy coder
106 Addition unit
110 Coding parameter determination unit
1110 Header coder
1111 CT information coder
1112 CU coder

The invention claimed is:

1. A video decoding apparatus for decoding a picture, the video decoding apparatus comprising:
 a header decoding circuit that decodes an enabled flag indicating whether a synchronization process for a Context-Adaptive Binary Arithmetic Coding (CABAC) is performed for a first Coding Tree Unit (CTU) of a CTU row, in a parameter set, wherein the header decoding circuit:

derives a raster scan CTU address list by using a tile position by raster scan of a tile in a slice, derives a CTU address by using the raster scan CTU address list, and derives a number of entry points by using the CTU address in a case that a value of the enabled flag is equal to 1.

2. A video coding apparatus for coding an image, the video coding apparatus comprising:

a header coding circuit that codes an enabled flag indicating whether a synchronization process for a Context-Adaptive Binary Arithmetic Coding (CABAC) is performed for a first Coding Tree Unit (CTU) of a CTU row, in a parameter set, wherein the header coding circuit:

derives a raster scan CTU address list by using a tile position by raster scan of a tile in a slice, derives a CTU address by using the raster scan CTU address list, and derives a number of entry points by using the CTU address in a case that a value of the enabled flag is equal to 1.

3. A video decoding method for decoding a picture, the video decoding method comprising at least the steps of:

decoding an enabled flag indicating whether a synchronization process for a Context-Adaptive Binary Arithmetic Coding (CABAC) is performed for a first Coding Tree Unit (CTU) of a CTU row, in a parameter set;

deriving a raster scan CTU address list by using a tile position by raster scan of a tile in a slice;

deriving a CTU address by using the raster scan CTU address list; and deriving a number of entry points by using the CTU address in a case that a value of the enabled flag is equal to 1.

4. A video coding method for coding a picture, the video coding method comprising at least the steps of:

coding an enabled flag indicating whether a synchronization process for a Context-Adaptive Binary Arithmetic Coding (CABAC) is performed for a first Coding Tree Unit (CTU) of a CTU row, in a parameter set;

deriving a raster scan CTU address list by using a tile position by raster scan of a tile in a slice;

deriving a CTU address by using the raster scan CTU address list; and deriving a number of entry points by using the CTU address in a case that a value of the enabled flag is equal to 1.

* * * * *